United States Patent
Zheng et al.

(10) Patent No.: US 11,519,857 B2
(45) Date of Patent: Dec. 6, 2022

(54) NANOSTRUCTURED PLASMONIC MATERIALS AND METHODS OF MAKING AND USE THEREOF

(71) Applicant: BOARD OF REGENTS, THE UNIVERSITY OF TEXAS SYSTEM, Austin, TX (US)

(72) Inventors: Yuebing Zheng, Austin, TX (US); Zilong Wu, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 129 days.

(21) Appl. No.: 16/648,799

(22) PCT Filed: Sep. 18, 2018

(86) PCT No.: PCT/US2018/051452
§ 371 (c)(1),
(2) Date: Mar. 19, 2020

(87) PCT Pub. No.: WO2019/060280
PCT Pub. Date: Mar. 28, 2019

(65) Prior Publication Data
US 2020/0264101 A1 Aug. 20, 2020

Related U.S. Application Data

(60) Provisional application No. 62/561,339, filed on Sep. 21, 2017.

(51) Int. Cl.
*G01N 21/552* (2014.01)
*G01N 21/19* (2006.01)
*G02B 5/00* (2006.01)

(52) U.S. Cl.
CPC ........... *G01N 21/554* (2013.01); *G01N 21/19* (2013.01); *G02B 5/008* (2013.01); *G02B 2207/101* (2013.01)

(58) Field of Classification Search
CPC .... G02B 1/04; G02B 2207/101; G02B 5/008; G02B 6/1226; G01N 21/554; G01N 21/19;
(Continued)

(56) References Cited

U.S. PATENT DOCUMENTS 7,709,810 B2 5/2010 Misawa et al.
8,765,231 B2 7/2014 Vuong et al.
(Continued)

FOREIGN PATENT DOCUMENTS

KR       20140033596     * 10/2014    ....... B29D 11/00634
WO    WO-2016064859 A1 *  4/2016    ......... G01N 30/6095
WO        2017/106145       6/2017

OTHER PUBLICATIONS

Ariens, , "Stereochemistry, a basis for sophisticated nonsense in pharmacokinetics and clinical-pharmacology", European Journal of Clinical Pharmacology 26, 663-668, (1984).
(Continued)

*Primary Examiner* — Sunghee Y Gray
(74) *Attorney, Agent, or Firm* — Meunier Carlin & Curfman LLC

(57) ABSTRACT

Disclosed herein are nanostructured plasmonic materials. The nanostructured plasmonic materials can include a first nanostructured layer comprising: a first layer of a first plasmonic material permeated by a first plurality of spaced-apart holes, wherein the first plurality of spaced apart holes comprise a first array; and a second nanostructured layer comprising a second layer of a second plasmonic material permeated by a second plurality of spaced-apart holes, wherein the second plurality of spaced apart holes comprise a second array; wherein the second nanostructured layer is located proximate the first nanostructured layer; and wherein
(Continued)

the first principle axis of the first array is rotated at a rotation angle compared to the first principle axis of the second array.

20 Claims, 36 Drawing Sheets

(58) Field of Classification Search
CPC .. G01N 2021/216; G01N 21/00; B82Y 20/00; B82Y 15/00
USPC .................................................. 356/364, 301
See application file for complete search history.

(56) References Cited

U.S. PATENT DOCUMENTS

| | | | |
|---|---|---|---|
| 2006/0034729 | A1 | 2/2006 | Poponin |
| 2009/0032735 | A1 | 2/2009 | Misawa et al. |
| 2010/0232017 | A1* | 9/2010 | McCarthy ............. G02B 1/007 359/485.05 |
| 2011/0269364 | A1* | 11/2011 | Yoon ..................... G03F 7/0007 216/13 |
| 2012/0262500 | A1 | 10/2012 | Kitazawa et al. |
| 2013/0100454 | A1 | 4/2013 | Walters |
| 2013/0252016 | A1 | 9/2013 | Glembocki et al. |
| 2015/0017433 | A1 | 1/2015 | Alisafaee et al. |
| 2015/0070693 | A1 | 3/2015 | Sugimoto et al. |
| 2016/0118249 | A1* | 4/2016 | Sreenivasan ...... H01L 21/02381 977/890 |
| 2016/0236373 | A1 | 8/2016 | Sonoda et al. |
| 2017/0315102 | A1* | 11/2017 | Sun .................... G01N 30/6095 |
| 2017/0356843 | A1 | 12/2017 | Alu et al. |

OTHER PUBLICATIONS

Decker, et al., "Strong optical activity from twisted-cross photonic metamaterials", Optics Letters 34, 2501-2503, (2009).
Droulias, et al., "Broad-band giant circular dichroism in metamaterials of twisted chains of metallic nanoparticles", Journal of Physical Chemistry C 117, 1130-1135, (2013).
Erb, , "Single enantiomer drugs poised for further market growth", Pharmaceutical Technology 30, s14-s18, (2006).
Eriksson, et al., "Clinical pharmacology of thalidomide", European Journal of Clinical Pharmacology 57, 365-376, (2001).
Govorov, et al., "Plasmon-induced circular dichroism of a chiral molecule in the vicinity of metal nanocrystals", Application to various geometries. Journal of Physical Chemistry C 115, 7914-7923, (2011).
Govorov, et al., "Theory of circular dichroism of nanomaterials comprising chiral molecules and nanocrystals: plasmon enhancement, dipole interactions, and dielectric effects", Nano Letters 10, 1374-1382, K2010).
Guerrero-Martinez, , "Intense optical activity from three-dimensional chiral ordering of plasmonic nanoantennas", Angewandte Chemie-International Edition 50, 5499-5503, (2011).
Huang, , "Broadband circular polarizer using stacked chiral polymer films", Optics Express 15, 6414-6419, (2007).
Hutt, et al., "Drug chirality and its clinical significance", Drugs 52, 1-12, (1996).
Kelly, , "How to study proteins by circular dichroism", Biochimica Et Biophysica Acta-Proteins and Proteomics, 2005, 1751, 119-139.
Meinzer, et al., "Probing the chiral nature of electromagnetic fields surrounding plasmonic nanostructures", Physical Review B, 2013, 88, 041407.
Ohzono, , "A liquid crystalline chirality balance for vapours", Nat Commun. 2014, 5, 3735.
Patterson, et al., "Enantiomer-specific detection of chiral molecules via microwave spectroscopy", Nature, 2013, 497, 475-477.
Plum, et al., "Giant optical gyrotropy due to electromagnetic coupling", Applied Physics Letters, 2007, 90, 223113.
Richardson, , "Handedness of crossover connections in betasheets", Proceedings of the National Academy of Sciences of the United States of America, 1976, 73, 2619-2623.
Rogacheva, et al., "Giant gyrotropy due to electromagnetic-field coupling in a bilayered structure", Physical Review Letters, 2006, 97, 177401.
Schreiber, et al., "Chiral plasmonic DNA nanostructures with switchable circular dichroism", Nature Communications, 2013, 4, 2498.
Shalaev, , "Optical negative-index metamaterials", Nature Photonics, 2007, 1, 41-48.
Soltani, et al., "Nanophotonic trapping for precise manipulation of biomolecular arrays", Nature Nanotech., 2014, 9, 448-452.
Tang, et al., "Optical chirality and its interaction with matter", Physical Review Letters, 2010, 104, 163901.
Teo, et al., "Clinical pharmacokinetics of thalidomide", Clinical Phamacokinetics, 2004, 43, 311-327.
Zhao, et al., "Chirality detection of enantiomers using twisted optical metamaterials", Nature Communications, 2017, 8, 14180.
Zhao, et al., "Homogenization of plasmonic metasurfaces modeled as transmission-line loads", Metamaterials, 2011,5, 90-96.
Zhao, et al., "Tailoring the Dispersion of Plasmonic Nanorods to Realize Broadband Optical Meta-Waveplates", Nano Letters 2013 13 (3), 1086-1091 DOI: 10.1021/nl304392b.
International Search Report and Written Opinion dated Nov. 19, 2018, from International Application No. PCT/US2018/051452, 13 pages.

* cited by examiner

NANOSTRUCTURED PLASMONIC MATERIALS AND METHODS OF MAKING AND USE THEREOF

CROSS-REFERENCE TO RELATED APPLICATIONS

This application claims the benefit of U.S. Provisional Application No. 62/561,339, filed Sep. 21, 2017, which is hereby incorporated herein by reference in its entirety.

STATEMENT OF GOVERNMENT SUPPORT

This invention was made with government support under Grant No. N00014-17-1-2424 awarded by the Office of Naval Research. The government has certain rights in the invention.

BACKGROUND

Circular dichroism refers to the differential absorption of left and right circularly polarized light and is exhibited in the absorption bands of optically active chiral molecules. As used herein, a chiral molecule is any molecule that has a non-superposable mirror image. The symmetry of a molecule (or any other object) determines whether it is chiral. The two mirror images of a chiral molecule are called enantiomers, or optical isomers. Human hands are perhaps one of the most recognized examples of chirality: the left hand is a non-superposable mirror image of the right hand. Indeed, the term "chirality" is derived from the Greek word for hand, and pairs of enantiomers are often designated by their "handedness" (e.g., right-handed or left-handed). Enantiomers often exhibit similar physical and chemical properties due to their identical functional groups and composition. However, enantiomers behave different in the presence of other chiral molecules or objects, such as circularly polarized light.

An enantiomer can be named by the direction which it rotates the plane of polarized light. If the enantiomer rotates the light clockwise (as seen by a viewer towards whom the light is traveling), that enantiomer is labeled (+). Its mirror-image is labeled (−) and rotates the light counterclockwise. The handedness of enantiomers can be related to their pharmacological effects, especially their potency and toxicity. In the case of chiral drugs, in some examples only one enantiomer produces the desired pharmacological effect, while the other enantiomer can be less active or merely inactive. In some cases, the other enantiomer can produce unwanted side effects.

Circularly polarized light occurs when the direction of the electric field vector rotates about its propagation direction while the vector retains a constant magnitude. At a single point in space, the circularly polarized-vector will trace out a circle over one period of the wave frequency. For left circularly polarized light (LCP), with propagation towards the observer, the electric vector rotates counterclockwise. For right circularly polarized light (RCP), the electric vector rotates clockwise.

When circularly polarized light passes through an absorbing optically active medium, the speeds between right and left polarizations differ, as well as their wavelength, and the extent to which they are absorbed. As circularly polarized light is chiral, it interacts differently with chiral molecules. That is, the two types of circularly polarized light are absorbed to different extents by a chiral molecule. In a circular dichroism experiment, equal amounts of left and right circularly polarized light of a selected wavelength (or range of wavelengths) are alternately radiated into a (chiral) sample. One of the two polarizations is absorbed more than the other one and this wavelength-dependent difference of absorption is measured yielding the circular dichroism spectrum of the sample.

Chiral molecules on their own typically possess a small circular dichroism resonance with magnitude in the range of few tens of millidegrees. There are other challenges in conventional circular dichroism measurements: they cannot directly detect the handedness of the chiral molecule, they can be time consuming (often taking up to 30 minutes), and they can involve large amounts of analytes.

Plasmonic chiral metamaterials are promising for applications in chiral sensors and photonic devices due to their strong optical chirality and light matter interactions at the subwavelength scale. However, most of current plasmonic chiral metamaterials rely on local structural chirality or site-specific symmetry breaking, which has limited their optical activity, tunability, and scalable fabrication for practical applications.

The compositions, methods, and systems discussed herein addresses these and other needs.

SUMMARY

In accordance with the purposes of the disclosed compositions, methods, and systems as embodied and broadly described herein, the disclosed subject matter relates to nanostructured plasmonic materials and methods of making and use thereof.

Additional advantages of the disclosed systems and methods will be set forth in part in the description which follows, and in part will be obvious from the description. The advantages of the disclosed systems and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

Figure 54:
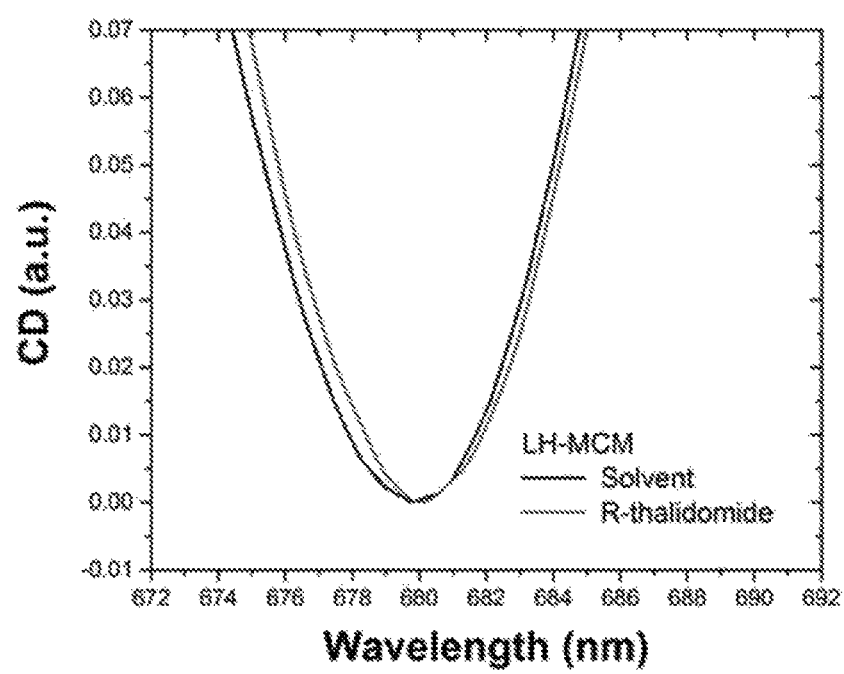

The circular dichroism peaks for right-hand moiré chiral metamaterials (RH-MCM) have larger blue-shifts than for the circular dichroism dips of left-hand moiré chiral metamaterials (LH-MCM), as shown in FIG. 54, after the adsorption of R-thalidomide. As a result, the $\Delta\Delta\lambda$ values are positive after the adsorption of R-thalidomide.

FIG. 54 is the shifts in the circular dichroism dip wavelengths of the left-handed enantiomer of a moiré chiral metamaterial due to the adsorption of the chiral drug molecule R-thalidomide.

Figure 55:
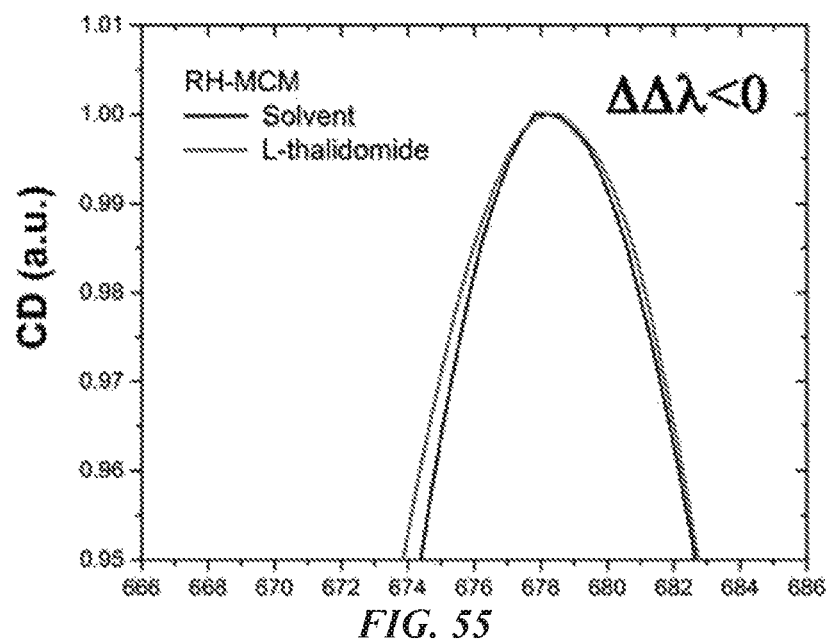

FIG. 55 is the shifts in the circular dichroism peak wavelengths of the right-handed enantiomer of a moiré chiral metamaterial due to the adsorption of the chiral drug molecule L-thalidomide. The circular dichroism dips for left-hand moiré chiral metamaterial (LH-MCM, FIG. 56) have larger blue-shifts than for the circular dichroism peaks of right-hand moiré chiral metamaterials (RH-MCM, FIG. 55) after the adsorption of L-thalidomide. As a result, the $\Delta\Delta\lambda$ values are negative after the adsorption of L-thalidomide, which match with the results shown in FIG. 52.

Figure 56:
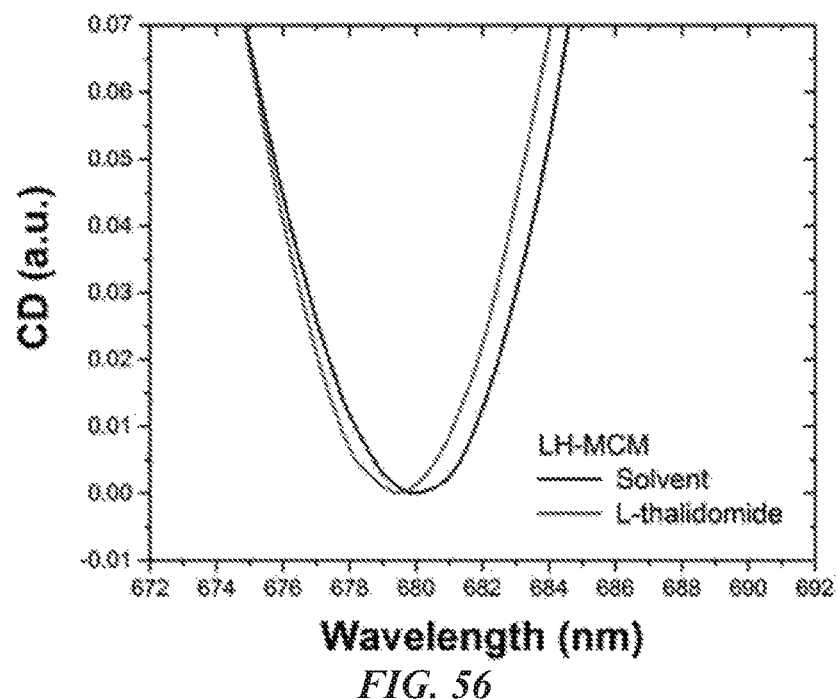

FIG. 56 is the shifts in the circular dichroism dip wavelengths of the left-handed enantiomer of a moiré chiral metamaterial due to the adsorption of the chiral drug molecule L-thalidomide.

Figure 57:
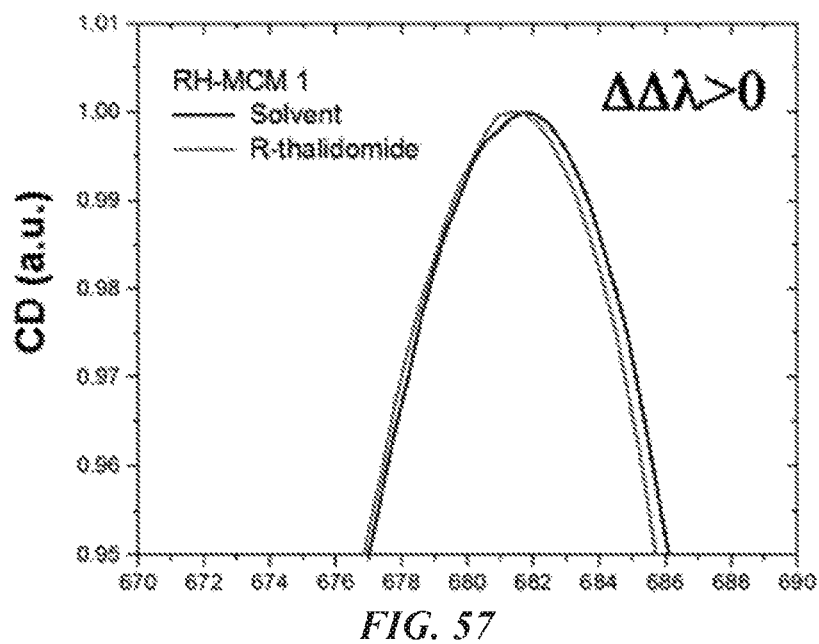

FIG. 57 is the shifts in the circular dichroism peak wavelengths of a first additional right-handed enantiomer of the moiré chiral metamaterials due to the adsorption of the chiral drug molecules. The circular dichroism peaks have larger blue-shifts for right-hand moiré chiral metamaterials (RH-MCM, FIG. 57) than for the circular dichroism dips of left-hand moiré chiral metamaterials (LH-MCM, FIG. 58) after the adsorption of R-thalidomide. As a result, the $\Delta\Delta\lambda$ values are positive after the adsorption of R-thalidomide, which are the same as the moiré chiral metamaterial set shown in FIG. 52.

Figure 58:
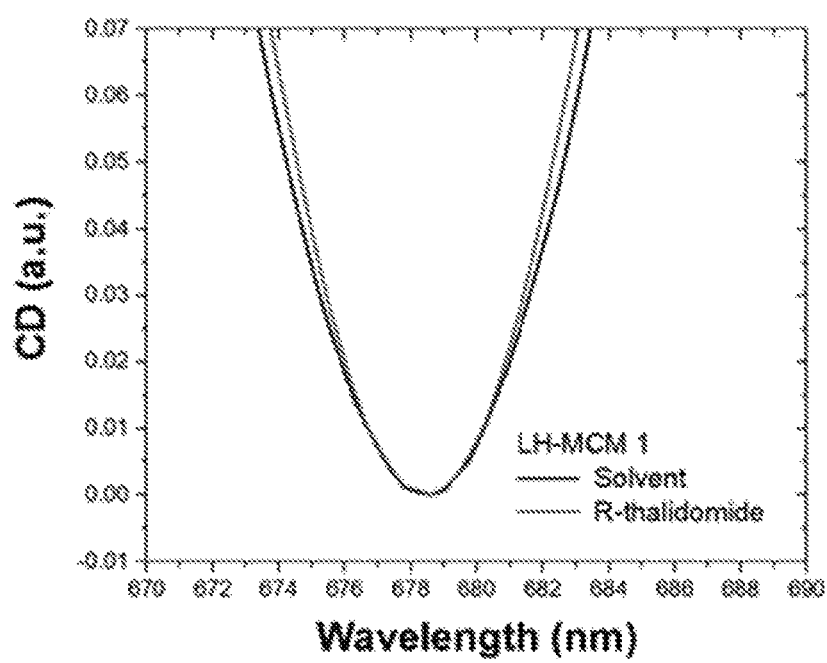

FIG. 58 is the shifts in the circular dichroism dip wavelengths of the left-handed enantiomer of an additional moiré chiral metamaterial due to time adsorption of the chiral drug molecule R-thalidomide.

Figure 59:
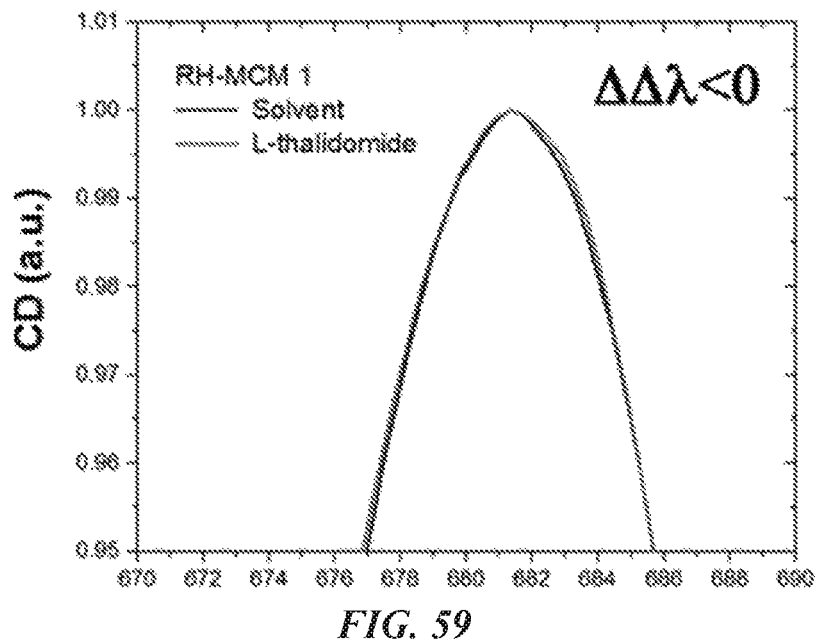

FIG. 59 is the shifts in the circular dichroism peak wavelengths of the right-handed enantiomer of a moiré chiral metamaterial due to the adsorption of the chiral drug molecule L-thalidomide. The circular dichroism dips for left-hand moiré chiral metamaterial (LH-MCM, FIG. 60) have larger blue-shifts than for the circular dichroism peaks of right-hand moiré chiral metamaterials (RH-MCM, FIG. 59) after the adsorption of L-thalidomide. As a result, the ΔΔλ values are negative after the adsorption of L-thalidomide, which match with the results shown in FIG. 52.

Figure 60:
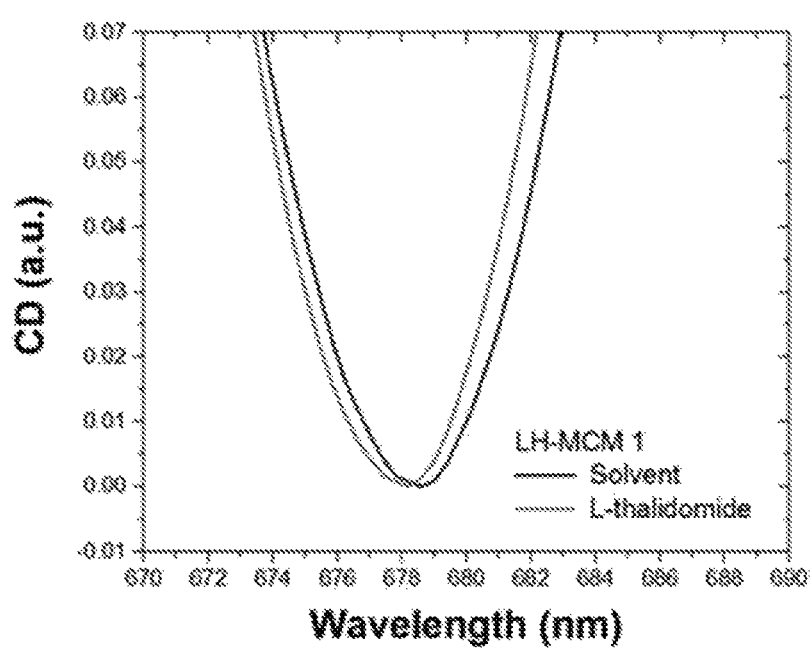

FIG. 60 is the shifts in the circular dichroism dip wavelengths of the left-handed enantiomer of an additional moiré chiral metamaterial due to the adsorption of the chiral drug molecule L-thalidomide.

Figure 61:
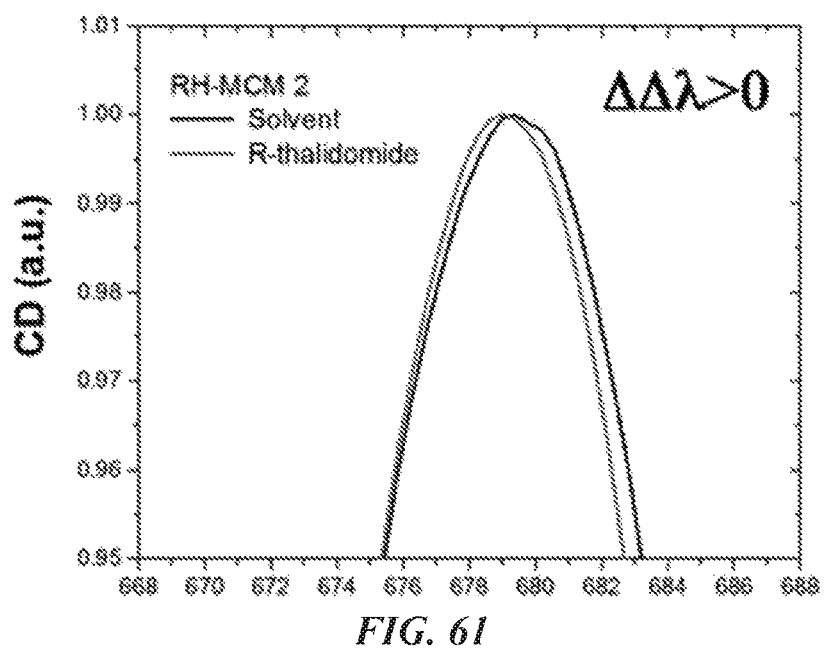

FIG. 61 is the shifts in the circular dichroism peak wavelengths of a second additional right-handed enantiomer of the moiré chiral metamaterials due to the adsorption of the chiral drug molecules. The circular dichroism peaks have larger blue-shifts for right-hand moiré chiral metamaterials (RH-MCM, FIG. 61) than for the circular dichroism dips of left-hand moiré chiral metamaterials (LH-MCM, FIG. 62) after the adsorption of R-thalidomide. As a result, the ΔΔλ values are positive after the adsorption of R-thalidomide, which are the same as the moiré chiral metamaterial set shown in FIG. 52.

Figure 62:
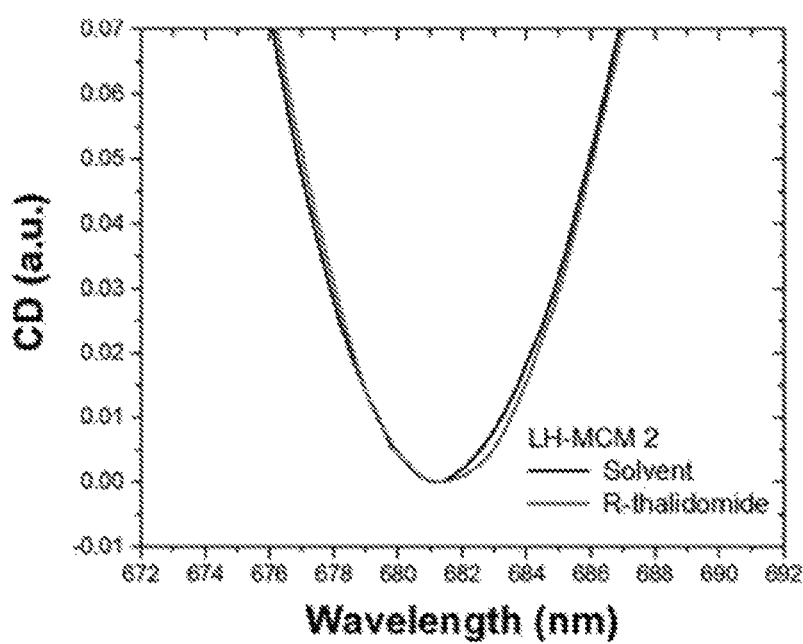

FIG. 62 is the shifts in the circular dichroism dip wavelengths of the left-handed enantiomer of the second additional moiré chiral metamaterial due to the adsorption of the chiral drug molecule R-thalidomide.

Figure 63:
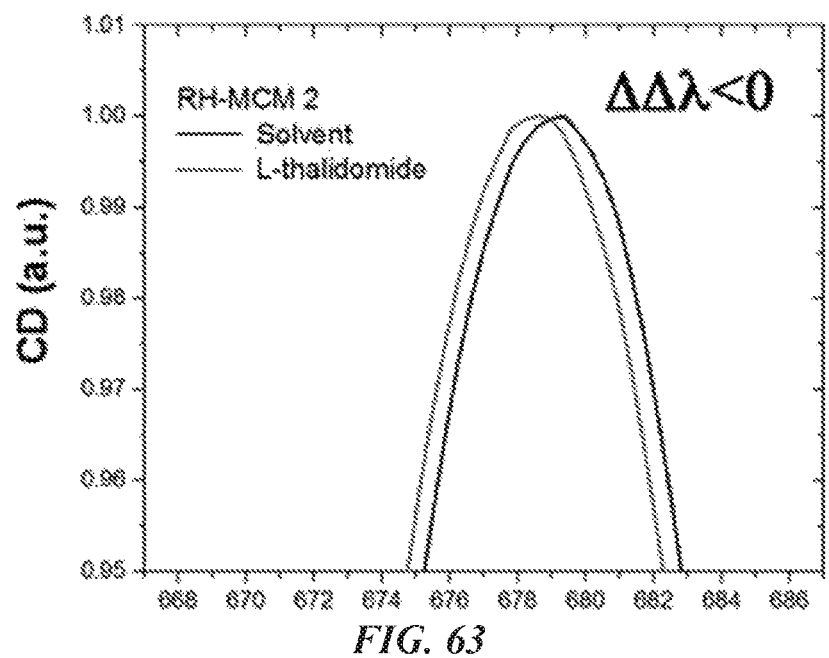

FIG. 63 is the shifts in the circular dichroism peak wavelengths of the right-handed enantiomer of the second additional moiré chiral metamaterial due to the adsorption of the chiral drug molecule L-thalidomide. The circular dichroism dips for left-hand moiré chiral metamaterial (LH-MCM, FIG. 64) have larger blue-shifts than for the circular dichroism peaks of right-hand moiré chiral metamaterials (RH-MCM, FIG. 63) after the adsorption of L-thalidomide. As a result, the ΔΔλ values are negative after the adsorption of L-thalidomide, which match with the results shown in FIG. 52.

Figure 64:
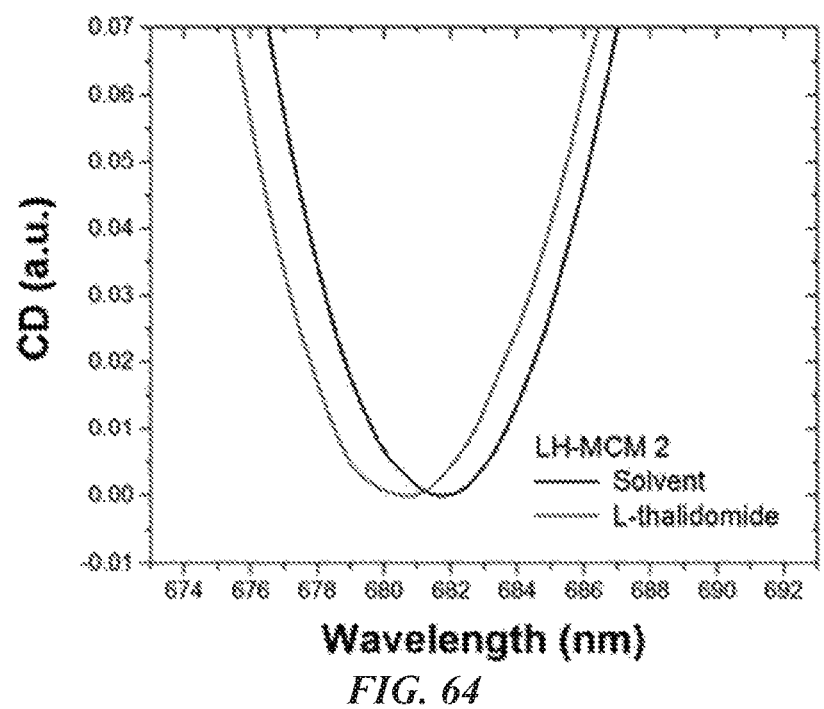

FIG. 64 is the shifts in the circular dichroism dip wavelengths of the left-handed enantiomer of the second additional moiré chiral metamaterial due to the adsorption of the chiral drug molecule L-thalidomide.

DETAILED DESCRIPTION

The compositions, methods, and systems described herein may be understood more readily by reference to the following detailed description of specific aspects of the disclosed subject matter and the Examples included therein.

Before the present compositions, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Nanostructured Plasmonic Materials

Disclosed herein are nanostructured plasmonic materials. As used herein, "nanostructured" means any structure with one or more nanosized features. A nanosized feature can be any feature with at least one dimension less than 1 μm in size. For example, a nanosized feature can comprise a nanowire, nanotube, nanoparticle, nanopore, and the like, or combinations thereof.

The nanostructured plasmonic materials comprise a First nanostructured layer. In some examples, the nanostructured layer can comprise a material that is not nanosized but has been modified with a nanowire, nanotube, nanoparticle, nanopore, or a combination thereof. The first nanostructured layer can comprise a first layer of a first plasmonic material permeated by a first plurality of spaced-apart holes.

Examples of plasmonic materials include, but are not limited to, plasmonic metals, plasmonic semiconductors (e.g., silicon carbide), doped semiconductors (e.g., aluminum-doped zinc oxide), transparent conducting oxides, perovskites, metal nitrides, metal oxides, silicides, germanides, two-dimensional plasmonic materials (e.g., graphene), and combinations thereof.

In some examples, the first plasmonic material can comprise a plasmonic metal. Examples of plasmonic metals include, but are not limited to Au, Ag, Pt, Pd, Cu, Cr, Al, and combinations thereof.

In some examples, the first plasmonic material can comprise a plasmonic oxide material, for example a metal oxide. In some examples, the plasmonic oxide material can comprise a transparent conducting oxide material. Examples of plasmonic oxide materials include, but are not limited to, tungsten oxide, indium oxide, molybdenum oxide, tin-doped indium oxide (e.g., indium tin oxide, ITO), fluorine-doped tin oxide (FTO), indium-doped cadmium oxide (ICO), aluminum-doped zinc oxide (AZO), antimony-doped tin oxide (ATO), cesium tungsten oxide ($Cs_xWO_3$), and combinations thereof. Plasmonic oxide materials are further described, for example by Lounis et al. in The Journal of Physical Chemistry Letters, 2014, 5, 1564-1574, which is hereby incorporated herein by reference for its discussion of plasmonic oxide materials.

In some examples, the thickness of the first layer of the first plasmonic material can be 15 nm or more (e.g., 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the thickness of the first layer of the first plasmonic material can be 200 nm or less (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, or 25 nm or less). The thickness of the first layer of the first plasmonic material can range from any of the minimum values described above to any of the maximum values described above. For example, the thickness of the first layer of the first plasmonic material can be from 15 nm to 200 nm (e.g., from 15 nm to 100 nm, from 100 nm to 200 nm, from 15 nm to 50 nm, from 50 nm to 100 nm, from 100 nm to 150 nm, from 150 nm to 200 nm, or from 20 nm to 150 nm).

In some examples, the nanostructured plasmonic material can further comprise a substrate having a first surface, wherein the first nanostructured layer is disposed on the first surface. In some examples, the substrate can be transparent. As used herein, a "transparent substrate" is meant to include any substrate that is transparent at the wavelength or wavelength region of interest. Examples of substrates include, but are not limited to, glass, quartz, parylene, silicon dioxide, mica, poly(methyl methacrylate), polyamide, polycarbonate, polyester, polypropylene, polytetrafluoroethylene, polydimethylsiloxane (PDMS), hafnium oxide, hafnium silicate, tantalum pentoxide, zirconium dioxide, zirconium silicate, and combinations thereof. The substrate can, for example, comprise glass, quartz, silicon dioxide, silicon nitride, a polymer, or a combination thereof.

In some examples, the substrate can be substantially optically transparent. For example, the substrate can have an average transmittance of 75% or more at one or more wavelengths from 350 nm to 1000 nm (e.g., 76% or more, 77% or more, 78% or more, 79% or more, 80% or more, 81% or more, 82% or more, 83% or more, 84% or more, 85 or more, 86% or more, 87% or more, 88% or more, 89% or more, 90% or more, 91% or more, 92% or more, 93% or more, 94% or more, 95% or more, 96% or more, 97% or more, 98% or more, or 99% or more). In some examples, the substrate can have an average transmittance of 100% or less at one or more wavelengths front 350 nm to 1000 nm (e.g., 99% or less, 98% or less, 97% or less, 96% or less, 95% or less, 94% or less, 93% or less, 92% or less, 91% or less, 90% or less, 89% or less, 88% or less, 87% or less, 86% or less, 85% or less, 84% or less, 83% or less, 82% or less, 81% or less, 80% or less, 79% or less, 78% or less, 77% or less, or 76% or less). The average transmittance of the substrate at one or more wavelengths front 350 nm to 1000 nm can range from any of the minimum values described above to any of the maximum valued described above. For example, the substrate can have an average transmittance of from 75% to 100% at one or more wavelengths from 350 nm to 1000 nm (e.g., from 75% to 87%, from 87% to 100%, from 75% to 80%, from 80% to 85%, from 85% to 90%, from 90% to 95%, from 95% to 100%, or from 80% to 95%).

Each of the holes in the first plurality of spaced-apart holes can have an average characteristic dimension. The term "characteristic dimension," as used herein, refers to the largest straight line distance spanning a hole in the plane of the layer (e.g., in the plane of the first layer that is substantially parallel to the first surface of the substrate). For example, in the case of a hole having a substantially circular shape in the plane of the layer, the characteristic dimension of the hole is the diameter of the hole. "Average characteristic dimension" and "mean characteristic dimension" are used interchangeably herein, and generally refer to the statistical mean characteristic dimension of the particles in a population of particles. The characteristic dimension can be measured using methods known in the art, such as evaluation by scanning electron microscopy, transmission electron microscopy, and/or atomic force microscopy.

For example, the first plurality of holes can have an average characteristic dimension of 20 nm or more (e.g., 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 550 nm or more, 600 nm or more, 650 nm or more, 700 nm or more, or 750 nm or more). In some examples, the first plurality of holes can have an average characteristic dimension of 800 nm or less (e.g., 750 nm or less, 700 nm or less, 650 nm or less, 600 nm or less, 550 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, or 30 nm or less). The average characteristic dimension of the first plurality of holes can range from any of the minimum values described above to any of the maximum values described above. For example, the first plurality of holes can have an average characteristic dimension of from 20 nm to 800 nm (e.g., from 20 nm to 400 nm, from 400 nm to 800 nm, from 20 nm to 200 nm, from 200 nm to 400 nm, from 400 nm to 600 nm, from 600 nm to 800 nm, or from 50 nm) to 700 nm).

In some examples, the first plurality of spaced-apart holes can be substantially monodisperse. "Monodisperse" and "homogeneous size distribution," as used herein, and generally describe a population of holes where all of the holes have the same or nearly the same characteristic dimension. As used herein, a monodisperse distribution refers to hole distributions in which 80% of the distribution (e.g., 85% of the distribution, 90% of the distribution, or 95% of the distribution) lies within 25% of the mean characteristic dimension (e.g., within 20% of the mean characteristic dimension, within 15% of the mean characteristic dimension, within 10% of the mean characteristic dimension, or within 5% of the mean characteristic dimension).

The first plurality of spaced apart holes can comprise holes of any shape (e.g., a sphere, a rod, an ellipsoid, a triangular prism, a pyramid, a polygon, a cylinder, a rectangular prism, etc.). In some examples, the first plurality of spaced-apart holes can have an isotropic shape. In some examples, the first plurality of spaced-apart holes can have an anisotropic shape. In some examples, each of the holes in the first plurality of spaced-apart holes is substantially cylindrical in shape, such that the diameter of each cylinder is the average characteristic dimension of each of the holes.

The first plurality of spaced apart holes comprise a first array defined by a first unit cell. As used herein, a "unit cell" is the smallest group of holes in the array that constitutes the repeating pattern of the array. The first unit cell can have a first principle axis and a second principle axis with a first included angle between the first principle axis and the second principle axis. The first array is built up of repetitive translations of the first unit cell along its principle axes.

The first principle axis of the first unit cell has a length that is the distance separating each hole in the first array from its neighboring, hole (edge to edge) along the first principle axis. In some examples, the length of the first principle axis in the first array can be 60 nm or more (e.g., 65 nm) or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, or 900 nm or more). In some examples, the length of the first principle axis in the first array can be 1000 nm or less (e.g., 900 nm or less, 800 nm or less, 700 nm or less, 600 nm or less, 500 nm or less, 450 nm or less, 400 nm or less, 350 nm or less, 300 nm or less, 275 nm or less, 250 nm or less, 225 nm or less, 200 nm or less, 175 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, or 70 nm or less). The length of the first principle axis in the first array can range from any of the minimum values described above to any of the maximum values described above. For example, the length of the first principle axis in the first array can be from 60 nm to 1000 nm (e.g., from 60 nm to 500 nm, from 500 nm to 1000 nm), from 60 nm to 200 nm, from 200 nm to 400 nm, from 400 nm to 600 nm, from 600 nm to 800 nm, from 800 nm to 1000 nm, or from 100 nm to 900 nm).

In some examples, the first plurality of holes can have an average characteristic dimension that is 40% of the length of the first principle axis in the first array or more (e.g., 45% or more, 50% or more, 55% or more, 60% or more, 65% or more, or 70% or more). In some examples, the first plurality of holes can have an average characteristic dimension that is 80% of the length of the first principle axis in the first array or less (e.g., 75% or less, 70% or less, 65% or less, 60% or less, 55% or less, or 50% or less), The average characteristic dimension of the first plurality of holes can range from any of the minimum values described above to any of the maximum values described above. For example, the first plurality of holes can have an average characteristic dimension that is from 40% to 80% of the length of the first principle axis in the first array (e.g., from 40% to 60%, from 60% to 80%, from 40% to 50%, from 50% to 60%, from 60% to 70%, from 70% to 80%, or from 45% to 75%).

The second principle axis of the first unit cell has a length that is the distance separating each hole in the first array from its neighboring hole (edge to edge) along the second principle axis. In some examples, the length of the second principle axis in the first array can be 60 nm or more (e.g., 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, or 900 nm or more). In some examples, the length of the second principle axis in the first array can be 1000 nm or less (e.g., 900 nm or less, 800 nm or less, 700 nm or less, 600 nm or less, 500 nm or less, 450 nm or less, 400 nm or less, 350 nm or less, 300 nm or less, 275 nm or less, 250 nm or less, 225 nm or less, 200 nm or less, 175 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, or 70 nm or less). The length of the second principle axis in the first array can range from any of the minimum values described above to any of the maximum values described above. For example, the length of the second principle axis in the first array can be from 60 nm to 1000 nm (e.g., from 60 nm to 500 nm, from 500 nm to 1000 nm, from 60 nm to 200 nm, from 200 nm to 400 nm, from 400 nm to 600 nm, from 600 nm to 800 nm, from 800 nm to 1000 nm, or from 100 nm to 900 nm). In some examples, the length of the first principle axis in the first array can be substantially the same as the length of the second principle axis in the first array.

In some examples, the first plurality f holes can have an average characteristic dimension that is 40% of the length of the second principle axis in the first array or more (e.g., 45% or more, 50% or more, 55% or more, 60% or more, 65% or more, or 70% or more). In some examples, the first plurality of holes can have an average characteristic dimension that is 80% of the length of the second principle axis in the first array or less (e.g., 75% or less, 70% or less, 65% or less, 60% or less, 55% or less, or 50% or less). The average characteristic dimension of the first plurality of holes can range from any of the minimum values described above to any of the maximum values described above. For example, the first plurality of holes can have an average characteristic dimension that is from 40% to 80% of the length of the second principle axis in the first array (e.g., from 40% to 60%, from 60% to 80%, from 40% to 50%, from 50% to 60%, from 60% to 70%, from 70% to 80%, or from 45% to 75%).

The first unit cell can be of any shape. In some examples, the first unit cell is in the shape of a triangle. In some examples, the first unit cell is in the shape of a quadrilateral (e.g., a rectangle, a parallelogram, or the like).

The first included angle between the first principle axis and the second principle axis of the first unit cell can, for example, be 45° or more (e.g., 50° or more, 55° or more, 60° or more, 65° or more, 70° or more, 75° or more, 80° or more, 85° or more, 90° or more, 95° or more, 100° or more, 105° or more, 110° or more, 115° or more, 120° or more, 125° or more, or 130° or more). In some examples, the first included angle between the first principle axis and the second principle axis of the first unit cell can be 135° or less (e.g., 130° or less, 125° or less, 120° or less, 115° or less, 110° or less, 105° or less, 100° or less, 95° or less, 90° or less, 85° or less, 80° or less, 75° or less, 70° or less, 65° or less, 60° or less, 55° or less, or 50° or less). The first included angle between the first principle axis and the second principle axis of the first unit cell can range from any of the minimum values described above to any of the maximum values described above. For example, the first included angle between the first principle axis and the second principle axis of the first unit cell can be from 45° to 135° (e.g., from 45° to 90°, from 90° to 135°, from 45° to 60°, from 60° to 75°, from 75° to 90°, from 90° to 105°, from 105° to 120°, from 120° to 135°, from 80° to 100°, or from 60° to 120°). In some examples, the first included angle is 90°.

The nanostructured plasmonic materials can further comprise second nanostructured layer. In some examples, the nanostructured layer can comprise a material that is not nanosized but has been modified with a nanowire, nanotube, nanoparticle, nanopore, or a combination thereof. The second nanostructured layer can comprise a second layer of a second plasmonic material permeated by a second plurality of spaced-apart holes.

Examples of plasmonic materials include, but are not limited to, plasmonic metals, plasmonic semiconductors (e.g., silicon carbide), doped semiconductors (e.g., aluminum-doped zinc oxide), transparent conducting oxides, perovskites, metal nitrides, silicides, germanides, two-dimensional plasmonic materials (e.g., graphene), and combinations thereof.

In some examples, the second plasmonic material can comprise a plasmonic metal. Examples of plasmonic metals include, but are not limited to Au, Ag, Pt, Pd, Cu, Cr, Al, and combinations thereof.

In some examples, the second plasmonic material comprise a plasmonic oxide material, for example a metal oxide. In some examples, the plasmonic oxide material can comprise a transparent conducting oxide material. Examples of plasmonic oxide materials include, but are not limited to, tungsten oxide, indium oxide, molybdenum oxide, tin-doped indium oxide (e.g., indium tin oxide, ITO), fluorine-doped tin oxide (FTO), indium-doped cadmium oxide (ICO), aluminum-doped zinc oxide (AZO), antimony-doped tin oxide (ATO), cesium tungsten oxide ($CsxWO_3$), and combinations thereof. Plasmonic oxide materials are further described, for example by Lounis et al. in The Journal of Physical Chemistry Letters, 2014, 5, 1564-1574, which is hereby incorporated herein by reference for its discussion of plasmonic oxide materials.

In some examples, the thickness of the second layer of the second plasmonic material can be 15 nm or more (e.g., 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the thickness of the second layer of the second plasmonic material can be 200 nm or less (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, or 25 nm or less). The thickness of the second layer of the second plasmonic material can range from any of the minimum values described above to any of the maximum values described above. For example, the thickness of the second layer of the second plasmonic material can be from 15 nm to 200 nm (e.g., from 15 nm to 100 nm, from 100 nm to 200 nm, from 15 nm to 50 nm, from 50 nm to 100 nm, from 100 nm to 150 nm, from 150 nm to 200 nm, or from 20 nm to 150 nm).

Each of the holes in the second plurality of spaced-apart holes can have an average characteristic dimension. The term "characteristic dimension," as used herein, refers to the largest straight line distance spanning a hole in the plane of the layer (e.g., in the plane of the second layer that is substantially parallel to the first surface of the substrate). For example, in the case of a hole having a substantially circular shape in the plane of the layer, the characteristic dimension of the hole is the diameter of the hole. "Average characteristic dimension" and "mean characteristic dimension" are used interchangeably herein, and generally refer to the statistical mean characteristic dimension of the particles in a population of particles. The characteristic dimension can be measured using methods known in the art, such as evaluation by scanning electron microscopy, transmission electron microscopy, and/or atomic force microscopy.

For example, the second plurality of holes can have an average characteristic dimension of 20 nm or more (e.g., 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 550 nm or more, 600 nm or more, 650 nm or more, 700 nm or more, or 750 nm or more). In some examples, the second plurality of holes can have an average characteristic dimension of 800 nm or less (e.g., 750 nm or less, 700 nm or less, 650 nm or less, 600 nm or less, 550 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, or 30 nm or less). The average characteristic dimension of the second plurality of holes can range from any of the minimum values described above to any of the maximum values described above. For example, the second plurality of holes can have an average characteristic dimension of from 20 nm to 800 nm (e.g., from 20 nm to 400 nm, from 400 nm to 800 nm, from 20 nm to 200 nm, from 200 nm to 400 nm, from 400 nm to 600 nm, from 600 nm to 800 nm, or from 50 nm to 700 nm).

In some examples, the second plurality of spaced-apart holes can be substantially monodisperse. "Monodisperse" and "homogeneous size distribution," as used herein, and generally describe a population of holes where all of the holes have the same or nearly the same characteristic dimension. As used herein, a monodisperse distribution refers to hole distributions in which 80% of the distribution (e.g., 85% of the distribution, 90% of the distribution, or 95% of the distribution) lies within 25% of the mean characteristic dimension (e.g., within 20% of the mean characteristic dimension, within 15% of the mean characteristic dimension, within 10% of the mean characteristic dimension, or within 5% of the mean characteristic dimension).

The second plurality of spaced apart holes can comprise holes of any shape (e.g., a sphere, a rod, an ellipsoid, a triangular prism, a pyramid, a polygon, a cylinder, a rectangular prism, etc.). In some examples, the second plurality of spaced-apart holes can have an isotropic shape. In some examples, the second plurality of spaced-apart holes can have an anisotropic shape. In some examples, each of the holes in the second plurality of spaced-apart holes is substantially cylindrical in shape, such that the diameter of each cylinder is the average characteristic dimension of each of the holes.

The second plurality of spaced apart holes comprise a second array defined by a second unit cell. As used herein, a "unit cell" is the smallest group of holes in the array that constitutes the repeating pattern of the array. The second unit cell can have a first principle axis and a second principle axis with a second included angle between the first principle axis and the second principle axis. The second array is built up of repetitive translations of the second unit cell along its principle axes.

The first principle axis of the second unit cell has a length that is the distance separating each hole in the second array from its neighboring hole (edge to edge) along the first principle axis. In some examples, the length of the first principle axis in the second array can be 60 nm or more (e.g., 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, or 900 nm or more). In some examples, the length of the first principle axis in the second array can be 1000 nm or less (e.g., 900 nm or less, 800 nm or less, 700 nm or less, 600 nm or less, 500 nm or less, 450 nm or less, 400 nm or less, 350 nm or less, 300 nm or less, 275 nm or less, 250 nm or less, 225 nm or less, 200 nm or less, 175 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, or 70 nm or less). The length of the first principle axis in the second array can range from any of the minimum values described above to any of the maximum values described above. For example, the length of the first principle axis in the second array can be from 60 nm to 1000 nm (e.g., from 60 nm to 500 nm, from 500 nm to 1000 nm, from 60 nm to 200 nm, from 200 nm to 400 nm, from 400 nm to 600 nm, from 600 nm to 800 nm, from 800 nm to 1000 nm, or from 100 nm to 900 nm). In some examples, the length of the first principle axis in the first array can be substantially the same as the length of the first principle axis in the second array.

In some examples, the second plurality of holes can have an average characteristic dimension that is 40% of the length of the first principle axis in the second array or more (e.g., 45% or more, 50% or more, 55% or more, 60% or more, 65% or more, or 70% or more). In some examples, the second plurality of holes can have an average characteristic dimension that is 80% of the length of the first principle axis in the second array or less (e.g., 75% or less, 70% or less, 65% or less, 60% or less, 55% or less, or 50% or less). The average characteristic dimension of the second plurality of holes can range from any of the minimum values described above to any of the maximum values described above. For example, the second plurality of holes can have an average characteristic dimension that is from 40% to 80% of the length of the first principle axis in the second array (e.g., from 40% to 60%, from 60% to 80%, from 40% to 50%, from 50% to 60%, from 60% to 70%, from 70% to 80%, or from 45% to 75%).

The second principle axis of the second unit cell has a length that is the distance separating each hole in the second array from its neighboring hole (edge to edge) along the second principle axis. In some examples, the length of the second principle axis in the second array can be 60 nm or more (e.g., 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, or 900 nm or more). In some examples, the length of the second principle axis in the second array can be 1000 nm or less (e.g., 900 nm or less, 800 nm or less, 700 nm or less, 600 nm or less, 500 nm or less, 450 nm or less, 400 nm or less, 350 nm or less, 300 nm or less, 275 nm or less, 250 nm or less, 225 nm or less, 200 nm or less, 175 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, or 70 nm or less). The length of the second principle axis in the second array can range from any of the minimum values described above to any of the maximum values described above. For example, the length of the second principle axis in the second array can be from 60 nm to 1000 nm (e.g., from 60 nm to 500 nm, from 500 nm to 1000 nm, from 60 nm to 200 nm, from 200 nm to 400 nm, from 400 nm to 600 nm, from 600 nm to 800 nm, from 800 nm to 1000 nm, or from 100 nm to 900 nm). In some examples, the length of the second principle axis in the second array can be substantially the same as the length of the first principle axis in the second array. In some examples, the length of the second principle axis in the second array can be substantially the same as the length of the second principle axis in the first array. In some examples, the length of the first principle axis in the first array, the length of the second principle axis in the first array, the length of the first principle axis in the second array, and the length of the second principle axis in the second array are substantially the same.

In some examples, the second plurality of holes can have an average characteristic dimension that is 40% of the length of the second principle axis in the second array or more (e.g., 45% or more, 50% or more, 55% or more, 60% or more, 65% or more, or 70% or more). In some examples, the second plurality of holes can have an average characteristic dimension that is 80% of the length of the second principle axis in the second array or less (e.g., 75% or less, 70% or less, 65% or less, 60% or less, 55% or less, or 50% or less). The average characteristic dimension of the second plurality of holes can range from any of the minimum values described above to any of the maximum values described above. For example, the second plurality of holes can have an average characteristic dimension that is from 40% to 80% of the length of the second principle axis in the second array (e.g., from 40% to 60%, from 60% to 80%, from 40% to 50%, from 50% to 60%, from 60% to 70%, from 70% to 80%, or from 45% to 75%).

The second unit cell can be of any shape. In some examples, the second unit cell is in the shape of a triangle. In some examples, the second unit cell is in the shape of a quadrilateral (e.g., a rectangle, a parallelogram, or the like).

The second included angle between the first principle axis and the second principle axis of the second unit cell can, for example, be 45° or more (e.g., 50° or more, 55° or more, 60° or more, 65° or more, 70° or more, 75° or more, 80° or more, 85° or more, 90° or more, 95° or more, 100° or more, 105° or more, 110° or more, 115° or more, 120° or more, 125° or more, or 130° or more). In some examples, the second included angle between the first principle axis and the second principle axis of the second unit cell can be 135° or less (e.g., 130° or less, 125° or less, 120° or less, 115° or less, 110° or less, 105° or less, 100° or less, 95° or less, 90° or less, 85° or less, 80° or less, 75° or less, 70° or less, 65° or less, 60° or less, 55° or less, or 50° or less). The second included angle between the first principle axis and the second principle axis of the second unit cell can range from any of the minimum values described above to any of the maximum values described above. For example, the second included angle between the first principle axis and the second principle axis of the second unit cell can be from 45° to 135° (e.g., from 45° to 90°, from 90° to 135°, from 45° to 60°, from 60° to 75°, from 75° to 90°, from 90° to 105°, from 105° to 120°, from 120° to 135°, from 80° to 100° or from 60° to 120°). In some examples, the second included angle is 90°.

In some examples, the first nanostructured layer and the second nanostructured layer can be substantially the same.

The first nanostructured layer is located proximate the second nanostructured layer and the first principle axis of the first array is rotated at a rotation angle compared to the first principle axis of the second array. The rotation angle can, for example, be 1° or more (e.g., 2° or more, 3° or more, 4° or more, 5° or more, 6° or more, 7° or more, 8° or more, 9° or more, 10° or more, 15° or more, 20° or more, 25° or more, 30° or more, 35° or more, 40° or more, 45° or more, 50° or more, 55° or more, 60° or more, 65° or more, 70° or more, 75° or more, or 80° or more). In some examples, the rotation angle can be 90° or less (e.g., 85° or less, 80° or less, 75° or less, 70° or less, 65° or less, 60° or less, 55° or less, 50° or less, 45° or less, 40° or less, 35° or less, 30° or less, 25° or less, 20° or less, 15° or less, 10° or less, 9° or less, 8° or less, 7° or less, 6° or less, or 5° or less). The rotation angle can range from any of the minimum values described above to any of the maximum values described above. For example, the rotation angle can be from 1° to 90° (e.g., from 1° to 45°, from 45° to 90°, from 1° to 30°, from 30° to 60°, from 60° to 90°, or from 5° to 85°).

In some examples, the second nanostructured layer is disposed on (e.g., in contact with) the first nanostructured layer. In some examples, the nanostructured plasmonic material further comprises a third layer located between the first nanostructured layer and the second nanostructured layer and in contact with first nanostructured layer and the second nanostructured layer. The third layer can, for example, comprise a dielectric material. In some examples, the third layer can comprise glass, quartz, silicon dioxide, silicon nitride, a polymer, a hydrogel, a combination thereof.

The third layer can, for example, have a thickness of 1 nm or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, or 90 nm or more). In some examples, the thickness of the third layer can be 100 nm of less (e.g., 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The thickness of the third layer can range from any of the minimum values described above to any of the maximum values described above. For example, the thickness of the third layer can be from 1 nm to 100 nm (e.g., from 1 nm to 50 nm, from 50 nm to 100 nm, from 1 nm to 20 nm, from 20 nm to 40 nm, from 40 nm to 60 nm, from 60 nm to 80 nm, from 80 nm to 100 nm, or from 5 nm to 90 nm).

The thickness of the first nanostructured layer, the thickness of the second nanostructured layer, the presence of the third layer, the thickness of the third layer (if present), the average characteristic dimension of the first plurality of holes and/or the second plurality of holes, the composition of the first layer of the first plasmonic material, the composition of the second layer of the second plasmonic material, the separation between each hole within the first array and/or the second array (e.g., the length of the first principle axis and/or the second principle axis in the first array and/or the second array), the first included angle, the second included angle, the rotation angle, or combination thereof can be selected in view of a variety of factors, for example to affect the optical properties of the nanostructured plasmonic material.

Methods of Making

Also disclosed herein are methods of making the nanostructured plasmonic materials described herein. For example, the nanostructured plasmonic materials described herein can be made by methods comprising: forming the first nanostructured layer; forming the second nanostructured layer; and disposing the second nanostructured layer on the first nanostructured layer or on the third layer such that the first principle axis of the first array is rotated at a rotation angle compared to the first principle axis of the second array, thereby forming the nanostructured plasmonic material.

Forming the first nanostructured layer and/or the second nanostructured layer can, for example, comprise electron beam lithography, nanoimprinting, nanosphere lithography, focused ion beam lithography, injection molding, block copolymer lithography, photolithography, or a combination thereof.

Disposing the second nanostructured layer on the first nanostructured layer or on the third layer can, for example, comprise dip coating, spin coating, pick-up of floating layers, and combinations thereof.

Methods of Use

Also disclosed herein are methods of use of the nanostructured plasmonic materials described herein. In some examples, the methods described herein comprise circular dichroism measurements. In some examples, the method of use comprises using the nanostructured plasmonic material as a chiral sensor, for example for enantiodiscrimination. In some examples the method of use can comprise: contacting the nanostructured plasmonic material with a sample, wherein the sample comprises an analyte; applying circularly polarized light to the sample and the nanostructured plasmonic material; capturing an electromagnetic signal from the sample, the nanostructured plasmonic material, or a combination thereof, wherein the circularly polarized light passes through both the sample and the nanostructured plasmonic material before being captured; and processing the electromagnetic signal to determine a property of the sample.

The analyte can, for example, comprise a chiral molecule. In some examples, the analyte can comprise a biomolecule, a macromolecule, a virus, a drug, or a combination thereof. As used herein, a biomolecule can comprise, for example, a nucleotide, an enzyme, an amino acid, a protein, a polysaccharide, a lipid, a nucleic acid, a vitamin, a hormone, a polypeptide, DNA, or a combination thereof. In other examples, the chiral molecule can be a macromolecule, such as a cyclodextrins, calixarenes, cucurbiturils, crown ethers, cyclophanes, cryptands, nanotubes, fullerenes, and dendrimers. In some examples, the analyte can comprise Concanavalin A, R-thalidomide, S-thalidomide, or a combination thereof.

In some examples, the analyte can comprise a drug. Examples of chiral drugs include, but are not limited to, acebutolol, acenocoumarol, alprenolol, alacepril, albuterol, almeterol, alogliptin, amoxicillin, amphetamine, ampicillin, arformoterol, armodafinil, atamestane, atenolol, atorvastatin, azlocillin, aztreonam, benazepril, benoxaprophen, benzylpenicillin, betaxolol, bupivacaine, calstran, captopril, carvedilol, cefalexin, cefaloglycin, cefamandole, cefapirin, cefazaflur, cefonicid, ceforanide, cefpimizole, cefradine, cefroxadine, ceftezole, cefuroxime, cetirizine, cilazapril, citalopram, cloxacillin, cyclophosphamide, delapril, deprenyl, dexbrompheniramine, dexchlorpheniramine, dexfenfluramine, dexibuprofen, dexketoprofen, dexlansoprazole, dexmedetomidine, dexmethylphenidate, dexpramipexole, dexrazoxane, dextroamphetamine, dextromethorphan, dextrorphan, dicloxacillin, diltiazem, disopyramide, drospirenone, enalapril, epicillin, escitalopram, escitazolam, esketamine, eslicarbazepine acetate, esmirtazapine, esomeprazole, esreboxetine, eszopiclone, ethambutol, ethosuximide, exemestane, felodipine, fenprofen, fimasartan, flecainide, flucloxacillin, fluoxetine, gestonorone, hexobarbitol, ibuprofen, idapril, imipenem, irinotecan hydrochloride, isoflurane, ketoprofen, ketamine, labetalol, lansoprazole, levacetylmethadol, levetiracetam, levoamphetamine, levobetaxolol, levobupivacaine, levalbuterol, levocetirizine, levofenfluramine, levofloxacin, levomethamphetamine, levomethorphan, levomilnacipran, levonorgestrel, levopropylhexedrine, levorphanol, levosalbutamol, levosulpiride, levoverbenone, lisinopril, loratadine, lorazepam, mandipine, mecillinam, mephenytoine, mephobarbital, meropenem, methadone, methamphetamine, methorphan, methylphenidate, metoprolol, mezlocillin, milnacipran, modafinil, moexipril, moxalactam, naproxen, nicardipine, nimodipine, nisoldipine, norpseudoephedrine, ofloxacin, omeprazole, oxacillin, oxazepam, pantoprazole, penbutolol, penicillamine, penicillin, perindopril, pentobarbital, phenoxymethylpenicillin, pindolol, piperacillin, prilocaine, propafenone, propanolol, quinapril, ramipril, rentiapril, salbutamol, secobarbital, selegiline, spirapril, sotalol, temazepam, terfenadine, terbutaline, thalidomide, thiohexital, thiopental, timolol, tocainide, trandolapril, verapamil, varvedilol, warfarine, zofenopril, zopiclone, and combinations thereof.

In some examples, the sample can comprise 100 picograms of the analyte or more (e.g., 110 picograms or more, 120 picograms or more, 130 picograms or more, 140 picograms or more, 150 picograms or more, 175 picograms or more, 200 picograms or more, 225 picograms or more, 250 picograms or more, 275 picograms or more, 300 picograms or more, 350 picograms or more, 400 picograms or more, 450 picograms or more, 500 picograms or more, 550 picograms or more, 600 picograms or more, 650 picograms or more, 700 picograms or more, 750 picograms or more, 800 picograms or more, 850 picograms or more, 900 picograms or more, 950 picograms or more, or 1 nanogram or more). In some examples, the sample can comprise 4 nanograms of the analyte or less (e.g., 3 nanograms or less, 2 nanograms or less, 1 nanograms or less, 950 picograms or less, 900 picograms or less, 850 picograms or less, 800 picograms or less, 750 picograms or less, 700 picograms or less, 650 picograms or less, 600 picograms or less, 550 picograms or less, 500 picograms or less, 450 picograms or less, 400 picograms or less, 350 picograms or less, 300 picograms or less, 275 picograms or less, 250 picograms or less, 225 picograms or less, 200 picograms or less, 175 picograms or less, 150 picograms or less, 140 picograms or less, 130 picograms or less, or 120 picograms or less). The amount of analyte in the sample can range from any of the minimum values described above to any of the maximum values described above. For example, the sample can comprise from 100 picograms to 4 nanograms of the analyte (e.g., from 100 picograms to 500 picograms, from 500 picograms to 4 nanograms, from 100 picograms to 250 picograms, from 250 picograms to 500 picograms, from 500 picograms to 750 picograms, from 750 picograms to 4 nanograms, from 100 picograms to 1 nanogram, from 100 picograms to 750 picograms, or from 100 picograms to 400 picograms).

In some examples, the circularly polarized light can comprise circularly polarized light at one or more wavelength from 400 nm to 2000 nm. In some examples, the circularly polarized light can comprise right circularly polarized light, left circularly polarized light, or a combination thereof. The light can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers, etc.).

In some examples, applying the circularly polarized light to the sample and the nanostructured plasmonic material; capturing an electromagnetic signal from the sample, the nanostructured plasmonic material, or a combination thereof; and processing the electromagnetic signal can comprise performing circular dichroism spectroscopy, and can be performed using standard spectroscopy techniques and instrumentation known in the art.

The methods described herein can be used to determine a wide variety of properties of the sample that can provide quantitative and/or qualitative information about the sample and/or the analyte. The property of the sample can, for example, comprise the chirality of the analyte, the presence of chiral analyte, the circular dichroism of sample, the concentration of the analyte in the sample, or a combination thereof.

Systems

Figure 1:
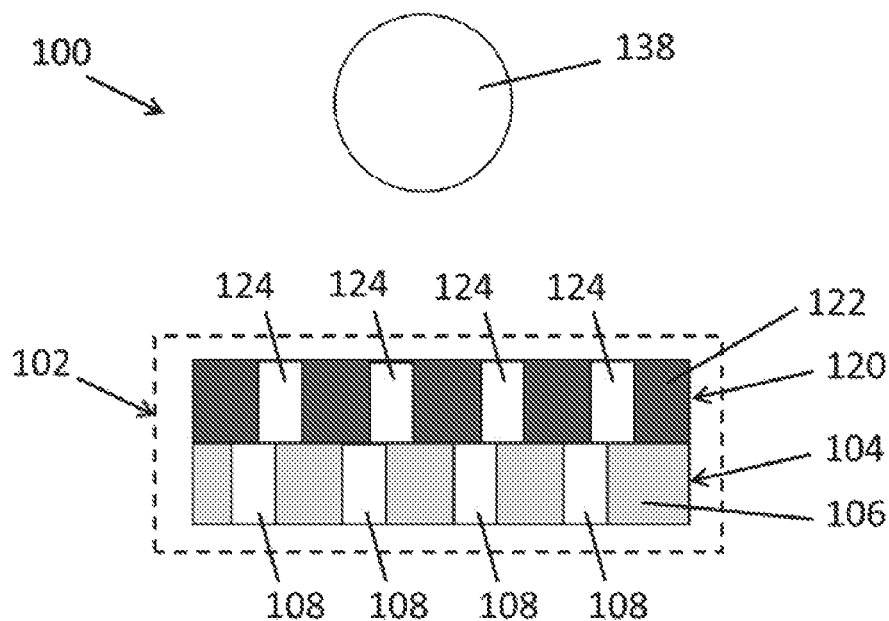
FIG. 1 is a schematic of an exemplary system as disclosed herein.

Also disclosed herein are systems comprising the nanostructured plasmonic materials described herein. Referring now to FIG. 1, the systems 100 can comprise a nanostructured plasmonic material 102 and a light source 138 configured to illuminate the nanostructured plasmonic material 102 with circularly polarized light.

The light source 138 can be any type of light source. Examples of suitable light sources include natural light sources (e.g., sunlight) and artificial light sources (e.g., incandescent light bulbs, light emitting diodes, gas discharge lamps, arc lamps, lasers, etc.). In some examples, the light source 138 comprises an artificial light source. In some examples, light source 138 comprises a white light source.

The nanostructured plasmonic material 102 comprises: a first nanostructured layer 104 comprising a first layer of a first plasmonic material 106 permeated by a first plurality of spaced-apart holes 108, and a second nanostructured layer 120 comprising a second layer of a second plasmonic material 122 permeated by a second plurality of spaced-apart holes 124.

Figure 2:
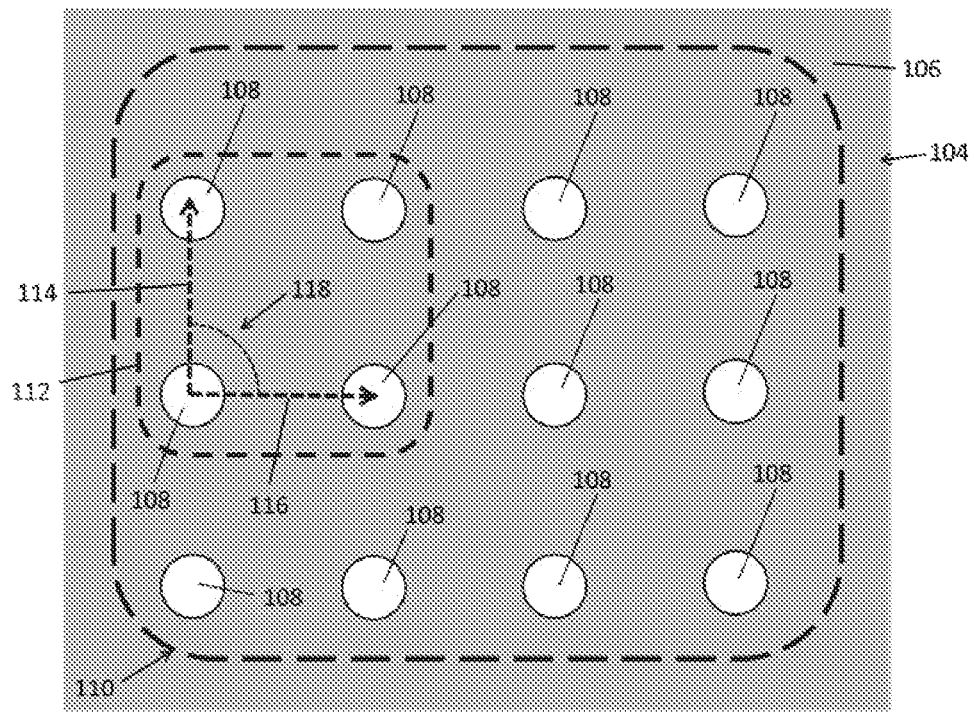
FIG. 2 is a schematic of an exemplary array as disclosed herein.
Figure 3:
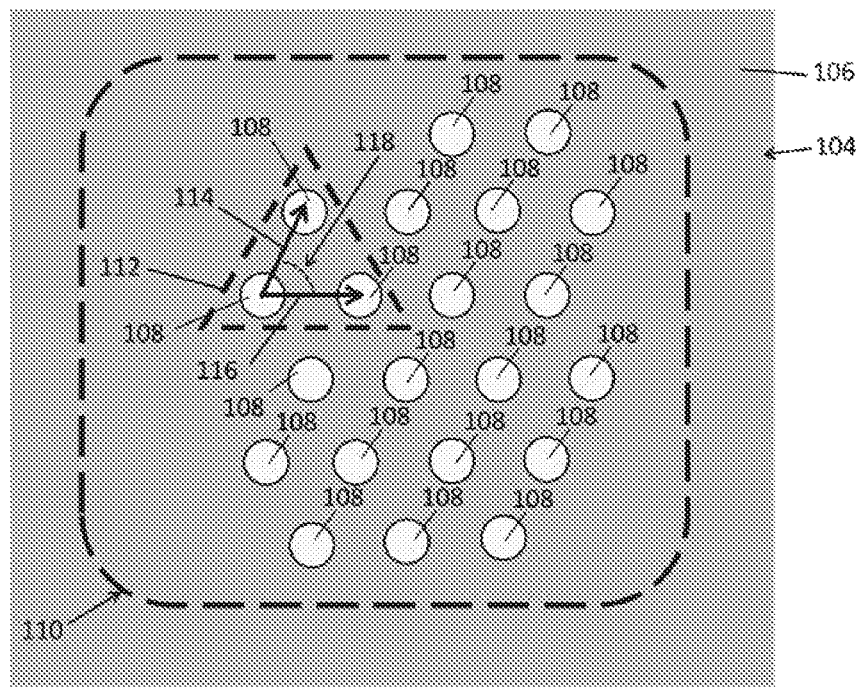
FIG. 3 is a schematic of an exemplary array as disclosed herein.

Referring now to FIG. 2 and FIG. 3, the first plurality of spaced apart holes 108 comprise a first array 110 defined by a first unit cell 112, the first unit cell 112 having: a first principle axis 114 and a second principle axis 116 with a first included angle 118 between the first principle axis 114 and the second principle axis 116; wherein the first principle axis 114 has a length that is the distance separating each hole in the first array 110 from its neighboring hole (edge to edge) along the first principle axis 114; and wherein the second principle axis 116 has a length that is the distance separating each hole in the first array 110 from its neighboring hole (edge to edge) along the second principle axis 116. Referring now to FIG. 2, in some examples, the first unit cell 112 can be in the shape of a rectangle. Referring now to FIG. 3, in some examples, the first unit cell 112 can be in the shape of a triangle.

Figure 4:
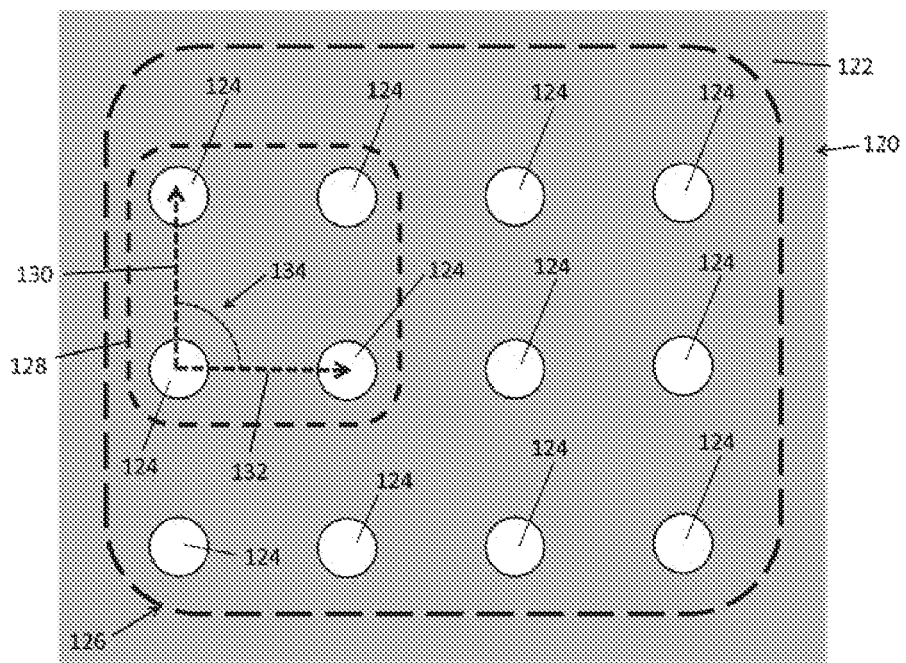
FIG. 4 is a schematic of an exemplary array as disclosed herein.
Figure 5:
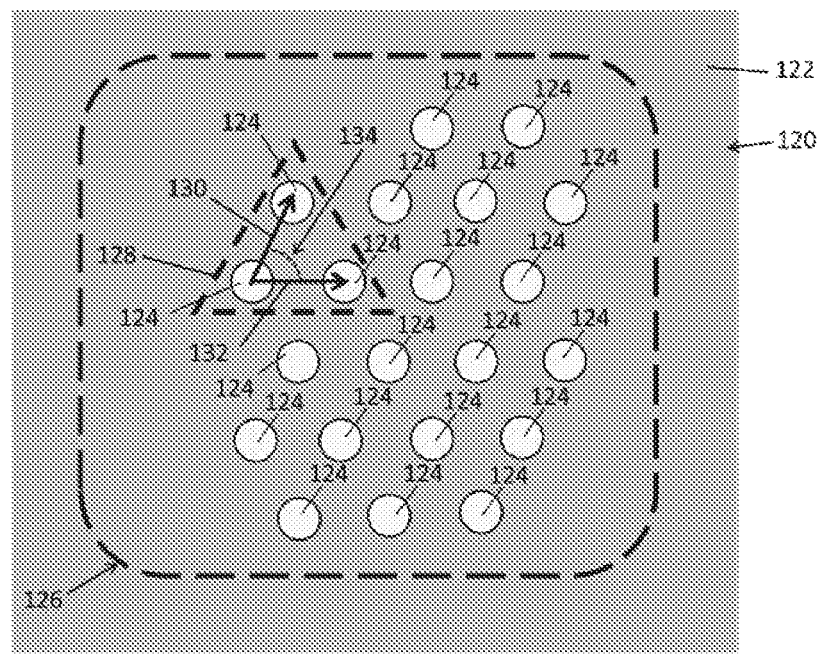
FIG. 5 is a schematic of an exemplary array as disclosed herein.

Referring now to FIG. 4 and FIG. 5, the second plurality of spaced apart holes 124 comprise a second array 126 defined by a second unit cell 128, the second unit cell 128 having: a first principle axis 130 and a second principle axis 132 with a second included angle 134 between the first principle axis 130 and the second principle axis 132; wherein the first principle axis 130 has a length that is the distance separating each hole in the second array 126 from its neighboring hole (edge to edge) along the first principle axis 130; and wherein the second principle axis 132 has a length that is the distance separating each hole in the second array 126 from its neighboring hole (edge to edge) along the second principle axis 132. Referring now to FIG. 4, in some examples, the second unit cell 128 can be in the shape of a rectangle. Referring now to FIG. 5, in some examples, the second unit cell 128 can be in the shape of a triangle.

In some examples, the first nanostructured layer 104 and the second nanostructured layer 120 are substantially the same.

Figure 6:
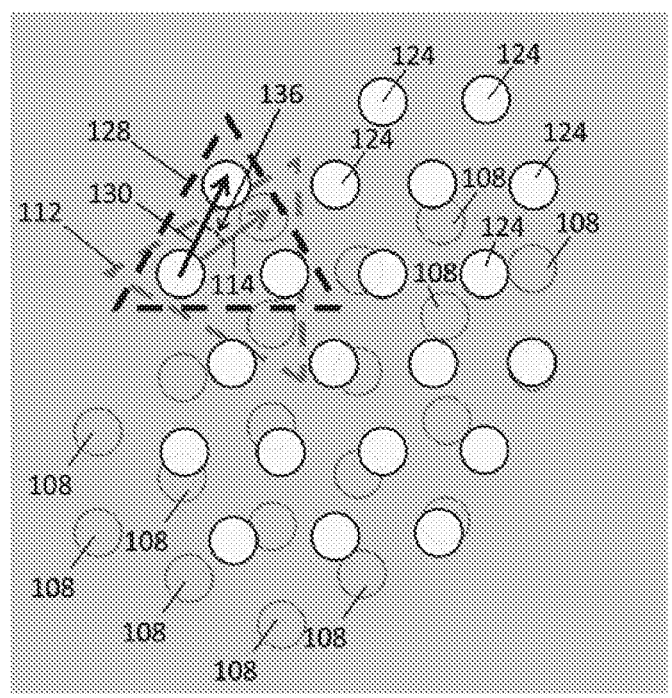
FIG. 6 is a schematic of an exemplary nanostructured plasmonic material as disclosed herein.

Referring now to FIG. 6, the second nanostructured layer 120 is located proximate the first nanostructured layer 104 and the first principle axis 114 of the first unit cell 112 is rotated at a rotation angle 136 compared to the first principle axis 130 of the second unit cell 128. In some examples, the second nanostructured layer 120 is disposed on the first nanostructured layer 104.

Figure 7:
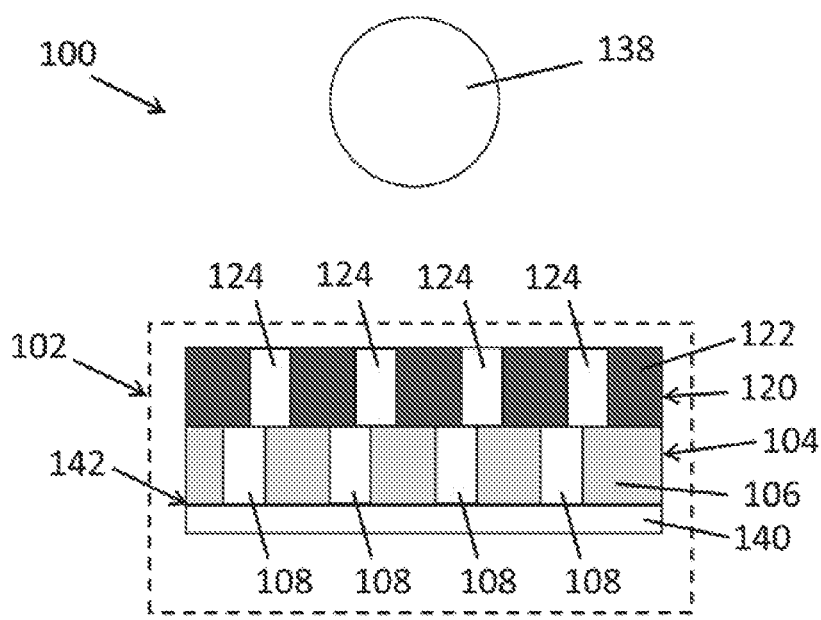
FIG. 7 is a schematic of an exemplary system as disclosed herein.

Referring now to FIG. 7, in some examples, the nanostructured plasmonic material can further comprise a substrate 140 having a first surface 142, wherein the first nanostructured layer 104 is disposed on the first surface 142.

Figure 8:
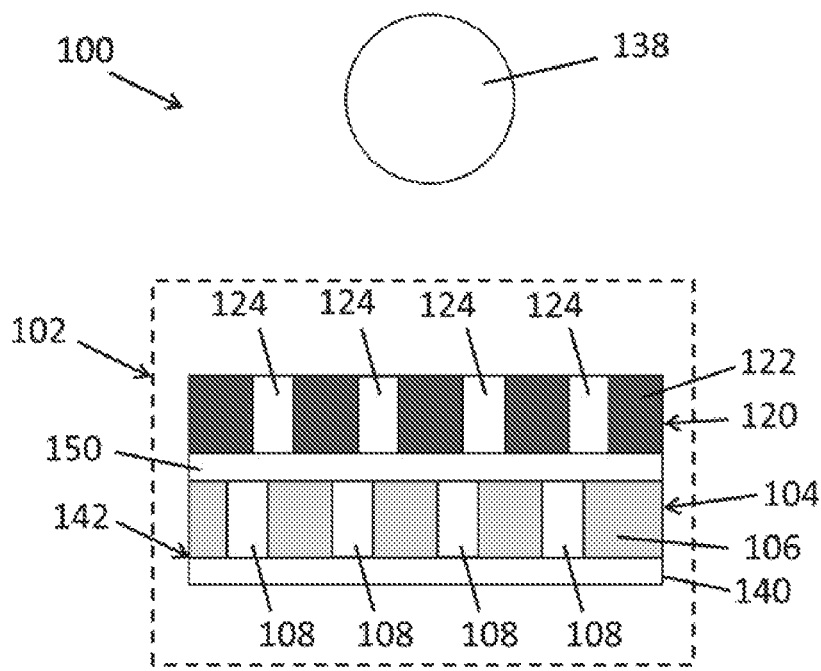
FIG. 8 is a schematic of an exemplary system as disclosed herein.

Referring now to FIG. 8, in some examples, the nanostructured plasmonic material 102 further comprises a third layer 150 located between the first nanostructured layer 104 and the second nanostructured layer 120 and in contact with the first nanostructured layer 104 and the second nanostructured layer 120.

Figure 9:
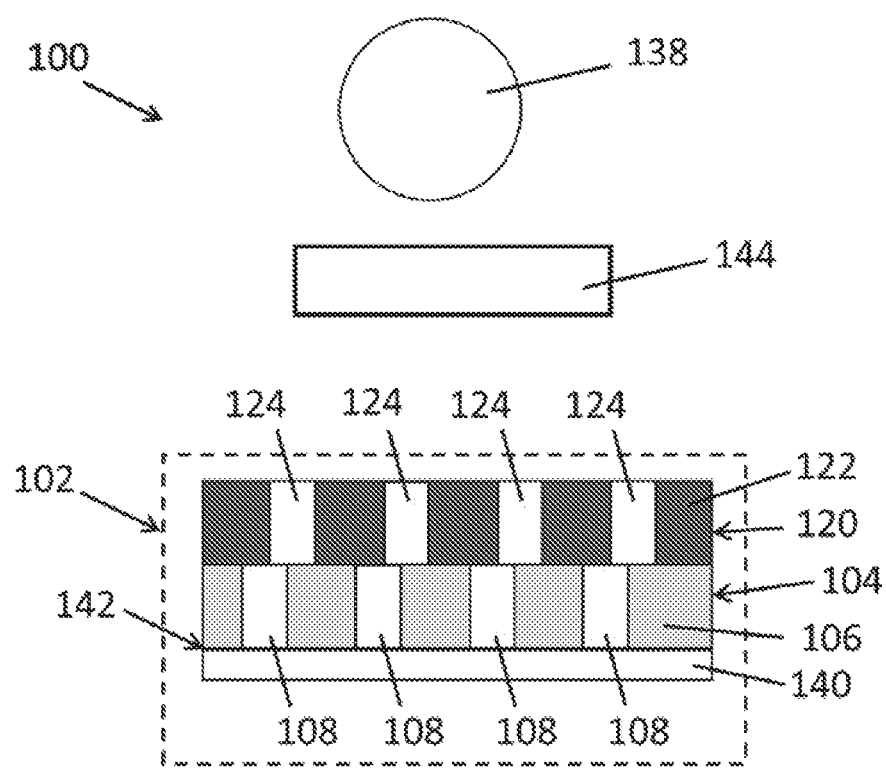
FIG. 9 is a schematic of an exemplary system as disclosed herein.

In some examples, the system 100 can further comprise a polarizer 144 configured to circularly polarize the light from the light source 138. Referring now to FIG. 9, the system 100 can, for example, be aligned such that the polarizer 144 is between the light source 138 and the nanostructured plasmonic material 102. The polarizer 144 can, for example, be a circular polarizer configured to circularly polarize the light from the light source 138. In some examples, the circular polarizer can comprise a linear polarizer and a quarter wave-plate.

Figure 10:
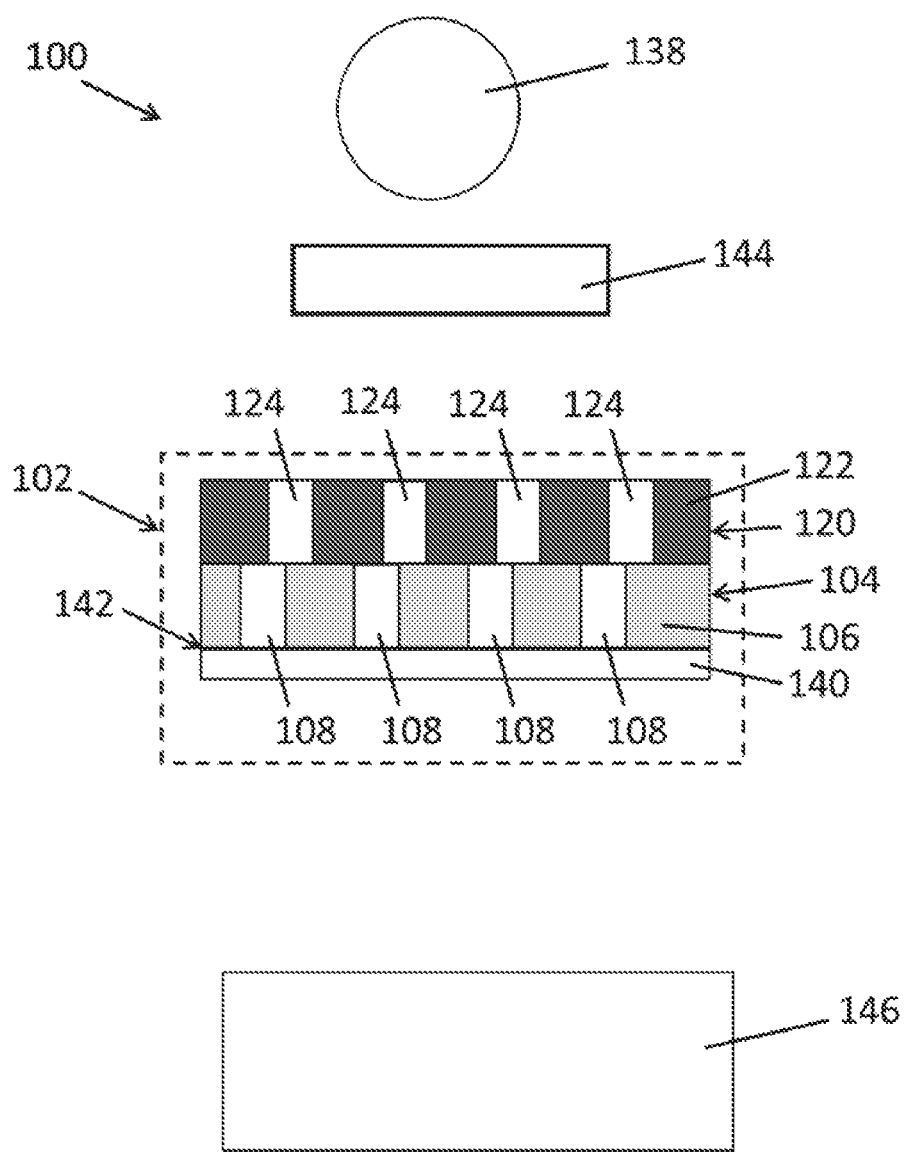
FIG. 10 is a schematic of an exemplary system as disclosed herein.

In some examples, the system 100 can further comprise an instrument 146 configured to capture an electromagnetic signal from the nanostructured plasmonic material 102. Referring now to FIG. 10, the system 100 can, for example, be aligned such that the polarizer 144 is between the light source 138 and the nanostructured plasmonic material 102, and the nanostructured plasmonic material 102 is between the polarizer 144 and the instrument 146. The instrument 146 can, for example, comprise a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

Figure 11:
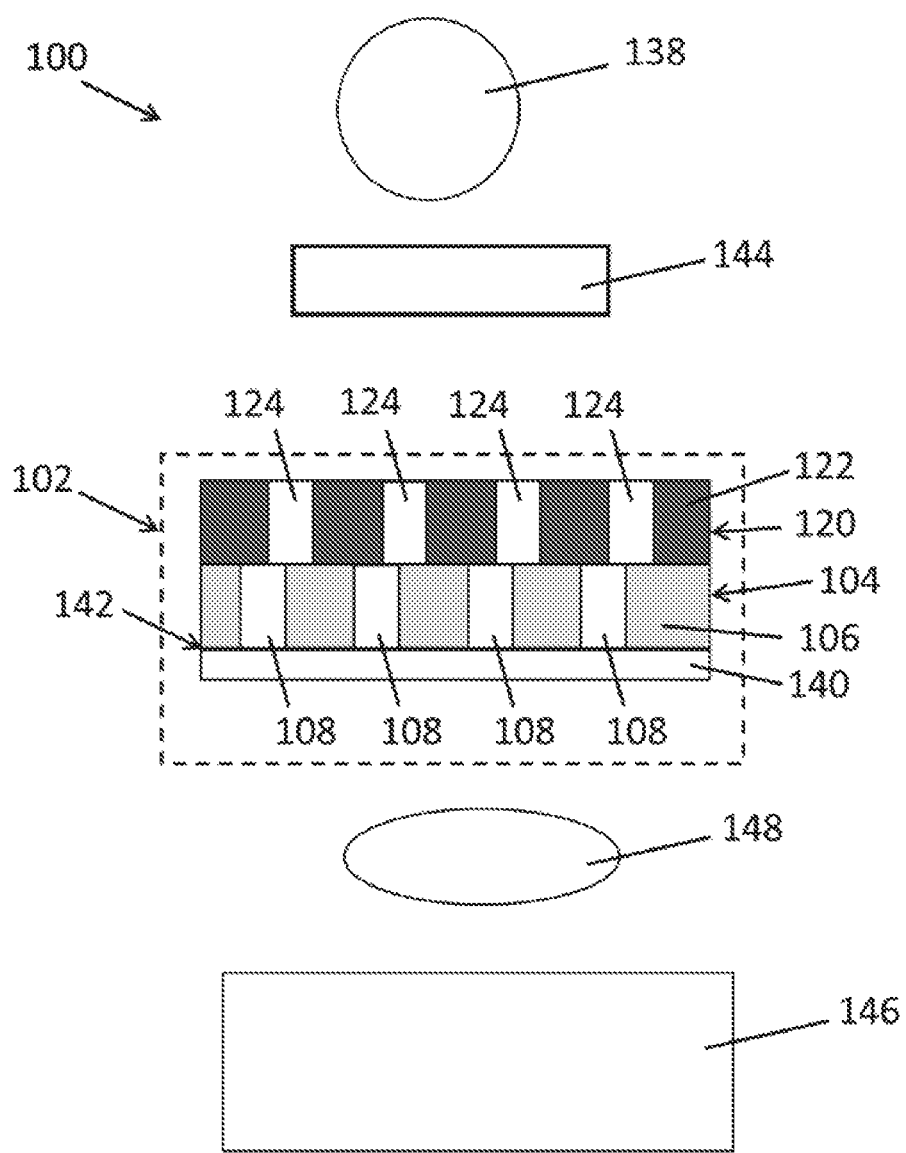
FIG. 11 is a schematic of an exemplary system as disclosed herein.

In some examples, the system 100 can further comprise a lens 148. Referring now to FIG. 11, the system 100 can, for example, be aligned such that the polarizer 144 is between the light source 138 and the nanostructured plasmonic material, the nanostructured plasmonic material 102 is between the polarizer 144 and the lens 148, and the lens 148 is between the nanostructured plasmonic material 102 and the instrument 146. The lens can be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

In some examples, the systems 100 can further comprise a means for translocating the nanostructured plasmonic material 102, the first nanostructured layer 104, the second nanostructured layer 120, the substrate 140, the light source 138, the third layer 150, or a combination thereof. As used herein translocating refers to any type of movement about any axis (e.g., rotation, translation, etc.) In other words, as used herein, translocation refers to a change in position and/or orientation.

Figure 12:
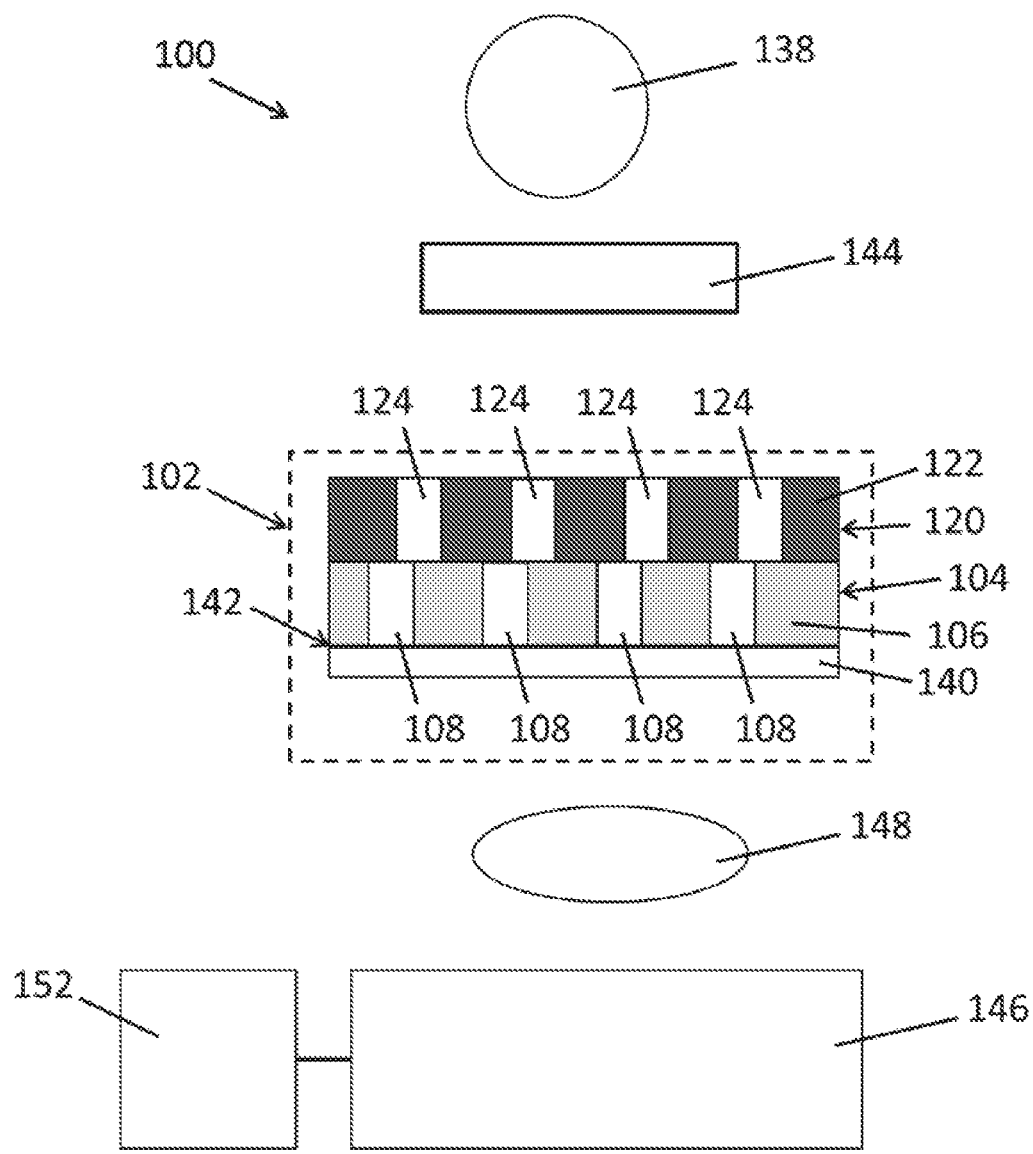
FIG. 12 is a schematic of an exemplary system as disclosed herein.

In some examples, the systems 100, can further comprise a computing device 152 configured to receive and process electromagnetic signals from the instrument 146, for example as shown in FIG. 12.

Figure 13:
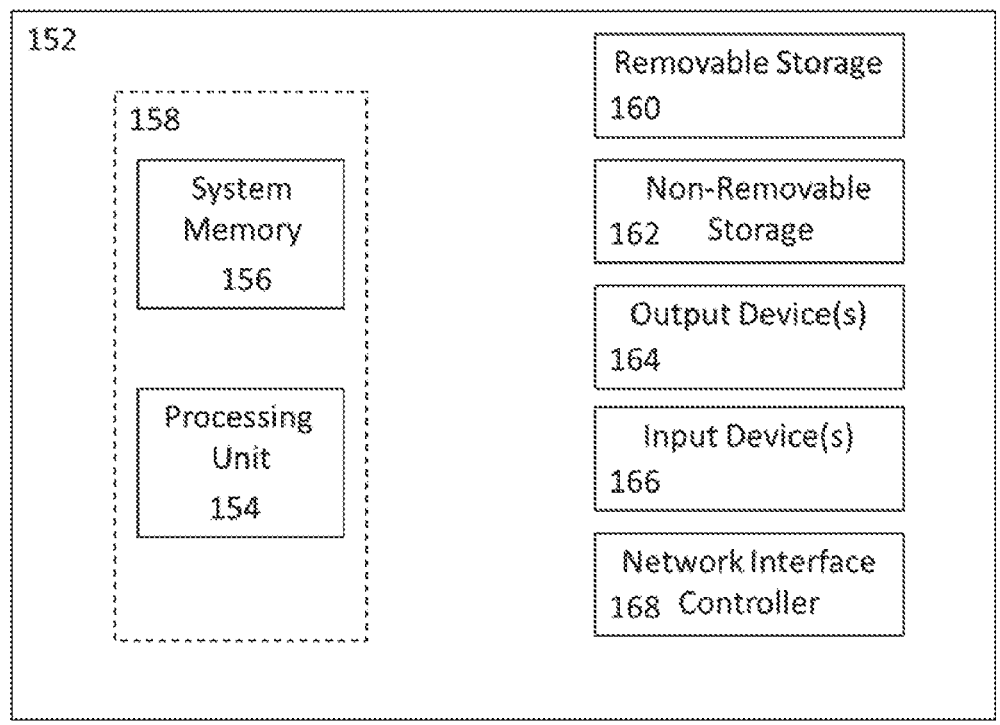
FIG. 13 is a schematic of an exemplary computing device.

FIG. 13 illustrates an example computing device 152 upon which examples disclosed herein may be implemented. The computing device 152 can include a bus or other communication mechanism for communicating information among various components of the computing device 152. In its most basic configuration, computing device 152 typically includes at least one processing unit 154 (a processor) and system memory 156. Depending on the exact configuration and type of computing device, system memory 156 may be volatile (such as random access memory (RAM)), non-volatile (such as read-only memory (ROM), flash memory, etc.), or some combination of the two. This most basic configuration is illustrated in FIG. 13 by a dashed line 158. The processing unit 154 may be a standard programmable processor that performs arithmetic and logic operations necessary for operation of the computing device 152.

The computing device 152 can have additional features/functionality. For example, computing device 152 may include additional storage such as removable storage 160 and non-removable storage 162 including, but not limited to, magnetic or optical disks or tapes. The computing device 152 can also contain network connection(s) 168 that allow the device to communicate with other devices. The computing device 152 can also have input device(s) 166 such as a keyboard, mouse, touch screen, antenna or other systems configured to communicate with the camera in the system described above, etc. Output device(s) 164 such as a display, speakers, printer, etc. may also be included. The additional devices can be connected to the bus in order to facilitate communication of data among the components of the computing device 152.

The processing unit 154 can be configured to execute program code encoded in tangible, computer-readable media. Computer-readable media refers to any media that is capable of providing data that causes the computing device 152 (i.e., a machine) to operate in a particular fashion. Various computer-readable media can be utilized to provide instructions to the processing unit 154 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 154 can execute program code stored in the system memory 156. For example, the bus can carry data to the system memory 156, from which the processing unit 154 receives and executes instructions. The data received by the system memory 156 can optionally be stored on the removable storage 160 or the non-removable storage 162 before or after execution by the processing unit 154.

The computing device 152 typically includes a variety of computer-readable media. Computer-readable media can be any available media that can be accessed by device and includes both volatile and non-volatile media, removable and non-removable media. Computer storage media include volatile and non-volatile, and removable and non-removable media implemented in any method or technology for storage of information such as computer readable instructions, data structures, program modules or other data. System memory 156, removable storage 160, and non-removable storage 162 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 152. Any such computer storage media can be part of computing device 152.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, the system memory 156 comprises computer-executable instructions stored thereon that, when executed by the processor 154, cause the processor 154 to receive an electromagnetic signal from the instrument 146; process the electromagnetic signal to obtain a characteristic of the nanostructured plasmonic material 102; and output the characteristic of the nanostructured plasmonic material 102.

The analysis of signals captured by the instrument can be carried out in whole or in part on one or more computing device. For example, the system may comprise one or more additional computing device.

In some examples, the electromagnetic signal received by the processor from the instrument can comprise an image, a spectrum (e.g., Raman, UV-vis, IR, fluorescence), a micrograph, or combinations thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Chirality represents the property of asymmetry for an object that cannot superimpose with its mirror image. The asymmetric interaction between circularly polarized light and an object with structural chirality leads to interesting chiroptical effects such as circular dichroism and optical rotation. Creatures such as jeweled beetles, shrimp, and stomatopods developed their own chiroptical effects during evolution. For example, parts of the eyes of *Gonodactylus smithii* mantis shrimp are specialized for circular polarization vision. The capability of detecting circularly polarized light enables the optimal polarization vision in nature (Kleinlogel S and White A G. *PLoS One* 2008, 3, e2190). In addition, the capability of detecting and analyzing circularly polarized light of stomatopod crustaceans' visual system may play an important role in sexual signaling and mate choice, which are significant for reproduction (Chiou T H et al. *Curr. Biol.* 2008, 18, 429). Mimicking chiral objects in nature, researchers have been developing man-made chiral materials for a wide range of applications, including, broadband polarizers (Gansel J K et al. *Science* 2009, 325, 1513), biological sensors (Hendry E et al. Nat. *Nanotechnol.* 2010, 5, 783; Jeong H H et al. *Nat. Commun.* 2016, 7, 11331), negative refraction (Zhang S et al. *Phys. Rev. Lett.* 2009, 102, 023901), and detectors to circularly polarized light (Yang Y et al. *Nat. Photonics* 2013, 7, 634; Li W et al. *Nat. Commun.* 2015, 6, 8379).

One of the most effective ways toward man-made chiral materials is to construct a chiral configuration with plasmonic nanostructures as building blocks. The excitation of the light-coupled collective resonances of free electrons in the plasmonic nanostructures leads to strong light-matter interactions at the subwavelength scale. The chiral configuration makes the interactions depend on whether the incident light has left-handed circular polarization (LCP) or right-handed circular polarization (RCP). Therefore, it is possible to achieve plasmonic chiral metamaterials with strongly enhanced chiroptical effects and compact size The building blocks for solid-state chiral metamaterials on substrates are either inherently chiral plasmonic nanostructures (Dietrich K et al. *Adv. Mater.* 2012, 24, OP321; Karimullah A S et al. *Adv. Mater.* 2015, 27, 5610; He Y et al. *Nano Lett.* 2014, 14, 1976; Esposito M et al. *Nat. Commun.* 2015, 6, 6484) or anisotropic admiral plasmonic nanostructures stacked into chiral structures with site-specific twists (Svirko Y et al. *Appl. Phys. Lett.* 2001, 78, 498; Zhao Y et al. *Nat. Commun.* 2012, 3, 870; Liu N et al. *Nat. Photonics* 2009, 3, 157; Kang L et al. *Adv. Mater.* 2015, 27, 4377). Fabrication of these building blocks often requires sophisticated lithographic techniques such as electron-beam (e-beam) lithography and focused ion-beam lithography to define features at the nanoscale for targeted performances. Moreover, multistep precise alignments are needed to fabricate the metamaterials comprising the stacked building blocks. The structural and spatial precision for the building blocks is often below 50 nm for the metamaterials working in the visible and near-infrared regimes, limiting the fabrication throughput, scalability, and reproducibility. In addition, new design and fabrication of the samples are needed to tune the chiroptical responses.

Herein, chiral metamaterials, known as moiré chiral metamaterials (MCMs), comprising two layers of substantially identical achiral Au nanohole arrays stacked into moiré patterns are described. In contrast to the previously reported plasmonic chiral metamaterials based on local structural chirality or site-specific twisting of anisotropic components, the optical chirality of the moiré chiral metamaterials described herein originates from relative in-plane rotation between the lattice directions of the two substantially identical achiral layers. The chiroptical responses of the moiré chiral metamaterials can be tuned by the in-plane rotation between the two layers of nanohole arrays. Through experimental and theoretical studies, the mechanism behind the chiroptical effects in the moiré chiral metamaterials is revealed. Furthermore, the moiré chiral metamaterials are applied to achieve label-free enantio-discrimination of biomolecules and drug molecules at the picogram level. With their ultrathin thickness (~70 nm, which is only ~1/10 of the operation wavelength), strong chirality, and high tunability, the moiré chiral metamaterials can advance a variety of photonic and optoelectronic applications Materials and Sample Preparation: The polystyrene (PS) spheres (500 nm in diameter) were purchased from Thermo Scientific Inc. (5050A). The Cu substrates were obtained through deposition of 100 nm Cu on clean cover glass slides by electron-beam evaporation. A reactive ion etcher (March Plasma CS170IF) was applied for the RIE process with $O_2$ flow of 20 sccm and power of 60 W. APS-100 (Transene Inc.) was used as a Cu etchant. The alignment marks were fabricated via photolithography after the fabrication of moiré chiral metamaterials (MCMs) on glass substrate. Cr with a thickness of 60 nm was deposited for the alignment marks.

Figure 14:
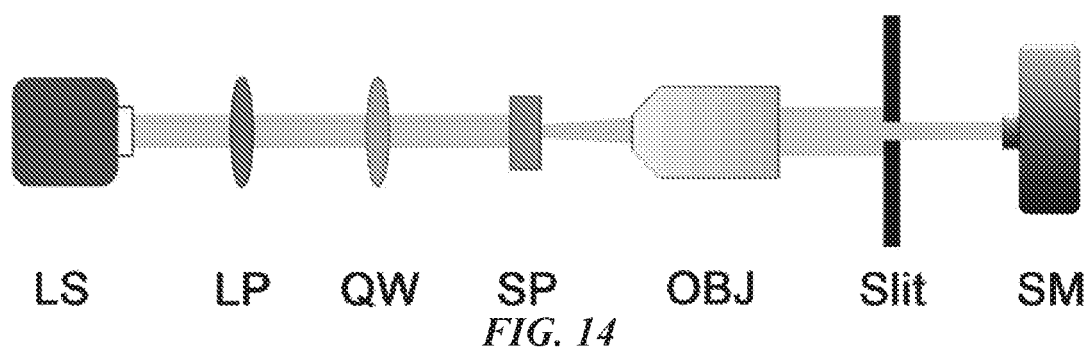
FIG. 14 is a schematic of the experimental setup for circular dichroism spectral measurement. The abbreviations are light source (LS), linear polarizer (LP), quarter-wave plate (QW), sample (SP), objective (OBJ), and spectrometer (SM), respectively.

Optical Characterization: The transmission spectra were measured using an inverted microscope (Ti-E, Nikon Inc.) integrated with a spectrometer (Andor Inc.), as shown in FIG. 14. A halogen lamp (Nikon Inc., 12 V, 100 W) was used as the light source. The circularly polarized light was obtained by subsequently passing the incident light through a linear polarizer (LPNIRE100-B, Thorlabs Inc.) and a quarter-wave plate (AQWP10M-980, Thorlabs Inc.). The fast axis of the quarter-wave plate was rotated with respect to the linear polarizer to control the left-handed circular polarization or right-handed circular polarization. Afterward, the circularly polarized lights passed through the sample and the transmitted parts were collected by the objective (Nikon Inc., 40X). A spectrometer (Andor Shamrock 303i) was applied to record the transmitted optical power. A slit with a tunable width (50 to 2500 μm) was placed between the objective and the spectrometer. The integrated charge-coupled device (CCD) in the spectrometer and the tunable slit enabled the selective measurements at specific locations of the moiré chiral metamaterials with the characterized areas of ~40 μm$^2$. The measured region was at the center of each domain. The transmitted optical powers through the moiré chiral metamaterials were normalized from that through a pure glass substrate to obtain the transmission spectra.

Protein and Drug Measurements: The moiré chiral metamaterials on a glass substrate were covered with a cover glass to form a fluidic cell. Polyimide tape was used to seal the fluidic cell to avoid leakage during measurements. Tris/HCl ($10 \times 10^{-3}$ m, pH 7.4) from Sigma-Aldrich was used as buffer solution for Concanavalin A (Sigma-Aldrich) measurements. Dimethyl sulfoxide from Fisher Scientific was used as buffer solution for R-thalidomide and S-thalidomide (Sigma-Aldrich). The drug solutions were prepared freshly before each sensing measurement to avoid racemization. The concentrations of Concanavalin A (ConA) and R-/S-thalidomide were 1 and 2 mg mL$^{-1}$, respectively. Each error bar was obtained from statistical analysis of six measurements.

Numerical Simulations: The simulations of the optical spectra and electric-field distributions were conducted using FDTD methods with commercially available software package (FDTD Solutions, Lumerical). An incident light was irradiated onto the top of the moiré chiral metamaterials on a glass substrate. The total-field scattered-field source with left-handed circular polarization (LCP) or right-handed circular polarization (RCP) was applied as light source. The refractive index of the glass substrate was set as 1.46. The optical constants of the Au were obtained from literature (Johnson P B and Christy R W. *Phys. Rev. B* 1972, 6, 4370). The thickness of each Au layer was set as 35 nm. A 2D frequency-domain power detector was used to measure the transmission spectra from the moiré chiral metamaterials.

Figure 15:
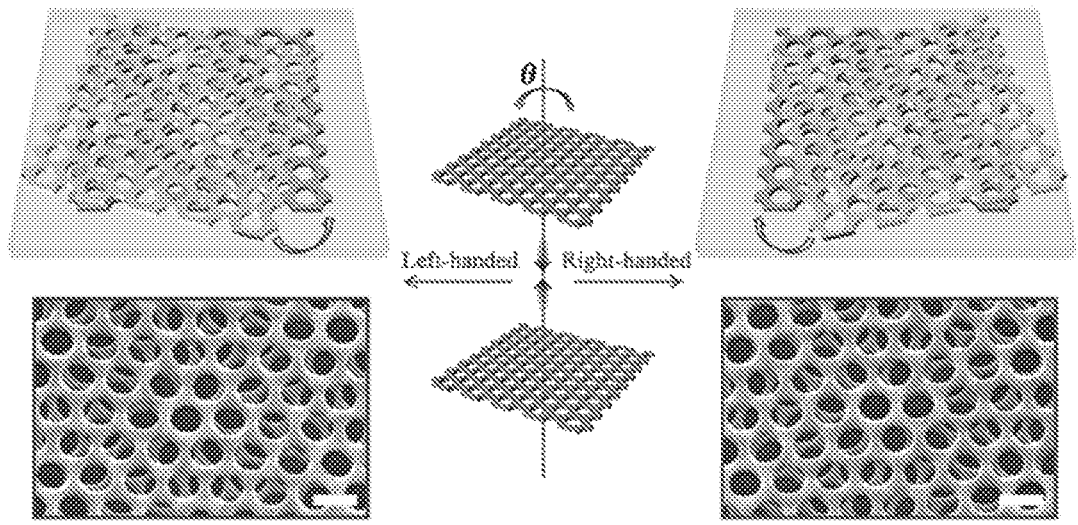
FIG. 15 is a schematic illustration and corresponding tilted-view scanning electron microscopy (SEM) images of moiré chiral metamaterials (MCMs) with opposite handedness. The scale bars are 500 nm.

A moiré pattern is a largescale interference pattern that can be produced when two overlaid patterns are relatively displaced or rotated. The pattern appears in many situations such as printing, television, digital photograph, and beat phenomena in wave physics. Moiré patterns have been applied to create metamaterials and metasurfaces (Han J H et al. *Opt. Express* 2015, 23, 17443; Wu Z et al. *Nanoscale* 2015, 7, 20391; Gibbons N and Baumberg *J. Opt. Express* 2011, 19, 15596). The building blocks of the moiré chiral metamaterials described herein are two substantially identical thin Au layers with periodic nanohole arrays in a triangular lattice, as schematically shown in FIG. 15. The two achiral Au layers are stacked directly on a glass substrate. A relative in-plane rotation between the top layer and the bottom layer leads to moiré patterns with 3D structural handedness.

Figure 16:
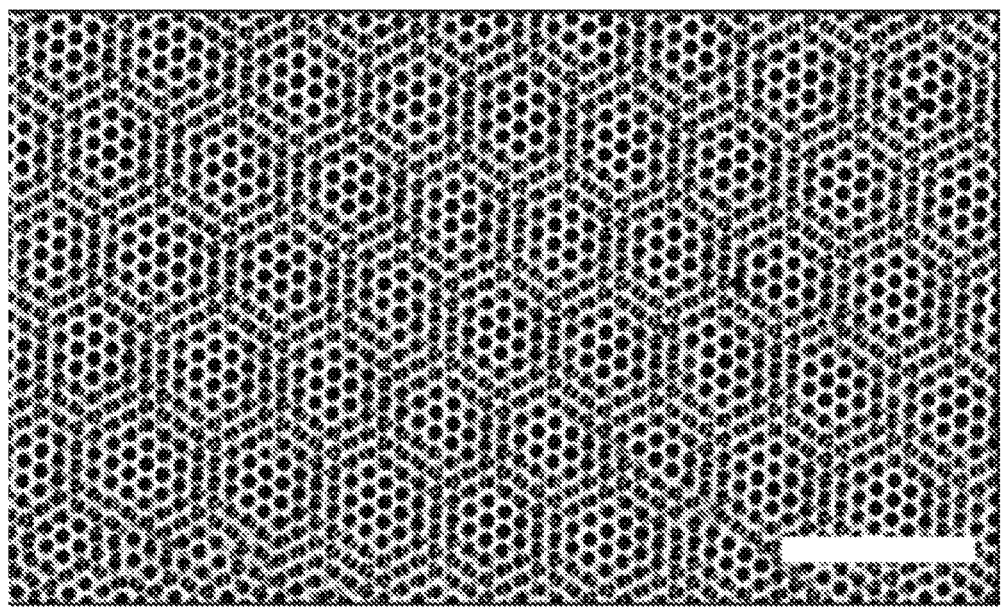
FIG. 16 is a large-scale SEM image of a moiré chiral metamaterial with θ of 7.5°. The scale bar is 5 μm.
Figure 17:
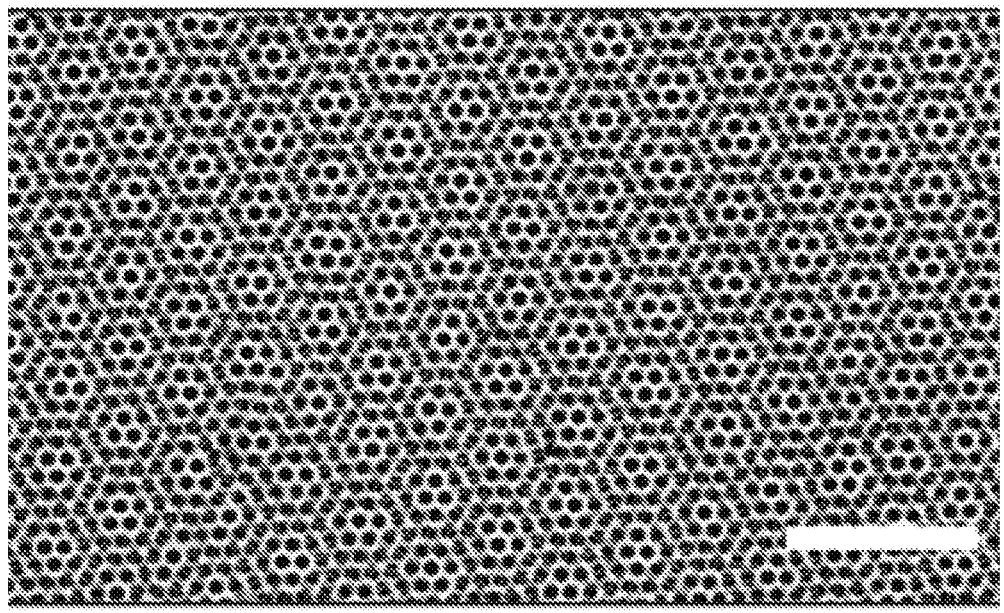
FIG. 17 is a large-scale SEM image of a moiré chiral metamaterial with θ of 15°. The scale bar is 5 μm.
Figure 18:
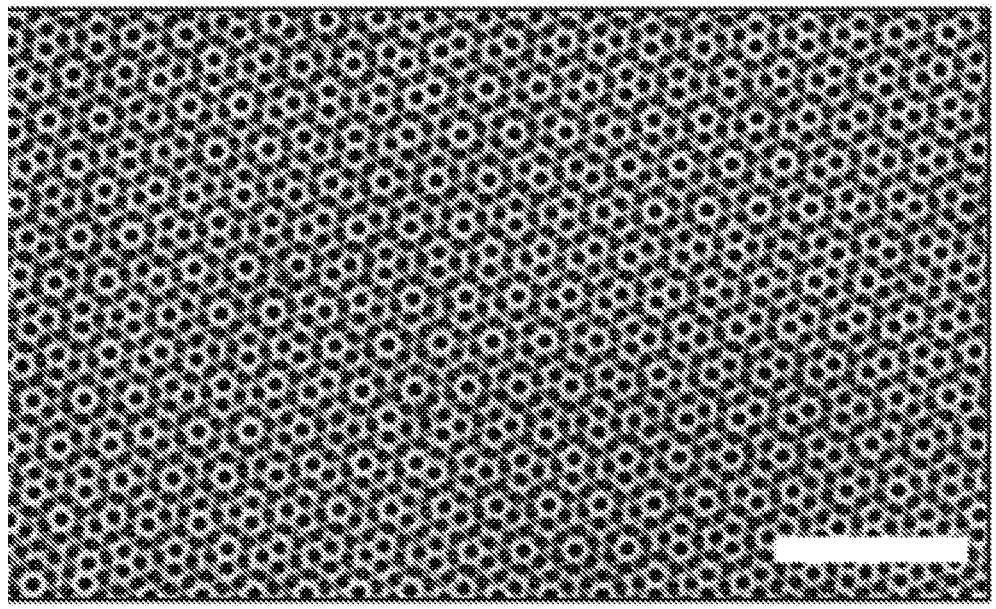
FIG. 18 is a large-scale SEM image of a moiré chiral metamaterial with θ of 20°. The scale bar is 5 μm.

The relative in-plane rotation angle ($\theta$) determines the structural handedness of the moiré chiral metamaterials, Positive values of $\theta$ correspond to clock-wise relative in-plane rotation of the bottom layer with respect to the top layer and vice versa. In this manner, $\theta=-15°$ leads to a left-handed chiral structure and $\theta=15°$ leads to a right-handed chiral structure, as shown in FIG. 15, The moiré chiral metamaterials in the SEM images in FIG. 15 were formed by stacking two layers of hexagonal Au nanohole arrays with a period of 500 nm and a thickness of 35 nm, leading to an ultrathin thickness of the moiré chiral metamaterials. Controlling the relative in-plane rotation angle $\theta$ tunes the moiré patterns and thus the chiroptical responses. As shown by the large-scale SEM images in FIG. 16-FIG. 18, $\theta$-dependent quasi-periodic moiré patterns occur when $\theta$ changes from 7.5° to 15° to 20°. The ultrathin moiré chiral metamaterials exhibited no obvious bending and cracks.

Figure 19:
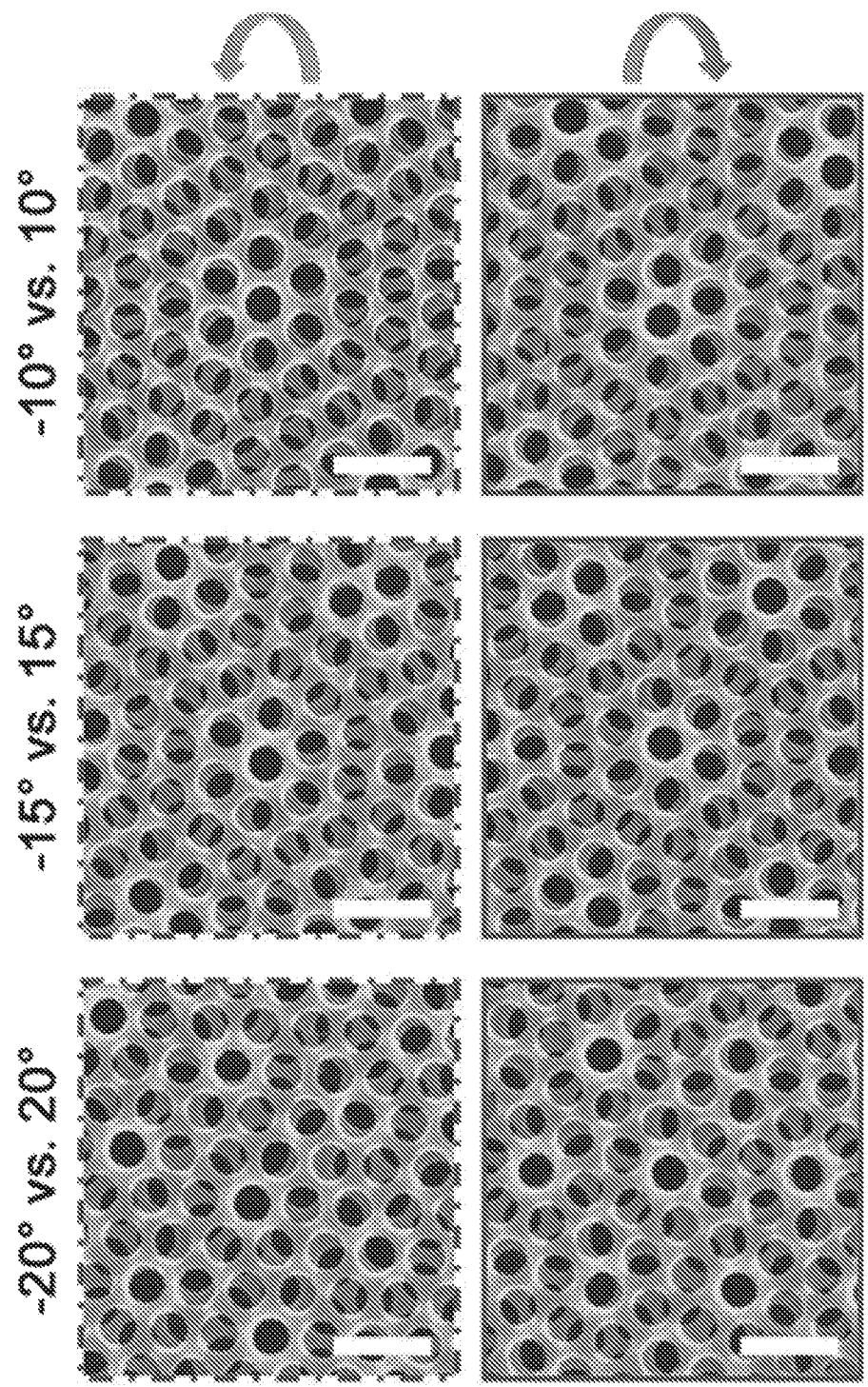
FIG. 19 shows SEM images of three sets (i.e., −10° vs 10° (top), −15° vs 15° (middle), and −20° vs 20° (bottom), respectively) of moiré chiral metamaterials. The left panels show counter clockwise rotation (i.e., −10° (top), −15° (middle), and −20° (bottom), respectively) while the right panels show clockwise rotation (i.e., 10° (top), 15° (middle), and 20° (bottom), respectively). The scale bars are 1 μm.
Figure 20:
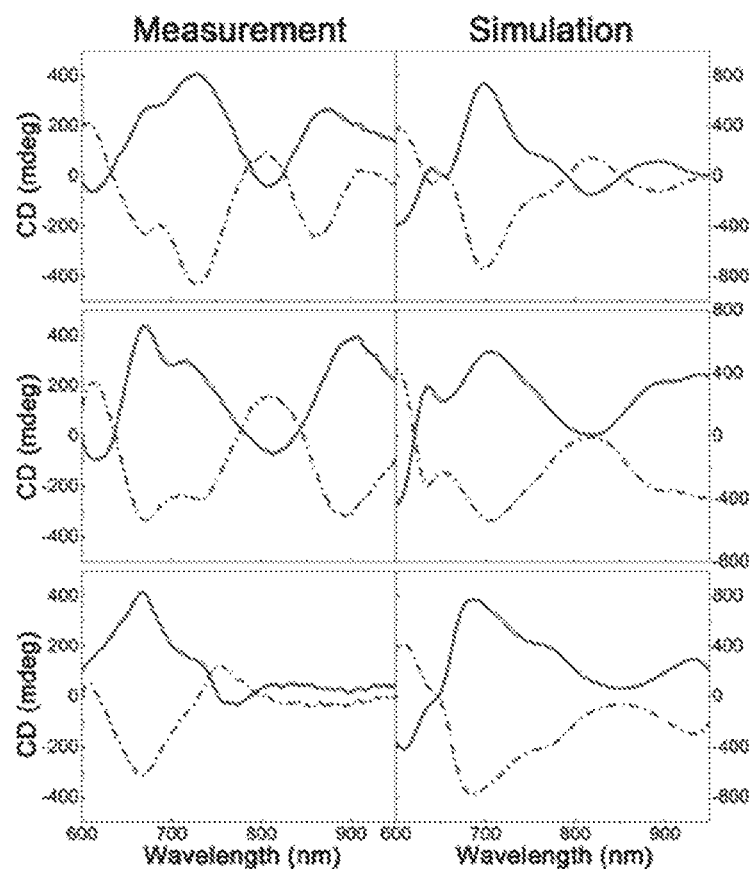
FIG. 20 shows the Measured (left panels) and simulated (right panels) circular dichroism (CD) spectra of three sets (i.e., −10° (dashed) vs 10° (solid) (top), −15° (dashed) vs 15° (solid) (middle), and −20° (dashed) vs 20° (solid) (bottom), respectively) of moiré chiral metamaterials.
Figure 21:
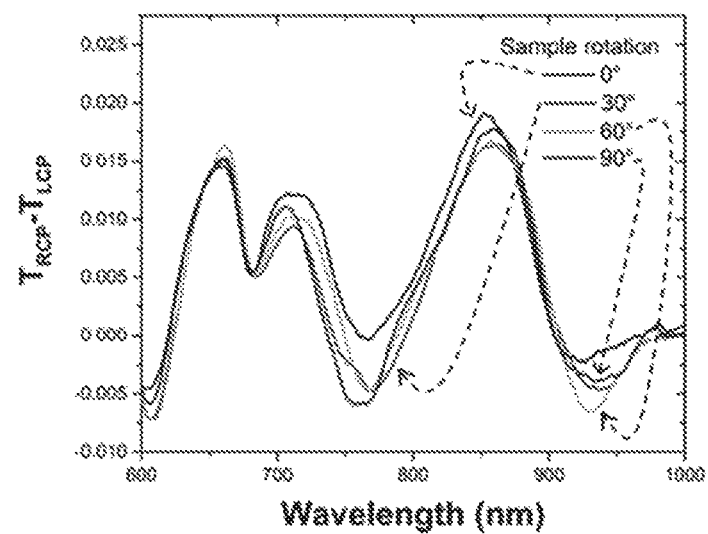
FIG. 21 is the circular dichroism spectra of a moiré chiral metamaterial with different azimuthal orientation of the sample, without changing the angle and rotation of the incident light.
Figure 22:
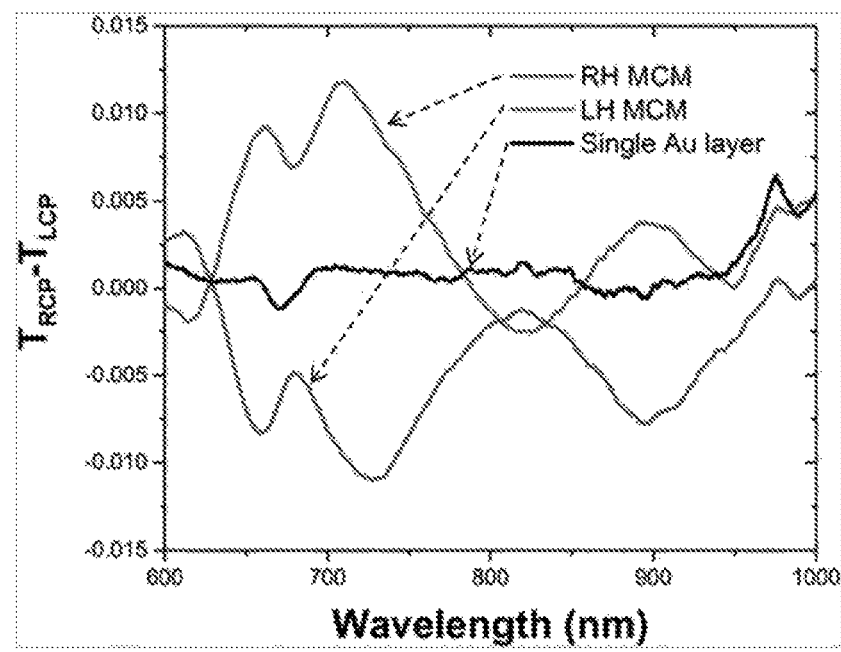
FIG. 22 is a comparison of measured chiroptical spectra between moiré chiral metamaterials and single-layer Au nanohole arrays. Compared to the obvious optical chirality of the moiré chiral metamaterials, the single-layer nanohole arrays have near zero value for ΔT ($T_{RCP}$−$T_{LCP}$), which is expected for achiral structures.
Figure 23:
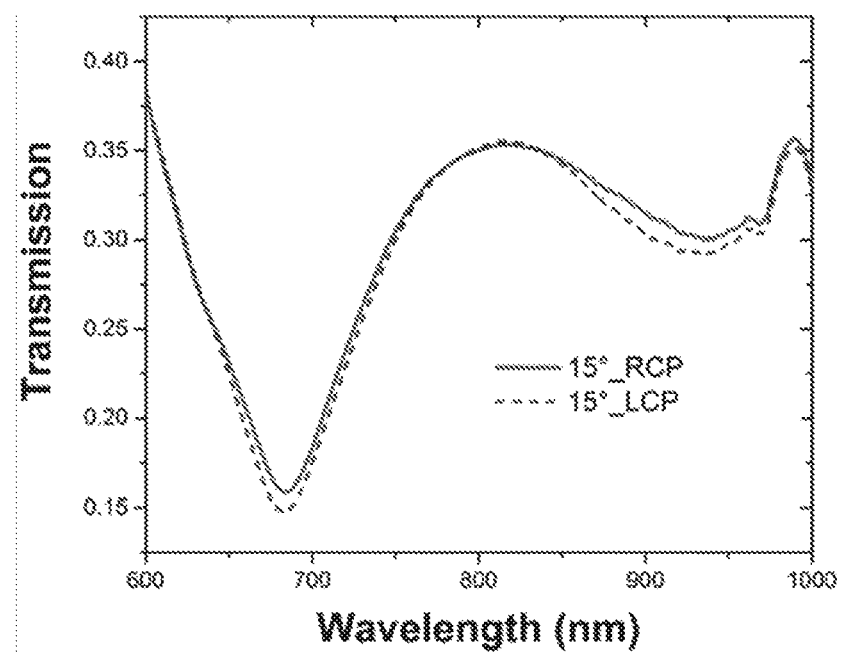
FIG. 23 is the transmission spectra of a moiré chiral metamaterial with θ of 15° under illumination with left-handed circular polarization (LCP, dashed line) and right-handed circular polarization (RCP, solid line), respectively. The chiroptical effects mainly occur at the transmission peaks and dips of the moiré chiral metamaterials.

The tunable chiroptical responses of the moiré chiral metamaterials was demonstrated by controlling the relative in-plane rotation angle $\theta$. Periodic arrays of metallic holes have been studied for their unique plasmonic resonances and optical transmission properties (Brolo A G et al. *Nano Lett.* 2004, 4, 2015; van Beijnum F et al. *Phys. Rev. Lett.* 2013, 110, 206802; Henzie J et al. *Nat. Nanotechnol.* 2007, 2, 549; Garcia-Vidal F J et al. *Rev. Mod. Phys.* 2010, 82, 729). When two achiral Au nanohole arrays are stacked into moiré chiral metamaterials with relative in-plane rotation, the structural handedness induces optical chirality. The scanning electron microscopy (SEM) images in FIG. 19 show moiré chiral metamaterials with three sets of $\theta$, i.e., −10° vs 10°, −15° vs 15°, and −20° vs 20°, respectively. In FIG. 20, the measured circular dichroism (CD) spectra of the moiré chiral metamaterials show similar line shapes with opposite values for each set of the enantiomers, revealing the transfer of the structural handedness to optical chirality. The circular dichroism of the moiré chiral metamaterials was confirmed to be due to the chirality of the structure by taking the circular dichroism spectra at different azimuthal orientations of the sample, without changing the angle and rotation of the incident light. As shown in FIG. 21, the circular dichroism spectra for different rotation angles of the sample are substantially similar, which excluded the contribution of the anisotropy artifacts to the circular dichroism spectra. In contrast to the moiré chiral metamaterials, a single-layer Au nanohole array shows near-zero circular dichroism values (FIG. 22), as expected from their achiral nature. Moreover, the peak (or dip) wavelengths and line shapes of the circular dichroism spectra of the moiré chiral metamaterials can be tuned by changing the $|\theta|$ from 10° to 30°. Specifically, the circular dichroism peak (or dip) at the shorter wavelength blue-shifts when $|\theta|$ is increased. The longer-wavelength circular dichroism peak (or dip) redshifts when $|\theta|$ is increased, which exceeded the measurement range of the spectrometer used herein when $|\theta|$ reaches 20° (bottom panel of FIG. 20). The circular dichroism spectra can be defined as $32.98°\times(T_{RCP}-T_{LCP})$, where $T_{RCP}$ and $T_{LCP}$ are the optical transmission of samples under right-handed circular polarization (RCP) and left-handed circular polarization (LCP) illuminations, respectively. From FIG. 20 and FIG. 23, it can be seen that the chiroptical peaks are related to the transmission dips and peaks of the moiré chiral metamaterials.

Figure 24:
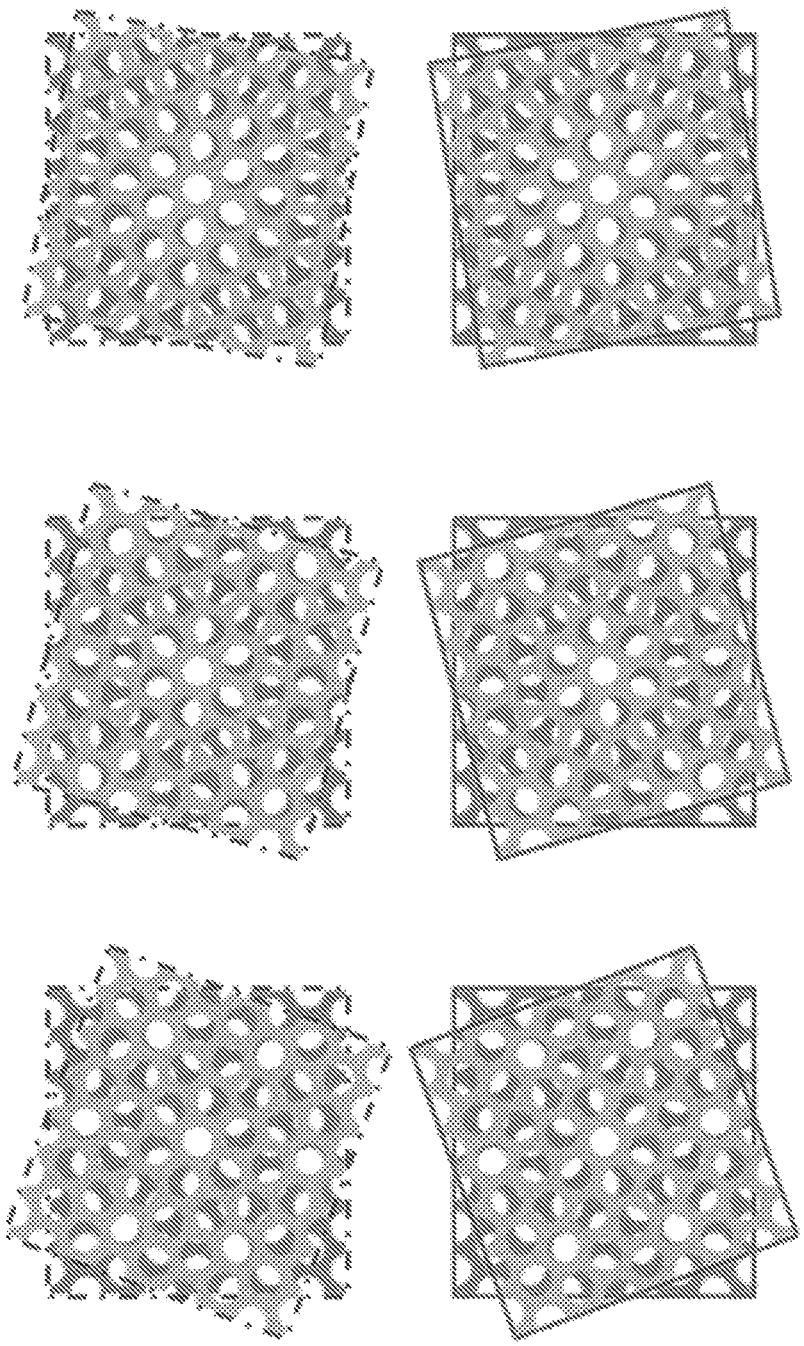
FIG. 24 is a schematic illustration of three sets (i.e., −10° (left) vs 10° (right) (top), −15° (left) vs 15° (right) (middle), and −20° (left) vs 20° (right) (bottom), respectively) of moiré chiral metamaterials.
Figure 25:
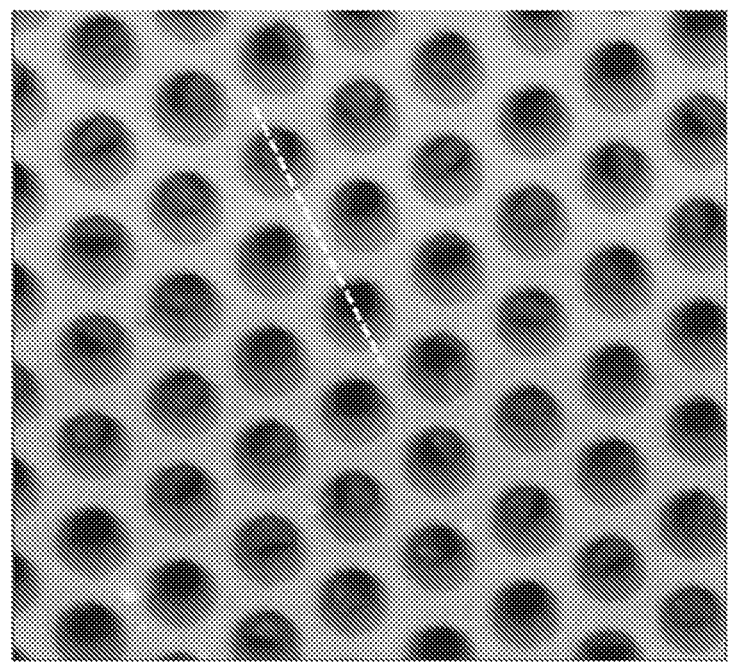
FIG. 25 is an atomic force microscopy (AFM) image of a moiré chiral metamaterial.
Figure 26:
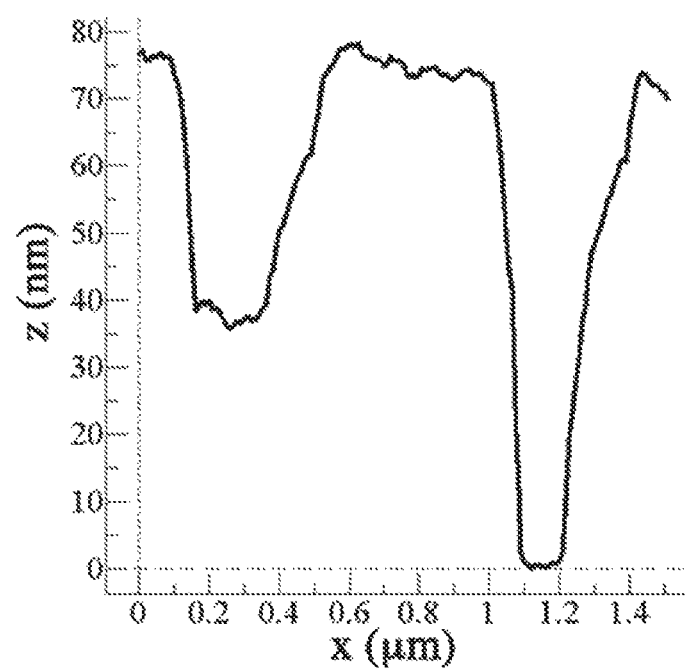
FIG. 26 is an AFM height profile along the dashed line in FIG. 25.
Figure 27:
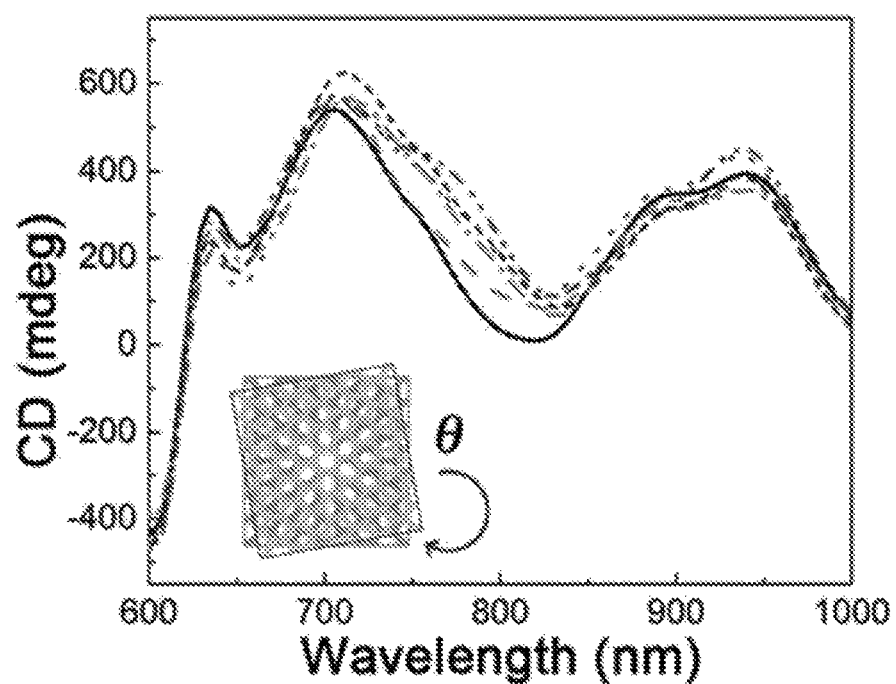
FIG. 27 is a series of circular dichroism spectra of a moiré chiral metamaterial under the various rotation angles from 15° to 315° at an interval of 60°.
Figure 28:
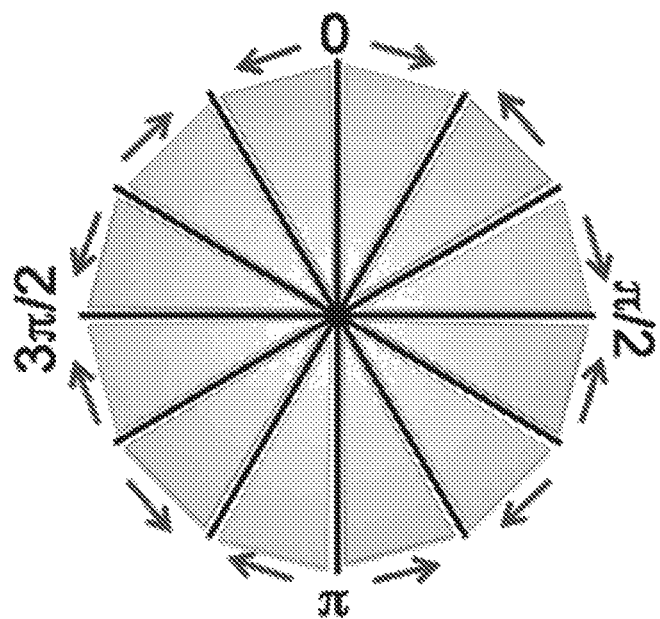
FIG. 28 is a wheel illustration of the rotational periodicity (π/3) in the θ-dependent chiroptical properties of the moiré chiral metamaterials.
Figure 29:
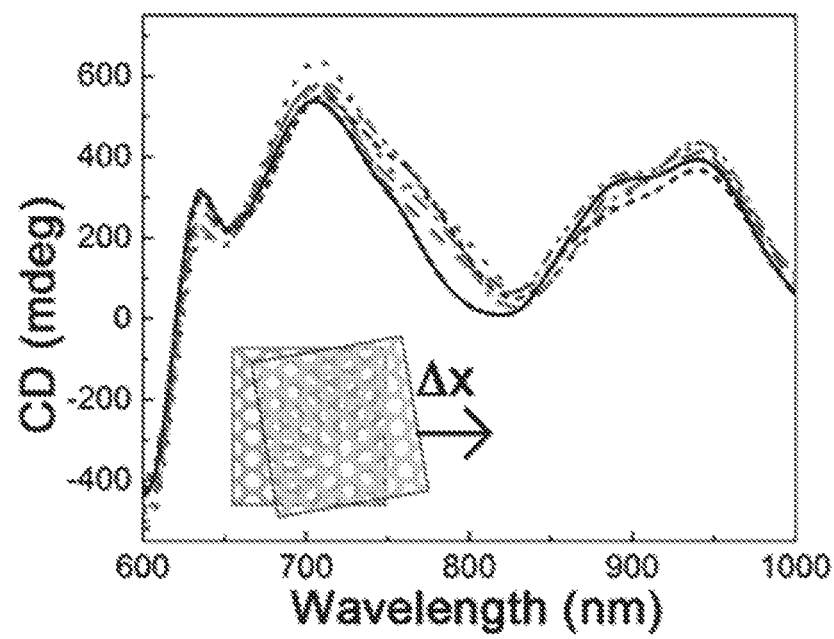
FIG. 29 is a series of circular dichroism spectra of a moiré chiral metamaterial under the various lateral translations of the top layer of Au nanohole arrays in the x direction, from 0 nm to 500 nm with an interval of 100 nm. The similarity in the circular dichroism spectra of the moiré chiral metamaterial under translational operations indicates that the moiré chiral metamaterials are alignment-free in the x direction.
Figure 30:
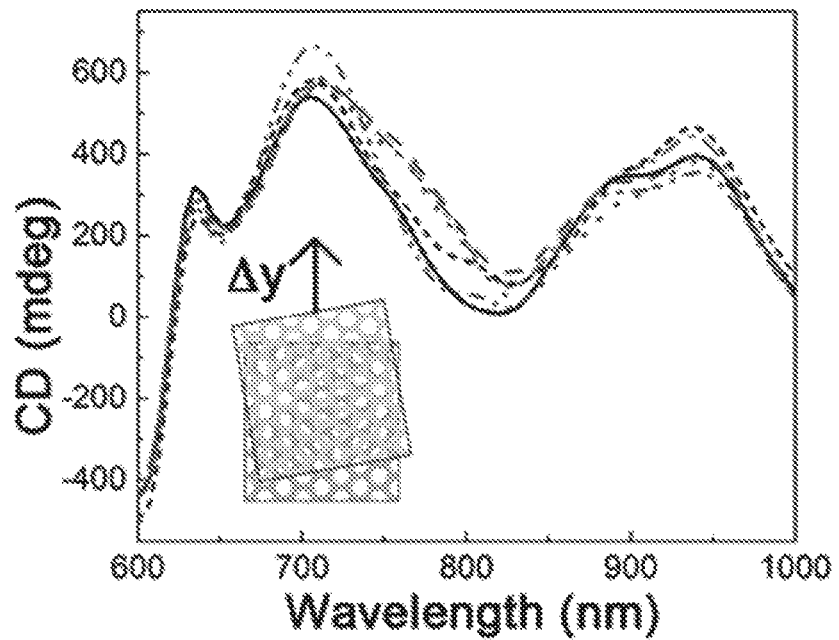
FIG. 30 is a series of circular dichroism spectra of a moiré chiral metamaterial under the various lateral translations of the top layer of Au nanohole arrays in they direction, from 0 nm to 500 nm with an interval of 100 nm. The similarity in the circular dichroism spectra of the moiré chiral metamaterial under translational operations indicates that the moiré chiral metamaterials are alignment-free in they direction.

The circular dichroism spectra of the moiré chiral metamaterials were simulated using finite-difference time-domain (FDTD) method. The models for the moiré chiral metamaterials are shown in FIG. 24. As shown in the right panels of FIG. 20, the line shapes and peak (or dip) wavelengths of the simulated circular dichroism spectra, as well as their dependence on the relative in-plane rotation angle $\theta$, match those of the measured spectra (left panels of FIG. 20). The slight discrepancy between the measured and simulated spectra can be attributed to the boundary effects in the simulations. Unlike the existing chiral metamaterials that stack multiple layers of plasmonic structures with dielectric spacers (Zhao Y et al. *Nat. Commun.* 2012, 3, 870; Hentschel M et al. *ACS Nano* 2012, 6, 10355; Huttunen M J et al. *Opt. Mater. Express* 2011, 1, 46), the moiré chiral metamaterials described herein have ultrathin thicknesses due to the direct contact between the two layers of Au nanohole arrays. As shown by atomic force microscopy in FIG. 25 and FIG. 26, the moiré chiral metamaterials described herein have an average thickness of ~70 nm. The thickness is only ~1/12 of the longer peak (or dip) wavelength (~900 nm) of the circular dichroism spectrum in the middle panel of FIG. 20. Furthermore, the strong coupling between the two Au nanohole layers in contact leads to the higher circular dichroism values (~400 mdeg at the peak or dip wavelengths) than other thin plasmonic chiral metamaterials, e.g., gammadion-shaped chiral metamaterials (~100 mdeg at the peak wavelength with a thickness of 100 nm) (Hendry F et al. *Nat. Nanotechnol.* 2010, 5, 783). The circular dichroism values of the moiré chiral metamaterials are unexpectedly high for conductively connected achiral layers with ultrathin thickness. Two individual achiral layers with intimated electrical contact would lead to nonchiral structures (Butler CAM et al. *Phys. Rev. B* 2012, 86, 241109(R)). The unexpectedly strong optical chirality arises from the meta-film structure in the moiré chiral metamaterials, which is different from the singular structures (Butler CAM et al. *Phys. Rev. B* 2012, 86, 241109(R)). The film structure introduces stronger light matter interactions and light-driven surface currents to generate the strong chiroptical effects. The conductive contact and connected mesh of the nanoholes may benefit many optoelectronic applications. Due to the hexagonal arrangement of the Au nanohole arrays, the circular dichroism spectra of the moiré chiral metamaterials exhibit a six-fold rotational symmetry with respect to $\theta$. FIG. 27 shows a series of similar circular dichroism spectra for the moiré chiral metamaterials with $\Delta\theta$ of 60°. FIG. 28 illustrates the rotational periodicity of the optical chirality of the moiré chiral metamaterials. Specifically, the moiré chiral metamaterials have a rotational periodicity of $\pi/3$ and 12 mirror-symmetry planes at $n\pi/6$, where n is an integer from 1 to 12. The rotational periodicity indicates the origin of the chiroptical responses from the relative in-plane rotation between the lattice directions of the two layers of Au nanohole arrays in the moiré chiral metamaterials. The rotational origin of the chiroptical effects is further demonstrated by the independence of the circular dichroism spectra on the lateral translation between the two layers. FIG. 29 and FIG. 30 show the circular dichroism spectra of moiré chiral metamaterials with θ of 15° as a function of the lateral translation of the top layer along x and y direction, respectively. The translation range is from 0 nm to 500 nm, which is the period of the nanohole arrays, with an interval of 100 nm. The lateral translation causes little changes in the circular dichroism spectra, which indicates that translational alignment is not needed for the moiré chiral metamaterials to achieve the desired chiroptical effects (FIG. 29 and FIG. 30). With the large-area layers of Au nanohole arrays, which can be achieved by lithographic techniques such as nanoimprint lithography and injection molding (Karimullah A S et al. *Adv. Mater.* 2015, 27, 5610; Lubin S M et al. *ACS Nano* 2013, 7, 11035), the optical chirality of the moiré chiral metamaterials can be precisely tuned by controlling the rotation angles between the layers.

Figure 31:
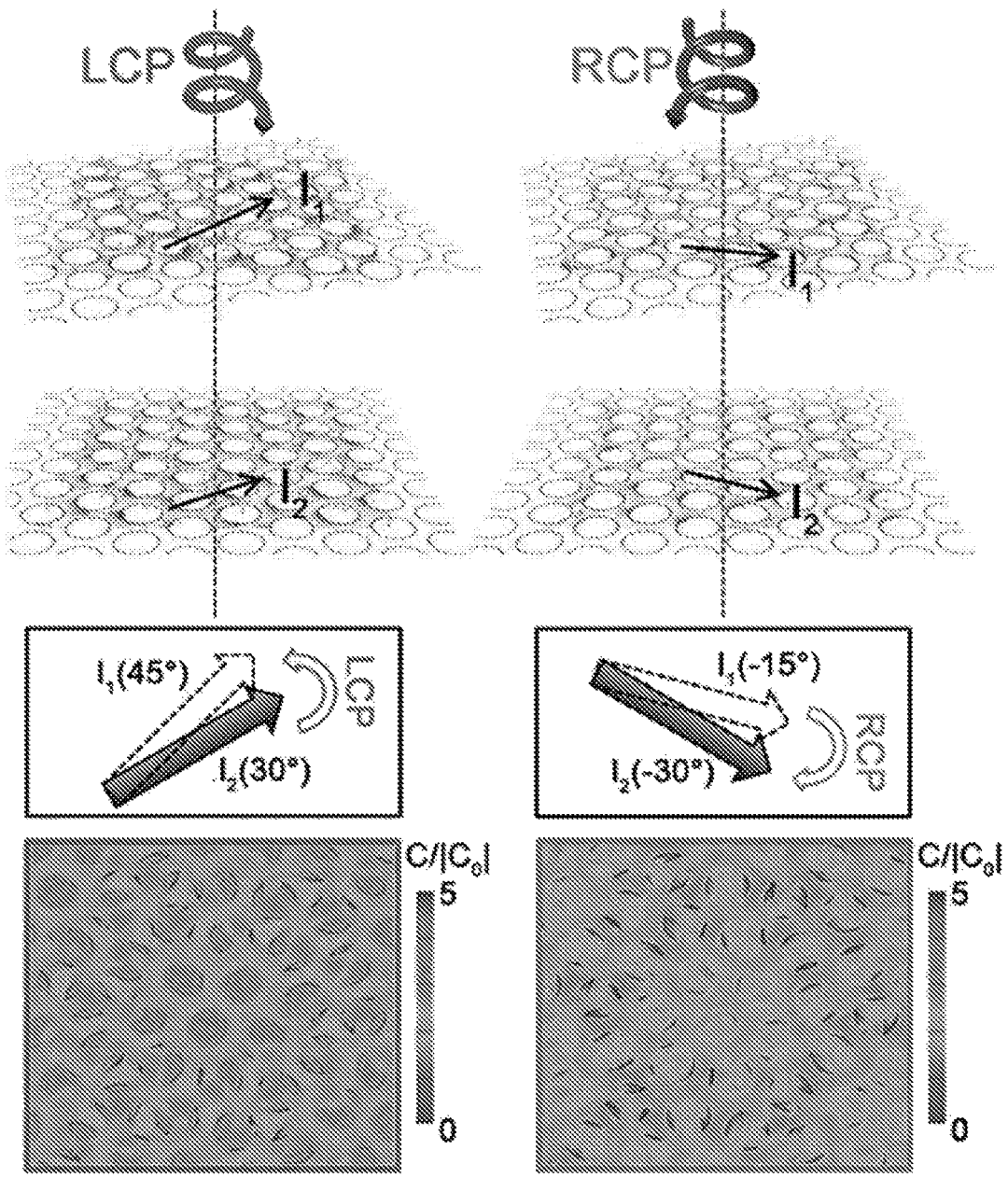
FIG. 31 is the near-field analysis of the optical chirality of the moiré chiral metamaterials based on the lattice-dependent "helical" oscillator model. Top panels: Electron current distributions in the top ($I_1$) and bottom ($I_2$) layers of the moiré chiral metamaterial (θ=15° as shown in FIG. 15 and the center panels of FIG. 19-FIG. 24) when excited by left-handed circular polarization (LCP) and right-handed circular polarization (RCP) incident light at the wavelength of 635 nm, respectively. Middle panels: Top-view illustration of rotations of effective currents from the top layer to the bottom layer under left-handed circular polarization and right-handed circular polarization illuminations, respectively. Bottom panels: Distributions of enhancement of local optical chirality at the interface between the two layers under left-handed circular polarization and right-handed circular polarization illuminations at the wavelength of 635 nm.
Figure 32:
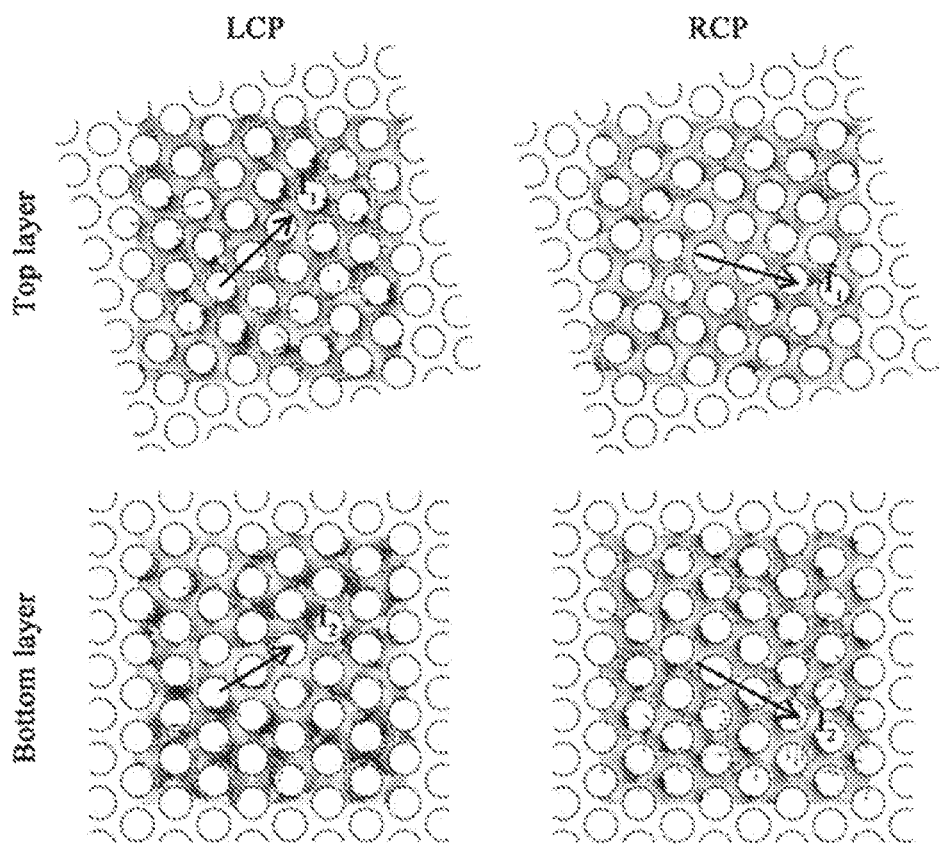
FIG. 32 is the top-view distributions of electron current densities in the top and bottom layers of the moiré chiral metamaterial with θ of 15° under illumination with left-handed circular polarization and right-handed circular polarization, respectively, at the wavelength of 635 nm. A major amount of the electron current directions are following one lattice direction, resulting an effective current for each layer. The effective electron currents are depicted as $I_1$ (top layer) and $I_2$ (bottom layer), respectively. Under both left-handed circular polarization and right-handed circular polarization illuminations, the effective current in the bottom layer ($I_2$) has a relative rotation of 15° from that in the top layer ($I_1$). The different directions of the effective currents between left-handed circular polarization and right-handed circular polarization illuminations are attributed to the different phases of incident light with different polarizations.

A lattice-dependent "helical" oscillator model, which is developed from single oscillator model (Karimullah A S et al. *Adv. Mater.* 2015, 27, 5610), is proposed to explain the chiroptical properties of the moiré chiral metamaterials. In this model, the near-field nature of the optical chirality of the moiré chiral metamaterials is investigated through analyzing the electron current densities in the top and bottom layers of the Au nanohole arrays. The top panels in FIG. 31 show the simulated electron current densities generated in a moiré chiral metamaterial under illumination of left-handed circular polarization and right-handed circular polarization incident light from the top, respectively. The moiré chiral metamaterial has θ of 15°, as shown in FIG. 15. The wavelength of the incident light is 635 nm, which corresponds to the chiroptical mode of the moiré chiral metamaterial at the short wavelength. A majority of the electron currents in each layer propagate along one lattice direction, as effectively depicted by $I_1$ (top layer) and $I_2$ (bottom layer) in both top panels of FIG. 31 and FIG. 32. The effective current directions in both layers are different between left-handed circularly polarized illumination and right-handed circularly polarized illumination, which is attributed to the different phases of the incident light with the different polarizations.

For both left-handed circularly polarized incident light and right-handed circularly polarized incident light, the directions of $I_1$ and $I_2$ exhibit the same relative in-plane rotation of 15° between the two layers of Au nanohole arrays, which matches the relative in-plane rotation angle θ. Thus, the relative in-plane rotation between the effective current directions in the top and bottom layers is the same as the rotation of the incident light with right-handed circular polarization and opposite to the rotation of the incident light with left-handed circular polarization, as depicted in the middle panels of FIG. 31. Such a difference in the relative rotations leads to the higher light transmission under right-handed circularly polarized illumination and thus the strong circular dichroism, as shown in FIG. 20. The same phenomena occur to incident light with the wavelengths of 705 nm and 900 nm, which correspond to the other two circular dichroism peaks (or dips) of the moiré chiral metamaterials.

Figure 33:
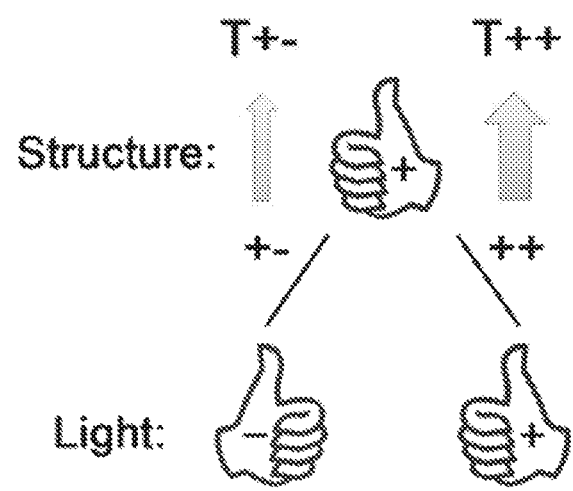
FIG. 33 is a schematic illustration of the effect of the relationship between the structural handedness of the moiré chiral metamaterial and the handedness of the incident light on the light transmission through the moiré chiral metamaterial.
Figure 34:
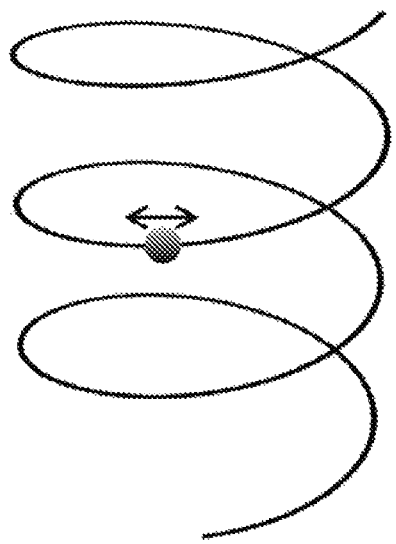
FIG. 34 is a schematic illustration of "helical" oscillator model. The sphere and arrow indicate the oscillating atom that is perturbed by electrostatic fields, as described in the "static coupling" model.
Figure 35:
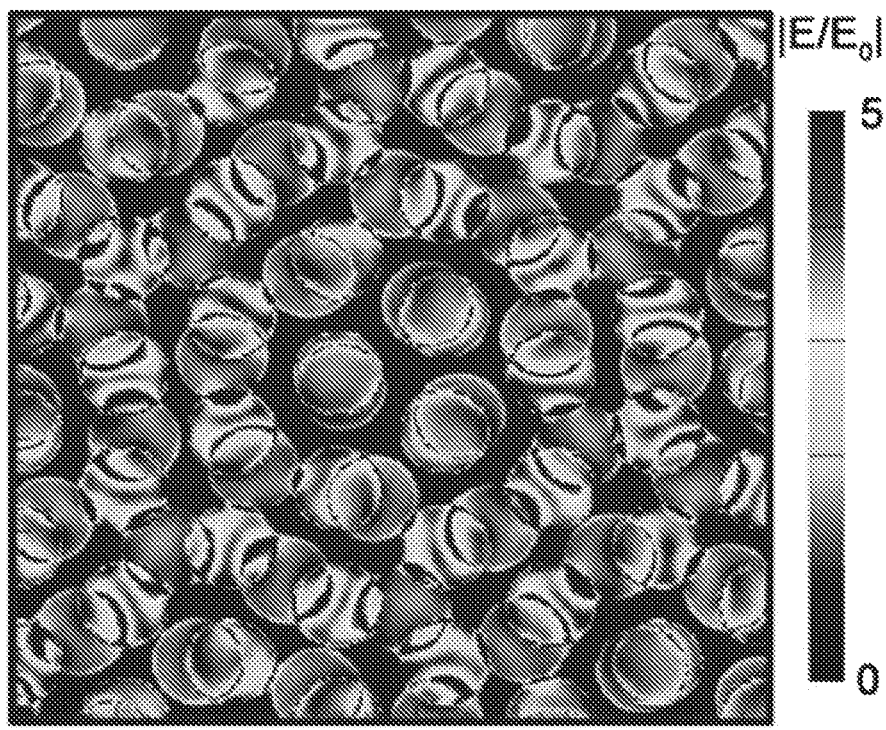
FIG. 35 is an electric-field distribution at the interface between the two layers Icier left-handed circularly polarized illumination at the wavelength of 635 nm.
Figure 36:
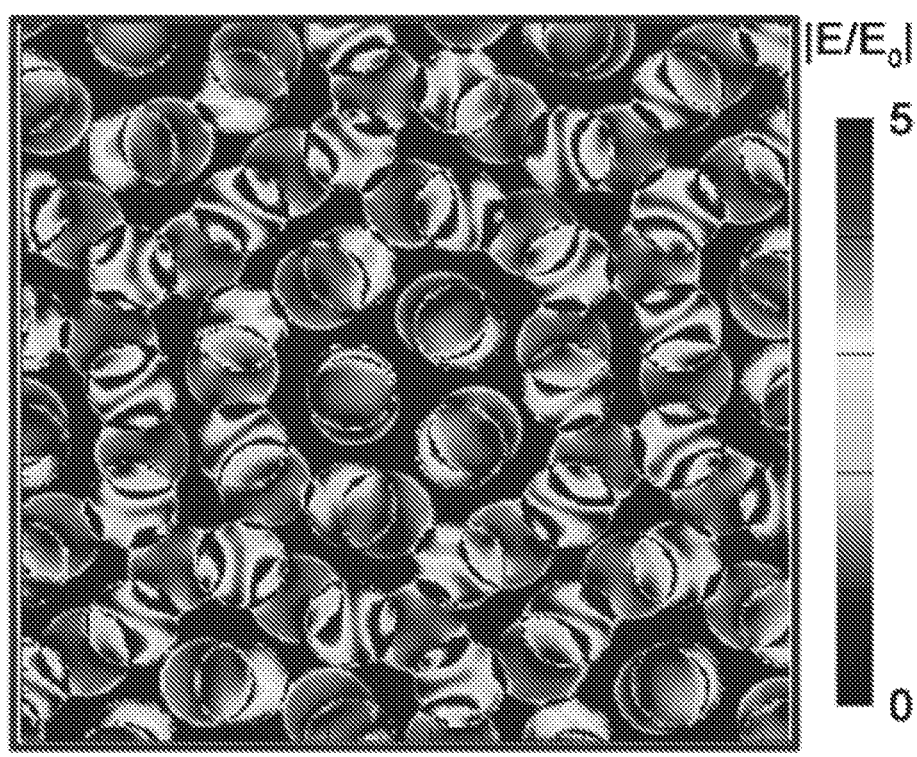
FIG. 36 is an electric-field distribution at the interface between the two layers under right-handed circularly polarized illumination at the wavelength of 635 nm.

FIG. 33 illustrates the dependence of light transmission through the moiré chiral metamaterial on the relationship between the handedness of the incident light and the structural handedness of the moiré chiral metamaterial. Due to the physical contact between the top and bottom Au layers, the moiré chiral metamaterials can be pictured as a "helical" oscillator model, as shown in FIG. 34. The "static coupling" in the "helical" oscillator model explains the optical chirality from perturbations of optical activity tensors by electrostatic fields from other intrinsically achiral groups in the chiral structural unit. The antisymmetric coupling between structural and light handedness leads to the lower light transmission and vice versa (Esposito M et al. *Nat. Commun.* 2015, 6, 6484; Esposito M et al. *ACS Photonics* 2015, 2, 105). However, unlike the previously reported helical plasmonic metamaterials that are based on electron current rotation in local chiral building blocks (Gansel J K et al. *Science* 2009, 325, 1513; Esposito M et al. *Nat. Commun.* 2015, 6, 6484), the moiré chiral metamaterials can be understood as the lattice-dependent helical oscillators. Strongly localized super chiral fields can be generated at the interface between the two layers of Au nanohole arrays, as shown in the bottom panels of FIG. 31. The superchiral field is parameterized by optical chirality (Hendry E et al. *Nat. Nanotechnol.* 2010, 5, 783):

$$C = \frac{\varepsilon_0}{2} E \cdot \nabla \times E + \frac{1}{2\mu_0} B \cdot \nabla \times B$$

where E and B are the local electric and magnetic fields, respectively, and $\varepsilon_0$ and $\mu_0$ are the permittivity and permeability of free space, respectively. The local optical chirality is then normalized by the value for circularly polarized plane waves in vacuum. In addition, strongly localized electric fields can also be observed, as shown in FIG. 35 and FIG. 36. The strong hot spots can be attributed to the relative displacement between the nanoholes in the two Au layers. Such relative displacement causes reduced hole sizes at the interface between the two Au layers, further enhancing the hot spots near the edge of the holes that are commonly observed in single-layer Au nanohole arrays (Garcia de Abajo F J. *Rev. Mod. Phys.* 2007, 79, 1267; Parsons J et al. *Phys. Rev. B* 2009, 79, 073412).

Figure 37:
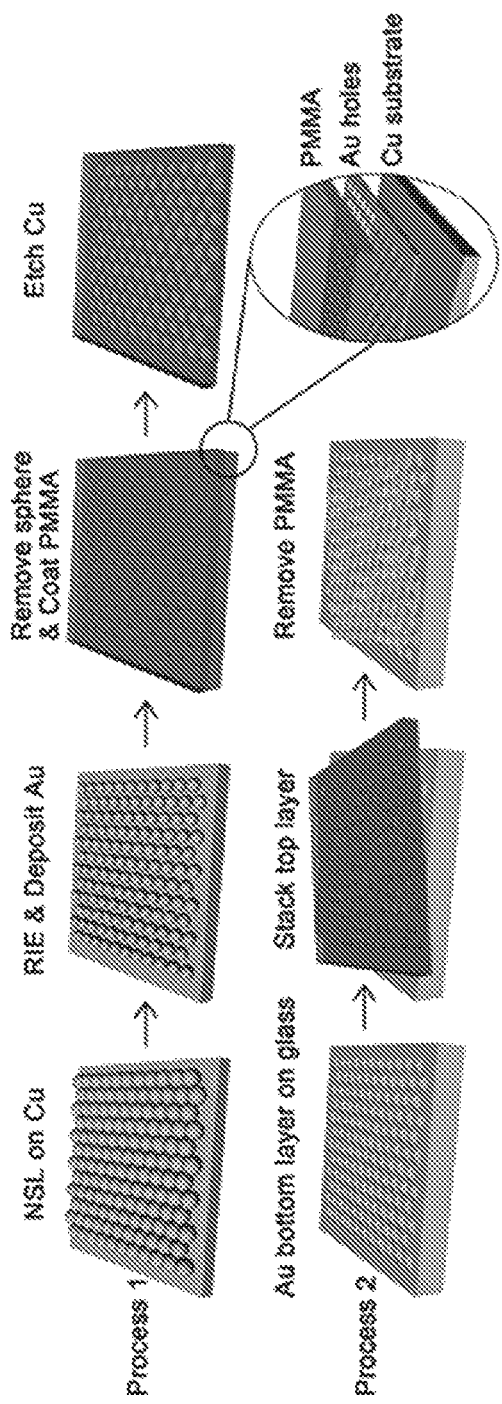
FIG. 37 is an assembly of moiré chiral metamaterials with multiple enantiomers. Top panels: Schematic illustration of process 1, including nanosphere lithography (NSL) for Au nanohole arrays and subsequent release and transfer of the Au layer onto a sacrificial polymer layer. Bottom panels: Schematic illustration of process 2 for stacking two layers of Au nanohole array on a glass substrate to form a moiré chiral metamaterial, with the assistance of the sacrificial polymer layer.

The origin of the chiroptical effects of the moiré chiral metamaterials from the lattice rotation of periodic nanohole arrays paves a way toward the large-scale fabrication of chiral metamaterials with highly tunable optical activities. Periodic Au nanohole arrays can be fabricated by cost-effective high-throughput methods such as nanoimprint lithography and nanosphere lithography (NSL) (Lubin S M et al. *ASC Nano* 2013, 7, 11035; Chen K et al. *ACS Nano* 2015, 9, 6031). Nanosphere lithography and a wet-transfer process were combined to fabricate the moiré chiral metamaterials described herein with multiple enantiomers via self and directed assembly. As illustrated in FIG. 37, the fabrication includes two major processes, i.e., process 1 and process 2. In process 1, nanosphere lithography was employed to create Au nanohole arrays on a Cu substrate, which was then transferred onto a sacrificial polymer layer. Specifically, polystyrene (PS) spheres with a diameter of 500 nm were self-assembled into a hexagonally closed-packed colloidal monolayer on a water surface, which was then transferred onto a Cu substrate (Wu Z et al. *Nanoscale* 2016, 8, 18461; W Z et al. *Nanotechnology* 2014, 25, 055204). An oxygen plasma etching process was applied to reduce the size of the polystyrene spheres, followed by Au deposition onto the sample using thermal evaporation. The selective removal of the Au-capped polystyrene spheres leads to Au nanohole arrays on the Cu substrate. A thin poly(methyl methacrylate) (PMMA) film is spin coated on the Au nanohole arrays. After the selective etching of the Cu substrate by a Cu etchant, a floating thin film comprising the Au nanohole arrays and PMMA sacrificial layer was obtained.

Figure 38:
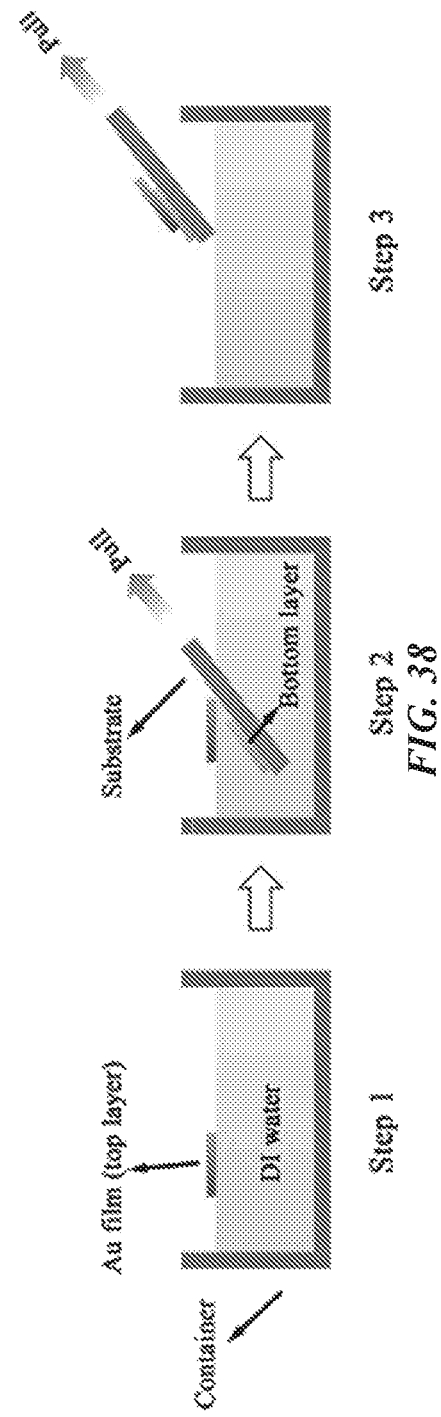
FIG. 38 is a schematic of the pick-up process during transfer of the top layer to the bottom layer. Step 1: After the etching of Cu, the floating top layer is transferred to the surface of the deionized water. Step 2: the substrate with bottom layer is inserted into the water with an inclined angle and in touch with the floating top layer. Step 3: The substrate is pulled out from the water. The top layer follows the substrate and is transferred to the top of the bottom layer.

In process 2 as illustrated in FIG. 37, the other layer of a Au nanohole array was fabricated on a glass substrate using the nanosphere lithography as described in the process 1. The glass substrate with the Au nanohole array picks up the floating thin film comprising the Au nanohole arrays and the PMMA sacrificial layer, leading to the moiré chiral metamaterials with the two layers of Au nanohole arrays in contact. FIG. 38 schematically illustrates the pick-up process during transfer of the top layer to the bottom layer. Due to the polycrystallinity of the Au nanohole arrays fabricated by nanosphere lithography, no alignment between the two layers is needed. However, it is worth mentioning that large-scale single-crystalline moiré chiral metamaterials with precise alignment can be achieved by nanoimprint lithography or injection molding with a slightly modified transfer method, which is described elsewhere (Kim C J et al. *Nat. Nanotechnol.* 2016, 11, 520). The relative in-plane rotation between the two layers can be controlled during the pick-up process. After drying the substrate, the PMMA sacrificial layer is then removed by acetone, leaving the moiré chiral metamaterials on the glass substrate. The top layer is fixed on the bottom layer, without a gap between them, by van der Waals forces after the substrate is dried. The adhesion between the two layers is strong enough to withstand immersion of the moiré chiral metamaterials in solution and the rinsing process. Therefore, the patterns and the structures of the moiré chiral metamaterials are fixed during the molecular adsorption and optical characterizations.

Figure 39:
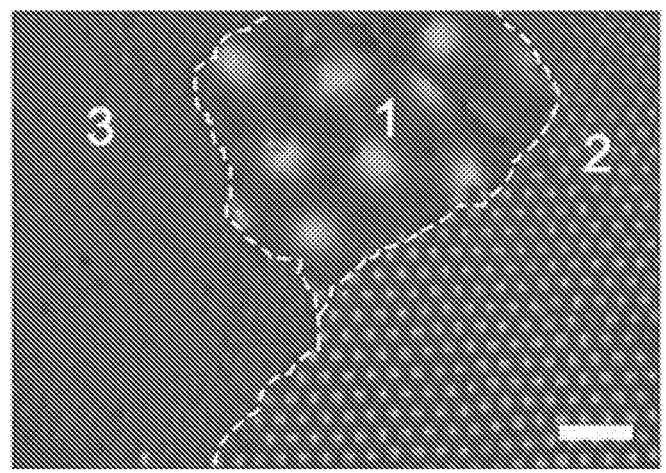
FIG. 39 is an optical image of a representative boundary of the fabricated moiré chiral metamaterials, which has three types of domains (indicated by 1, 2, and 3) due to the different angles ($\theta$). The scale bar is 5 µm.
Figure 40:
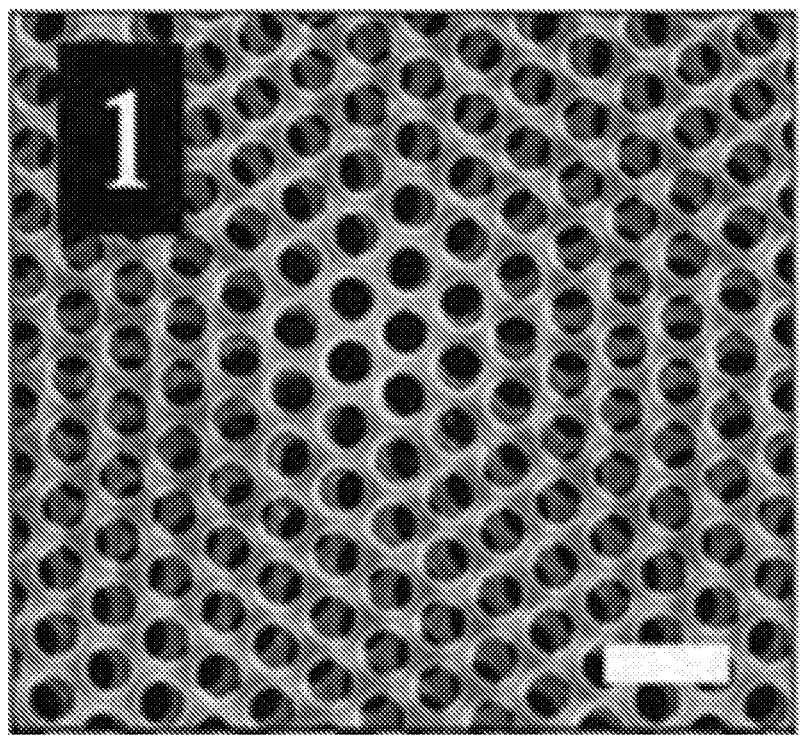
FIG. 40 is a SEM image of the domain corresponding to domain 1 in FIG. 39. The scale bar is 1 µm.
Figure 41:
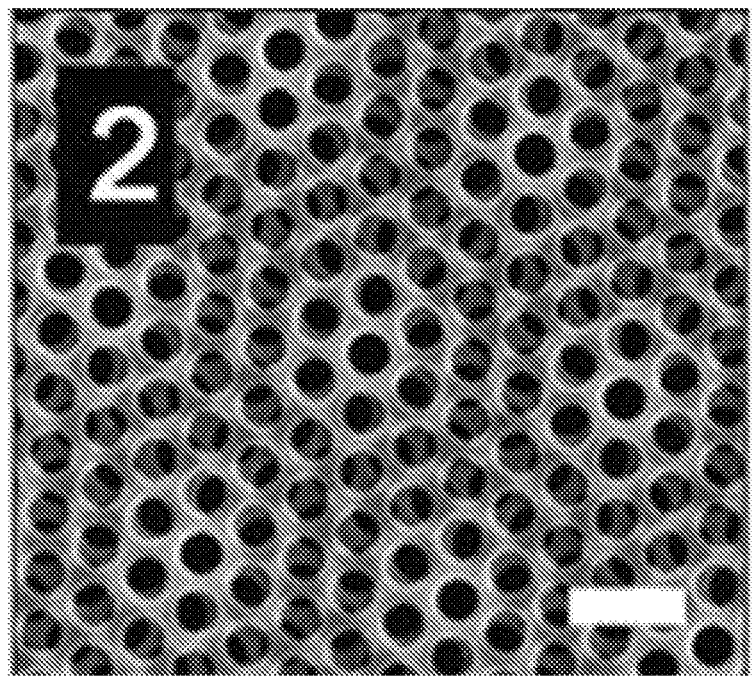
FIG. 41 is a SEM image of the domain corresponding to domain 2 in FIG. 39. The scale bar is 1 µm.
Figure 42:
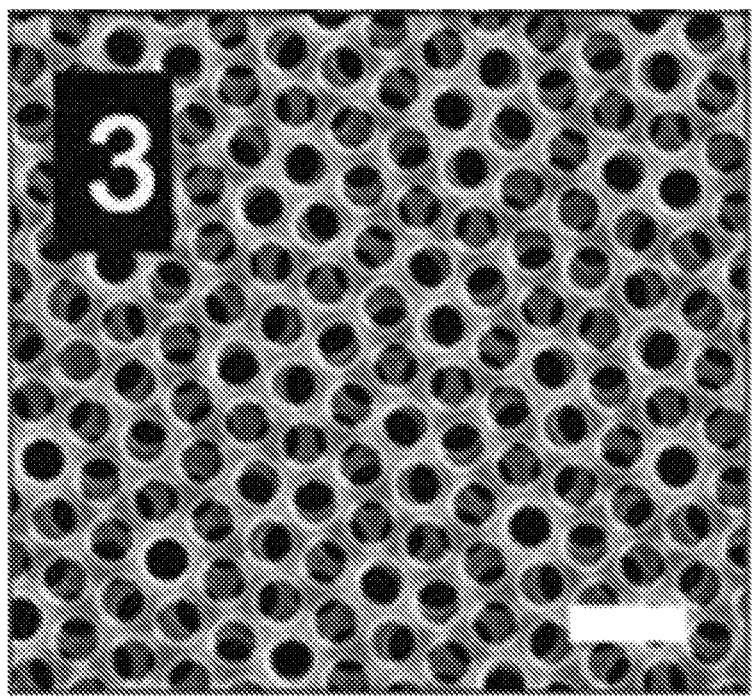
FIG. 42 is a SEM image of the domain corresponding to domain 3 in FIG. 39. The scale bar is 1 µm.
Figure 43:
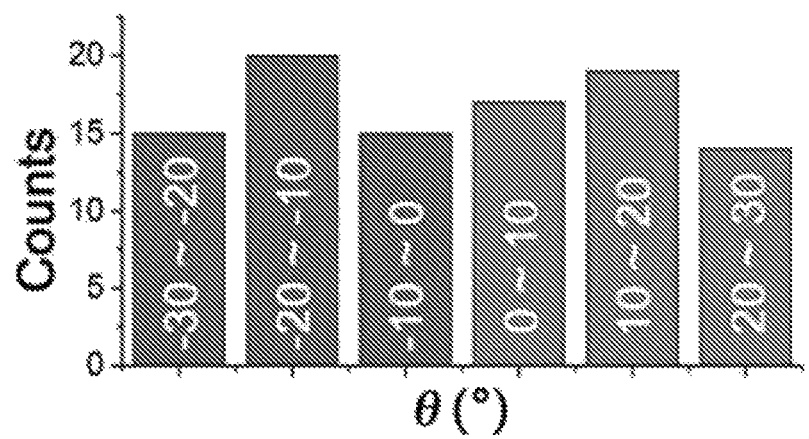
FIG. 43 is a histogram of $\theta$ distributions on a single moiré chiral metamaterial sample.
Figure 44:
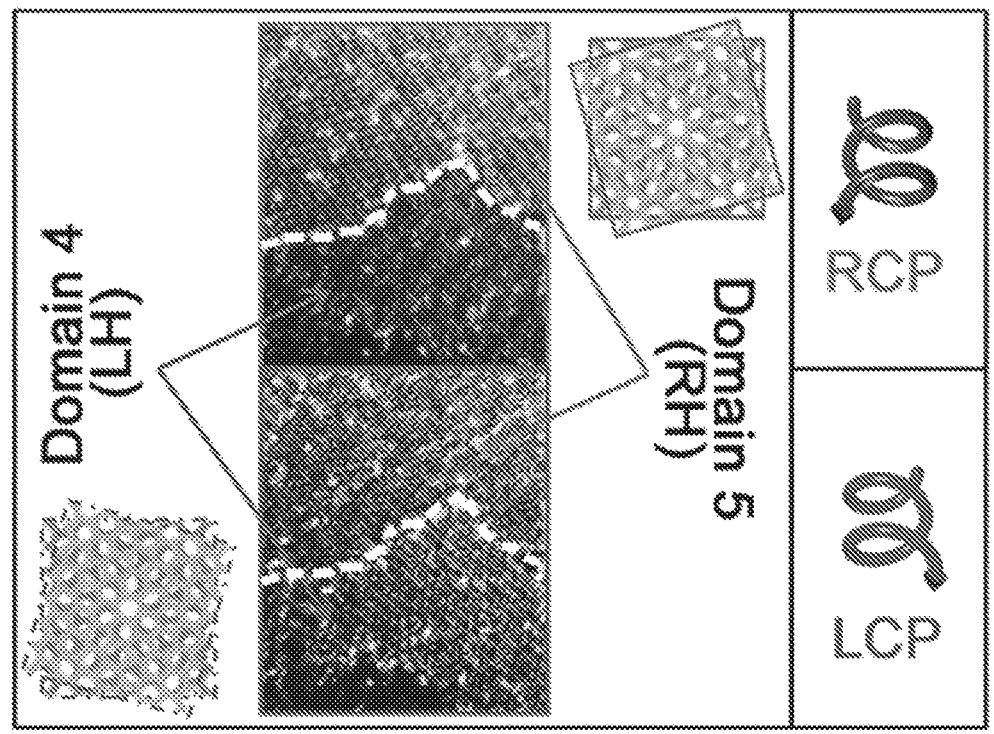
FIG. 44 is gray-scale optical images at the boundary of two enantiomers (indicated by 4 and 5) with opposite structural handedness (i.e., $\theta=-15°$ vs $15°$, respectively) under left-handed circular polarization and right-handed circular polarization illuminations.

Due to the polycrystallinity of colloid monolayers and thus the Au nanohole arrays fabricated by nanosphere lithography (He Y et al. *ACS Photonics* 2015, 2, 1246; Vogel N et al. *Chem. Rev.* 2015, 115, 6265; Sirotkin F et al. *Langmuir* 2010, 26, 10677), a single moiré chiral metamaterial sample can exhibit multiple domains with the different relative in-plane rotation angles. Therefore, one sample can support variable types of optical chirality. As an example, FIG. 39 shows an optical image of the moiré chiral metamaterials with three different domains. FIG. 40-FIG. 42 show the corresponding SEM images of the three domains of FIG. 39 with θ of −7.5°, 10°, and −17°, respectively. The histogram in FIG. 43 shows the number of θ within six different types of ranges (i.e., −30° to −20°, −20° to −10°, −10° to 0°, 0° to 10°, 10° to 20°, 20° to 30°, respectively) out of 100 randomly chosen domains in a single moiré chiral metamaterial sample. The six ranges of θ represent one complete set of moiré chiral metamaterials within one rotational period ($\pi/3$) of the optical chirality. As shown by the histogram, all the domains have nearly even distributions in θ, leading to the similar number of enantiomers. Therefore, the optical chirality of moiré chiral metamaterial enantiomers with opposite handedness on a single sample may eventually cancel each other. Although nanosphere lithography and wet-transfer cannot reproduce the exact samples with single handedness in optical chirality, it is easy to find domains with the variable θ values on each sample. FIG. 44 shows two enantiomers adjacent to each other. The gray-scale optical images reveal the boundary of the two enantiomers (indicated by 4 and 5) with opposite structural handedness (i.e., θ=−15° vs 15°) under illumination with left-handed circularly polarized light or right-handed circularly polarized light.

The super chiral fields generated by chiral plasmonic structures are sensitive to the chiral structures of molecules, including the secondary structure and higher order hierarchical structure of proteins (Hendry E et al. *Nat. Nanotechnol.* 2010, 5, 783; Tullius R et al. *J. Am. Chem. Soc.* 2015, 137, 8380). The moiré chiral metamaterials fabricated by nanosphere lithography described herein were employed to detect the chiral structures of biomolecules and drug molecules at the pictogram level based on "plasmonic polarimetry" (Hendry E et al. *Nat. Nanotechnol.* 2010, 5, 783; Karimullah A S et al. *Adv. Mater.* 2015, 27, 5610). The structural chirality of the molecules near the surfaces of the moiré chiral metamaterials is determined by the dissymmetry factor: $\Delta\Delta\lambda=\Delta\lambda_L-\Delta\lambda_R$, where $\Delta\lambda_L$ and $\Delta\lambda_R$ are the shifts of the circular dichroism spectral peaks (or dips) of the moiré chiral metamaterials with left-handedness and right-handedness, respectively.

For the detection mechanism, chiral molecules introduce asymmetric modification of local refractive index and thus asymmetric values of $\Delta\lambda_L$ and $\Delta\lambda_R$ (Tang Y and Cohen A E. *Science* 2011, 332, 333). With their enhanced and compact super chiral fields generated by circularly polarized illumination, the moiré chiral metamaterials enable the enantio-discrimination of molecules with higher sensitivity than conventional techniques (Hendry E et al. *Nat. Nanotechnol.* 2010, 5, 783; Tullius R et al. *J. Am. Chem. Soc.* 2015, 137, 8380). The reliability and repeatability of this chiral sensing method have been confirmed elsewhere (Hendry E et al. *Nat. Nanotechnol.* 2010, 5, 783; Karimullah A S et al. *Adv. Mater.* 2015, 27, 5610; Tullius R et al. *J. Am. Chem. Soc.* 2015, 137, 8380; Jack C et al. *Nat. Commun.* 2016, 7, 10946).

Figure 45:
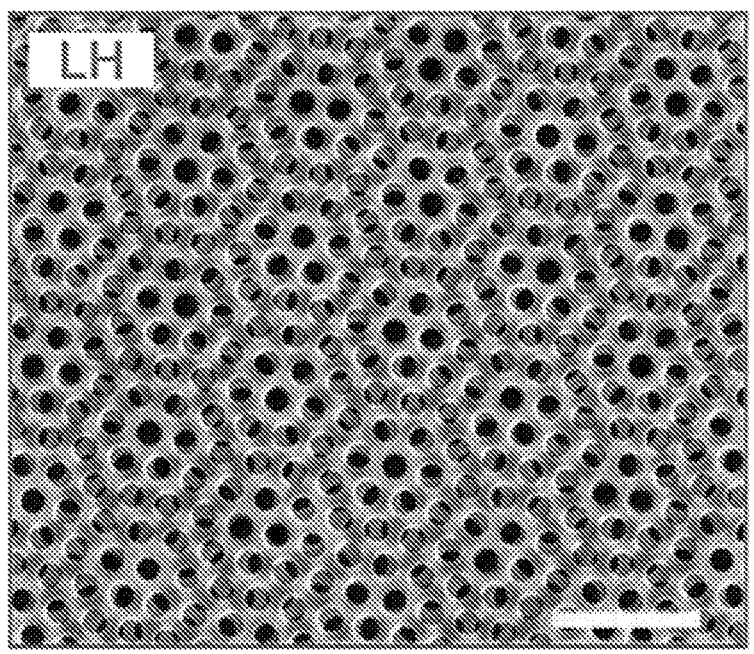
FIG. 45 is a SEM image of the left-handed enantiomer of the moiré chiral metamaterial for the chiral sensing experiments. The scale bar is 2 µm.
Figure 46:
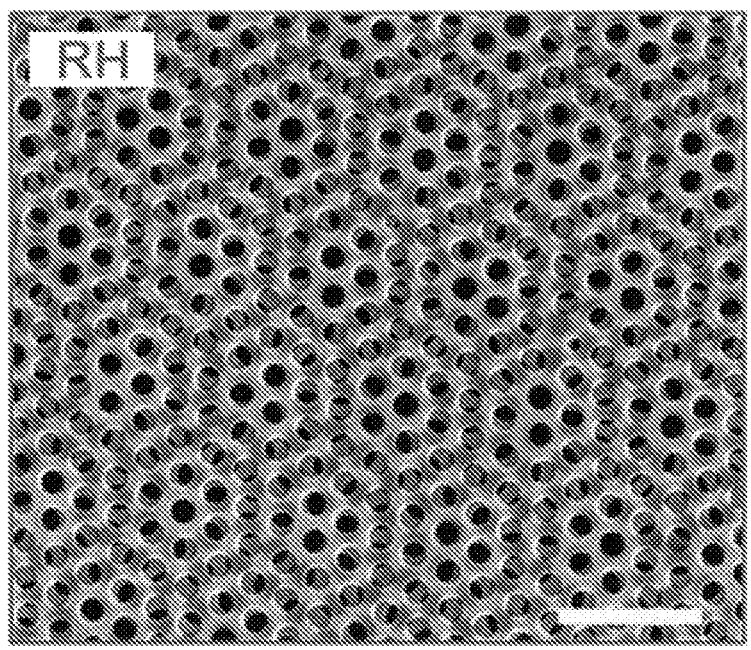
FIG. 46 is a SEM image of the right-handed enantiomer of the moiré chiral metamaterial for the chiral sensing experiments. The scale bar is 2 µm.
Figure 47:
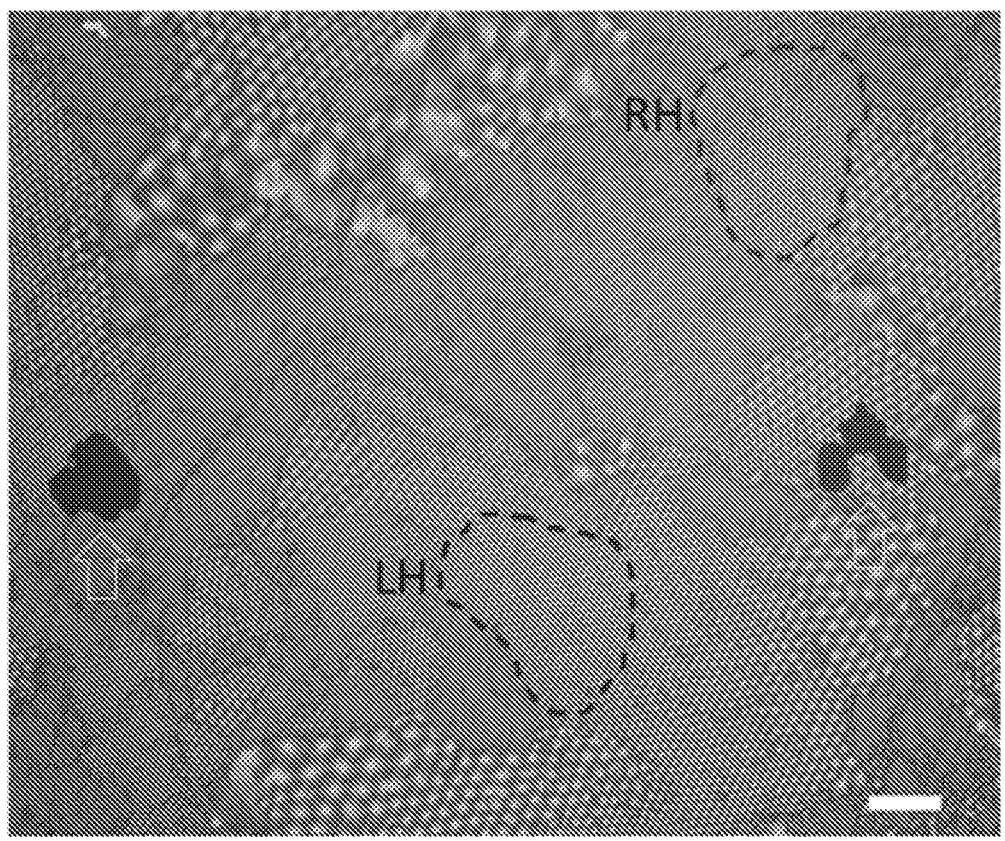
FIG. 47 is an optical image of the two enantiomers of moiré chiral metamaterials for the detection experiments. The domains marked by dashed circles are left-hand and right-hand moiré chiral metamaterials, as indicated. The white arrows are pointing toward the alignment marks. The scale bar is 20 µm.
Figure 48:
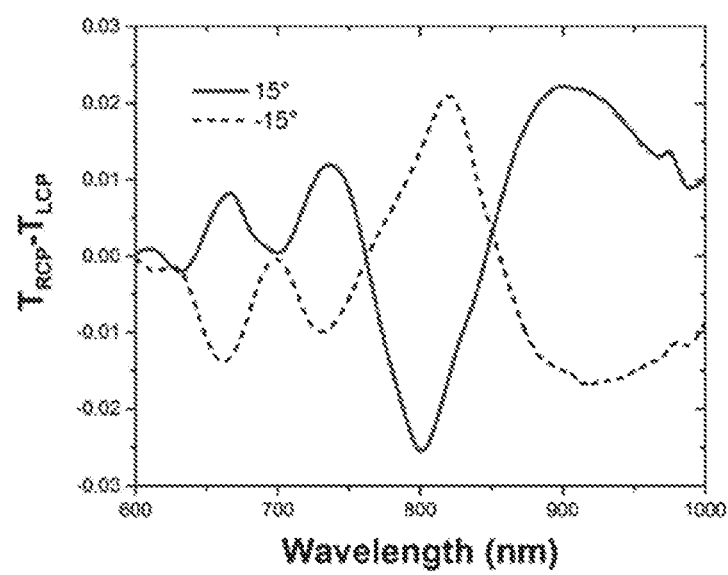
FIG. 48 is the circular dichroism spectra of the moiré chiral metamaterial with $\theta$ of $15°$ (solid line) and $-15°$ (dashed line), respectively, in buffer solution without analytes. The buffer solution is Tris/HCl ($10\times10^3$ M, pH 7.4).
Figure 49:
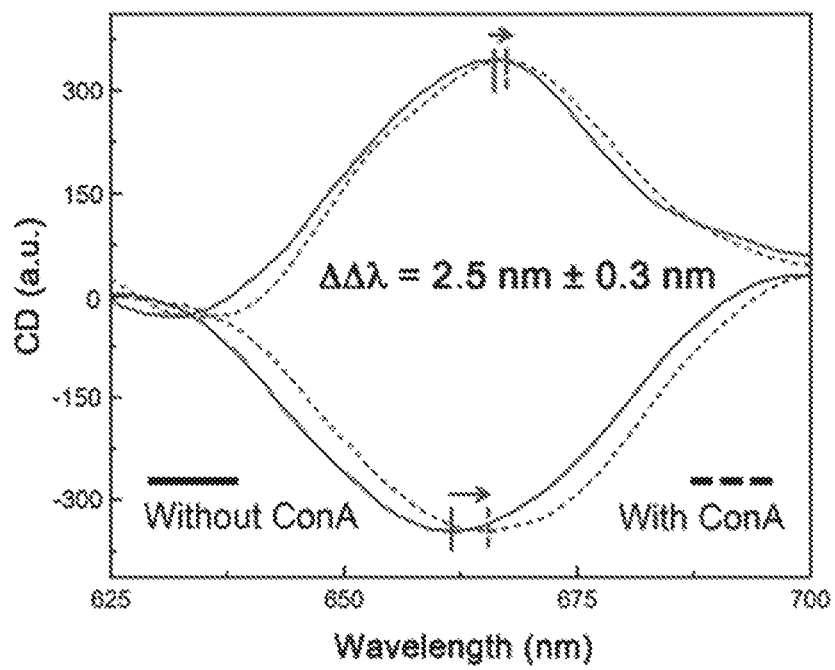
FIG. 49 is the detection of the structural chirality of molecules using moiré chiral metamaterials fabricated by nanosphere lithography. Circular dichroism spectra of two enantiomers of the moiré chiral metamaterials with $\theta$ of $-15°$ (lower curves) and $15°$ (upper curves). The solid and dashed curves are obtained before and after the adsorption of Concanavalin A (ConA). The $\Delta\Delta\lambda$ value reveals the structural chirality of the analytes.
Figure 50:
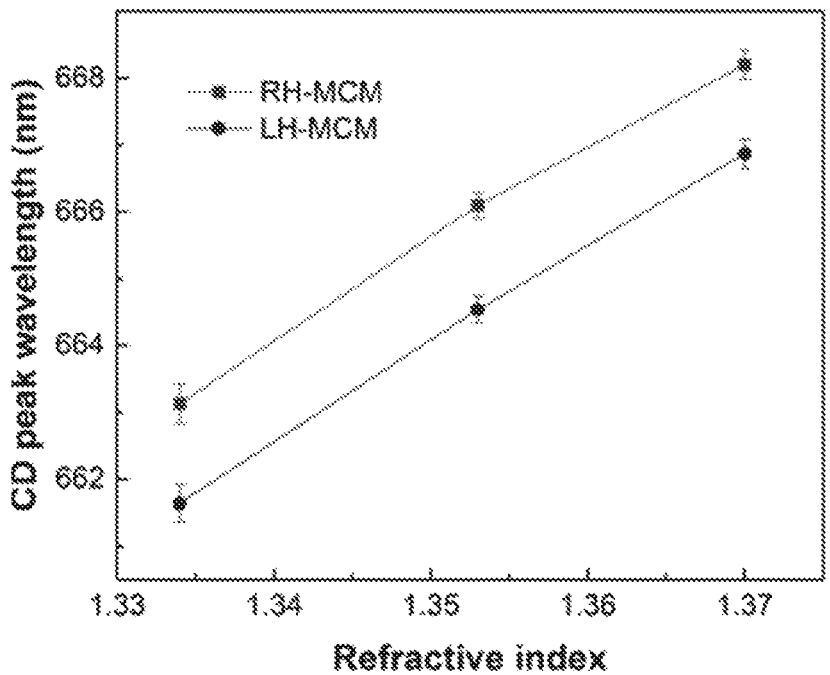
FIG. 50 is a calibration measurement (circular dichroism peak or dip wavelengths) results for NaCl solution with concentration of 0, 2.2 M, and 4.4 M, respectively. The corresponding refractive indexes of the NaCl solutions are 1.334, 1.353, and 1.370, respectively. The NaCl solutions were obtained by dissolving NaCl in deionized water. The results show linear increase in the measured values for both right-handed moiré chiral metamaterial (RH-MCM, squares) and left-handed moiré chiral metamaterial (LH-MCM, circles) with equal gradients. The error bars indicate the small experimental error.
Figure 51:
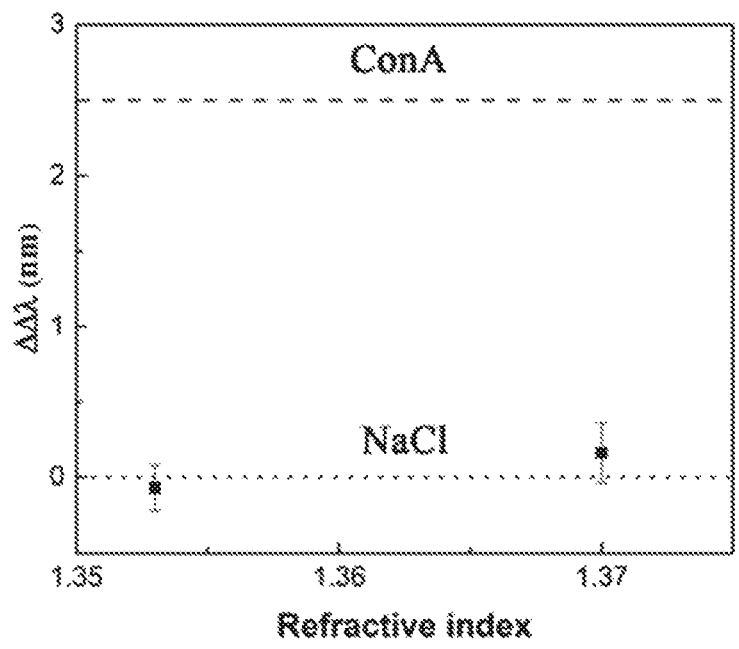
FIG. 51 shows that no obvious $\Delta\Delta\lambda$ can be observed for NaCl solutions with different refractive index, as expected for achiral molecules. The black dotted line depicts the zero value of the $\Delta\Delta\lambda$. The upper dashed line depicts the $\Delta\Delta\lambda$ value (2.5 nm) obtained from ConA for comparison.

Chiral enantiomers with both left-handedness and right-handedness are required for the enantio-discrimination of molecules based on the asymmetric shifts of the circular dichroism spectral peaks or dips. Therefore, the moiré chiral metamaterials fabricated by nanosphere lithography described herein are promising for enantio-discrimination applications due to the coexistence of the chiral enantiomers within a single sample. With a large number (>10,000 in a 1 cm×1 cm sample) of domains in the moiré chiral metamaterials fabricated by nanosphere lithography that cover a complete set of chiral enantiomers, one can easily identify pairs of enantiomers for chirality sensing. As an initial demonstration, moiré chiral metamaterial enantiomers with a relative in-plane rotation angles of 15° and −15° were applied to detect Concanavalin A (ConA), which is a chiral protein of high β-sheet content (Hendry E et al. *Nat. Nanotechnol.* 2010, 5, 783; Karimullah A S et al. *Adv. Mater.* 2015, 27, 5610). The SEM images of the two moiré chiral metamaterial enantiomers are shown in FIG. 45 and FIG. 46. The optical image in FIG. 47 shows the relative locations of the two moiré chiral metamaterial enantiomers used for the chiral sensing. Alignment marks were fabricated on the sample to help relocate the two moiré chiral metamaterial enantiomers for repeated sensing experiments. FIG. 48 shows the circular dichroism spectra of the moiré chiral metamaterials in buffer solution. The difference in the circular dichroism spectra between FIG. 20 and FIG. 48 is attributed to the change of refractive index from air to buffer solution. FIG. 49 shows the spectral shift in the circular dichroism spectra of the moiré chiral metamaterial enantiomers after the adsorption of a trace amount (1 mg mL$^{-1}$, corresponding to ~250 pg (picograms) detected in the experiments (Karimullah A S et al. *Adv. Mater.* 2015, 27, 5610)) of ConA. The moiré chiral metamaterials have a dissymmetry value ($\Delta\Delta\lambda$) of 2.5±0.3 nm, which is comparable to state-of-the-art plasmonic metamaterials (Karimullah A S et al. *Adv. Mater.* 2015, 27, 5610; Tullius R et al. *J. Am. Chem. Soc.* 2015, 137, 8380). The error bar was obtained by statistically analyzing six measurements on the two locations. In a control experiment with NaCl solutions, ΔΔλ has a zero value, as expected for achiral molecules (FIG. 50 and FIG. 51).

Figure 52:
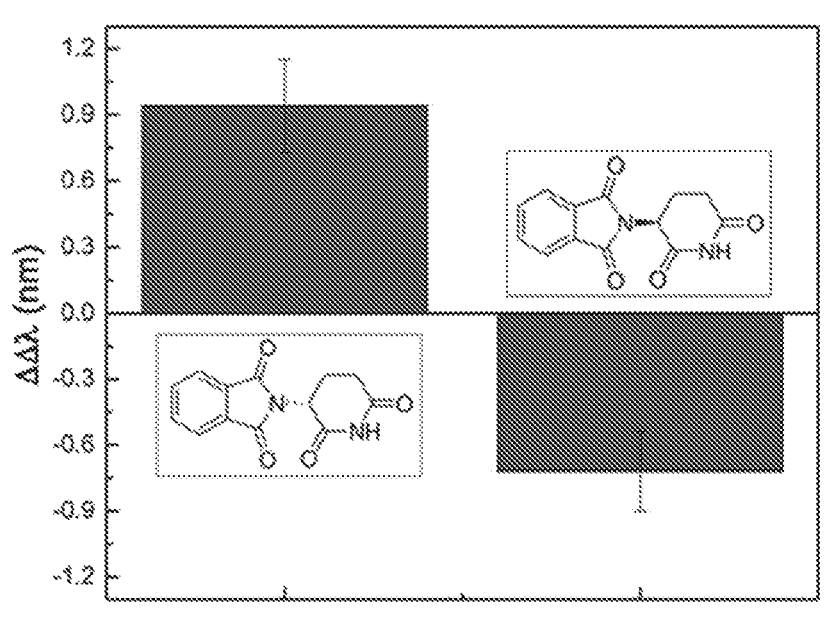
FIG. 52 is the detection of the structural chirality of molecules using moiré chiral metamaterials fabricated by nanosphere lithography. $\Delta\Delta\lambda$ values for a drug molecule (R-thalidomide) and its "evil twin" (S-thalidomide). The opposite signs of the $\Delta\Delta\lambda$ values reveal the opposite handedness of the R-thalidomide and S-thalidomide. Insets show the chemical structures of the molecules.
Figure 53:
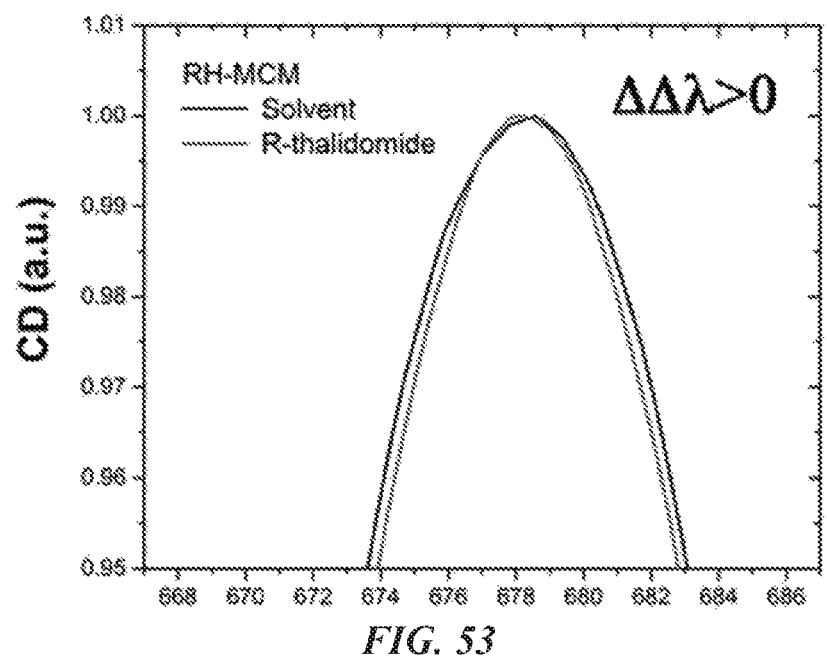
FIG. 53 is the shifts in the circular dichroism peak wavelengths of the right-handed enantiomer of a moiré chiral metamaterial due to the adsorption of the chiral drug molecule R-thalidomide.

Detection of structural chirality is of crucial importance to medical industry because the enantiomers of many chiral drugs have harmful effects on human body. One example is thalidomide. R-thalidomide is an effective painkiller, while its "evil twin" (S-thalidomide) can cause deformity of newly born babies (Valev V K et al. *Adv. Mater.* 2013, 25, 2517). Although plasmonic super chiral fields have been successfully applied to detect the chiral structures of proteins, it has remained challenging to detect the structural handedness of drug molecules due to their small size and thinner film adsorbed on the surface of metamaterials. An effective sensing of small chiral molecules requires the strong enhancement of optical chirality, which can be obtained by 3D chiral structures with highly compact hot spots (Schäferling M et al. *Phys. Rev. X* 2012, 2, 031010). R-thalidomide was successfully distinguished from its "evil twin" at the picogram level using the moiré chiral metamaterials of ultrathin thickness described herein. The dissymmetry values (ΔΔλ) of the moiré chiral metamaterials for the two enantiomers of thalidomide (2 mg, mL$^{-1}$) are shown in FIG. 52. The complete circular dichroism spectra for the chiral sensing of thalidomide are shown in FIG. 53-FIG. 56. The ΔΔλ has a positive value (0.94±0.21 nm) for R-thalidomide, while the ΔΔλ has a negative value (−0.72±0.18 nm) for S-thalidomide. The reproducibility can be confirmed by the small error bars in FIG. 52 and the similar results from the repeated experiments using two other sets of enantiomers of the moiré chiral metamaterials (FIG. 57-FIG. 64). The excellent sensing capability of the moiré chiral metamaterials is attributed to the compact hot spots (as shown in FIG. 31) in the 3D chiral scaffolds and the connected 3D nanopores that allow facile penetration of the molecules (Jeong J W et al. *Adv. Mater.* 2016, 28, 8695).

In summary, moiré chiral metamaterials, based on chiral stacking of two layers of achiral Au nanohole arrays, represent a new type of ultrathin chiral metamaterials that can work in the visible and near-infrared regimes. A lattice-dependent "helical" oscillator model is proposed herein to explain the chiroptical properties of the moiré chiral metamaterials. Due to their dependence on the relative lattice orientations of the two layers of Au nanohole arrays, the chiroptical effects of the moiré chiral metamaterials can be precisely tuned by the relative in-plane rotation of the two layers at the macroscale level. With their compact super chiral fields and connected nanopores in 3D structures, the moiré chiral metamaterials have been applied to distinguish the drug molecule R-thalidomide and its "evil twin" S-thalidomide at the picogram level.

The moiré chiral metamaterials are compatible with many high-throughput fabrication techniques such as nanoimprint lithography, injection molding, and nanosphere lithography for their large-scale applications. As an initial demonstration, nanosphere lithography combined with a wet-transfer process was used to fabricate the moiré chiral metamaterials. Due to the polycrystallinity of colloidal monolayers in nanosphere lithography, a large number of enantiomers with a complete set of relative in-plane rotation angles coexists in single moiré chiral metamaterial, facilitating their applications for the enantio-discrimination of molecules. However, it is also worth mentioning that nanosphere lithography cannot provide the same precision in fabrication as nanoimprint lithography and injection molding due to the lack of large-area uniformity. The nanoimprint lithography and injection molding would enable the fabrication of moiré chiral metamaterials with single domains and precisely controlled θ at the large scale. With their strong optical chirality, high tunability, ultrathin thickness, and scalable fabrication, the moiré chiral metamaterials will find important applications in optical sensors and devices. Furthermore, the strong optical chirality may also enable the moiré chiral metamaterials for applications, such as tunable polarizers, based on optical rotation dispersion (Valev V K et al. *Adv. Mater.* 2013, 25, 2517; Yin X et al. *Nano Lett.* 2013, 13, 6238).

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A nanostructured plasmonic material, comprising:
   a first nanostructured layer comprising a first layer of a first plasmonic material permeated by a first plurality of spaced-apart holes, each hole being defined by an edge, wherein the first plurality of spaced apart holes comprise a first array defined by a first unit cell, the first unit cell having:
   a first principle axis and a second principle axis with a first included angle between the first principle axis and the second principle axis;
   wherein the first principle axis has a first length, the first length being measured from nearest edge to nearest edge between adjacent holes in the first array along the first principle axis;
   wherein the second principle axis has a second length, the second length being measured from nearest edge to nearest edge between adjacent holes in the first array along the second principle axis;
   a second nanostructured layer comprising a second layer of a second plasmonic material permeated by a second plurality of spaced-apart holes, each hole being defined by an edge, wherein the second plurality of spaced apart holes comprise a second array defined by a second unit cell, the second unit cell having:
   a third principle axis and a fourth principle axis with a second included angle between the third principle axis and the fourth principle axis;

wherein the third principle axis has a third length, the third length being measured from nearest edge to nearest edge between adjacent holes in the second array along the third principle axis;
wherein the fourth principle axis has a fourth length, the fourth length being measured from nearest edge to nearest edge between adjacent holes in the second array along the fourth principle axis;
wherein the first principle axis of the first array is rotated at a rotation angle compared to the third principle axis of the second array;
wherein the first nanostructured layer is achiral;
wherein the second nanostructured layer is achiral;
wherein the nanostructured plasmonic material is a moiré chiral metamaterial; and
wherein:
the second nanostructured layer is disposed on the first nanostructured layer; or
the nanostructured plasmonic material further comprises a third layer located between the first nanostructured layer and the second nanostructured layer and in contact with the first nanostructured layer and the second nanostructured layer.

2. The nanostructured plasmonic material of claim 1, further comprising a substrate having a first surface, wherein the first nanostructured layer is disposed on the first surface.

3. The nanostructured plasmonic material of claim 1, wherein the first plasmonic material and the second plasmonic material independently comprise:
a plasmonic metal selected form a group consisting of Au, Ag, Pt, Pd, Cu, Cr, Al, and combinations thereof; or
a plasmonic oxide material selected from the group consisting of tungsten oxide, indium oxide, molybdenum oxide, tin-doped indium oxide, fluorine-doped tin oxide, indium-doped cadmium oxide, aluminum-doped zinc oxide, antimony-doped tin oxide, cesium tungsten oxide, and combinations thereof.

4. The nanostructured plasmonic material of claim 1, wherein:
the thickness of a first layer of the first plasmonic material is from 15 nm to 200 nm;
the thickness of a second layer of the second plasmonic material is from 15 nm to 200 nm;
or a combination thereof.

5. The nanostructured plasmonic material of claim 1, wherein:
each of the holes in the first plurality of spaced-apart holes has an average characteristic dimension of from 20 nm to 800 nm;
each of the holes in the second plurality of spaced-apart holes has an average characteristic dimension of from 20 nm to 800 nm;
or a combination thereof.

6. The nanostructured plasmonic material of claim 5, wherein:
each of the holes in the first plurality of spaced-apart holes is substantially cylindrical in shape, such that a diameter of each cylinder is the average characteristic dimension of each of the holes in the first plurality of spaced-apart holes;
each of the holes in the second plurality of spaced-apart holes is substantially cylindrical in shape, such that a diameter of each cylinder is the average characteristic dimension of each of the holes in the second plurality of spaced-apart holes;
or a combination thereof.

7. The nanostructured plasmonic material of claim 1, wherein:
the first length of the first principle axis in the first array is from 60 nm to 1000 nm;
the third length of the third principle axis the second array is from 60 nm to 1000 nm;
the second length of the second principle axis in the first array is from 60 nm to 1000 nm;
the fourth length of the fourth principle axis in the second array is from 60 nm to 1000 nm;
or a combination thereof.

8. The nanostructured plasmonic material of claim 1, wherein:
each of the holes in the first plurality of spaced-apart holes has an average characteristic dimension of from 40% to 80% of the first length of the first principle axis in the first array;
each of the holes in the second plurality of spaced-apart holes has an average characteristic dimension of from 40% to 80% of the third length of the third principle axis in the second array;
each of the holes in the first plurality of spaced-apart holes has an average characteristic dimension of from 40% to 80% of the second length of the second principle axis in the first array;
each of the holes in the second plurality of spaced-apart holes has an average characteristic dimension of from 40% to 80% of the fourth length of the fourth principle axis in the second array;
or a combination thereof.

9. The nanostructured plasmonic material of claim 1, wherein:
the first included angle is from 45° to 135°;
the second included angle is from 45° to 135°;
or a combination thereof.

10. The nanostructured plasmonic material of claim 1, wherein:
the first unit cell is in the shape of a triangle or a rectangle;
the second unit cell is in the shape of a triangle or a rectangle;
or a combination thereof.

11. The nanostructured plasmonic material of claim 1, wherein the rotation angle is from 1° to 90°.

12. The nanostructured plasmonic material of claim 1, wherein the first nanostructured layer and the second nanostructured layer are substantially the same.

13. The nanostructured plasmonic material of claim 1, wherein or the nanostructured plasmonic material further comprises the third layer located between the first nanostructured layer and the second nanostructured layer and in contact with the first nanostructured layer and the second nanostructured layer, wherein the third layer comprises a dielectric material and wherein the third layer has a thickness of from 1 nm to 100 nm.

14. A method of use of the nanostructured plasmonic material of claim 1, the method comprising:
contacting the nanostructured plasmonic material with a sample, wherein the sample comprises an analyte;
applying circularly polarized light to the sample and the nanostructured plasmonic material;
capturing an electromagnetic signal from the sample, the nanostructured plasmonic material, or a combination thereof, wherein the circularly polarized light passes through both the sample and the nanostructured plasmonic material before being captured; and
processing the electromagnetic signal to determine a property of the sample.

15. The method of claim 14, wherein the analyte comprises a chiral molecule.

16. The method of claim 14, wherein the analyte comprises a biomolecule, a macromolecule, a virus, a drug, or a combination thereof.

17. The method of claim 14, wherein the sample comprises from 100 picograms to 4 nanograms of the analyte.

18. The method of claim 14, wherein the property comprises a chirality of the analyte, a presence of a chiral analyte, a circular dichroism of the sample, a concentration of the analyte in the sample, or a combination thereof.

19. A method of use of the nanostructured plasmonic material of claim 1, the method comprising using the nanostructured plasmonic material as a chiral sensor.

20. A system comprising:
a nanostructured plasmonic material comprising:
a first nanostructured layer comprising a first layer of a first plasmonic material permeated by a first plurality of spaced-apart holes, each hole being defined by an edge, wherein the first plurality of spaced apart holes comprise a first array defined by a first unit cell, the first unit cell having:
a first principle axis and a second principle axis with a first included angle between the first principle axis and the second principle axis;
wherein the first principle axis has a first length, the first length being measured from nearest edge to nearest edge between adjacent holes in the first array along the first principle axis;
wherein the second principle axis has a second length, the second length being measured from nearest edge to nearest edge between adjacent holes in the first array along the second principle axis; and
a second nanostructured layer comprising a second layer of a second plasmonic material permeated by a second plurality of spaced-apart holes, each hole being defined by an edge, wherein the second plurality of spaced apart holes comprise a second array defined by a second unit cell, the second unit cell having:
a third principle axis and a fourth principle axis with a second included angle between the third principle axis and the fourth principle axis;
wherein the third principle axis has a third length, the third length being measured from nearest edge to nearest edge between adjacent holes in the second array along the third principle axis;
wherein the fourth principle axis has a fourth length, the fourth length being measured from nearest edge to nearest edge between adjacent holes in the second array along the fourth principle axis;
wherein the first principle axis of the first array is rotated at a rotation angle compared to the third principle axis of the second array;
wherein the first nanostructured layer is achiral;
wherein the second nanostructured layer is achiral;
wherein the nanostructured plasmonic material is a moiré chiral metamaterial; and
wherein:
the second nanostructured layer is disposed on the first nanostructured layer; or
the nanostructured plasmonic material further comprises a third layer located between the first nanostructured layer and the second nanostructured layer and in contact with the first nanostructured layer and the second nanostructured layer;
and
a light source configured to illuminate the nanostructured plasmonic material with circularly polarized light.

* * * * *